United States Patent
Hira et al.

(10) Patent No.: US 10,397,136 B2
(45) Date of Patent: *Aug. 27, 2019

(54) MANAGED FORWARDING ELEMENT EXECUTING IN SEPARATE NAMESPACE OF PUBLIC CLOUD DATA COMPUTE NODE THAN WORKLOAD APPLICATION

(71) Applicant: Nicira, Inc., Palo Alto, CA (US)

(72) Inventors: Mukesh Hira, Palo Alto, CA (US); Saurabh Shah, Mountain View, CA (US); Su Wang, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 15/253,834

(22) Filed: Aug. 31, 2016

(65) Prior Publication Data

US 2018/0063087 A1    Mar. 1, 2018

Related U.S. Application Data

(60) Provisional application No. 62/380,411, filed on Aug. 27, 2016.

(51) Int. Cl.
*H04L 12/933* (2013.01)
*G06F 11/14* (2006.01)
(Continued)

(52) U.S. Cl.
CPC .......... *H04L 49/15* (2013.01); *G06F 9/45533* (2013.01); *G06F 9/45558* (2013.01);
(Continued)

(58) Field of Classification Search
CPC ......... H04L 49/15; H04L 49/25; H04L 49/70; H04L 41/0806; H04L 41/044;
(Continued)

(56) References Cited

U.S. PATENT DOCUMENTS

| 6,832,238 B1 | 12/2004 | Sharma et al. |
| 7,107,360 B1 | 9/2006 | Phadnis et al. |

(Continued)

FOREIGN PATENT DOCUMENTS

| EP | 1742430 A1 | 1/2007 |
| WO | 2018044341 A1 | 3/2018 |

OTHER PUBLICATIONS

Non-Published commonly Owned U.S. Appl. No. 15/253,829, filed Aug. 31, 2016, 113 pages, Nicira Inc.
(Continued)

*Primary Examiner* — Daniel B Potratz
*Assistant Examiner* — Vu V Tran
(74) *Attorney, Agent, or Firm* — Adeli LLP

(57) ABSTRACT

Some embodiments provide a method for a network controller that manages a logical network implemented in a datacenter having forwarding elements to which the network controller does not have access. The method identifies a data compute node (DCN) operating on a host machine in the datacenter, to attach to the logical network. The DCN has a network interface with an address provided by a datacenter management system. A workload application executes in a first namespace of the DCN. The method distributes configuration data for configuring a managed forwarding element (MFE) executing in a second namespace of the DCN to receive data packets sent from the application via an interface pairing between the first and second namespaces. The data packets sent by the application have the provided address as a source address when received by the MFE and are encapsulated by the MFE using the provided address as a source address.

20 Claims, 32 Drawing Sheets

(51) Int. Cl.

| | | |
|---|---|---|
| *G06F 9/50* | (2006.01) | |
| *G06F 11/00* | (2006.01) | |
| *G06F 11/34* | (2006.01) | |
| *G06F 9/455* | (2018.01) | |
| *G06F 11/20* | (2006.01) | |
| *G06F 15/177* | (2006.01) | |
| *G06F 11/07* | (2006.01) | |
| *H04L 12/24* | (2006.01) | |
| *H04L 29/06* | (2006.01) | |
| *H04L 29/12* | (2006.01) | |
| *H04L 12/721* | (2013.01) | |
| *H04L 12/823* | (2013.01) | |
| *H04L 12/931* | (2013.01) | |
| *H04L 12/741* | (2013.01) | |
| *H04L 29/08* | (2006.01) | |
| *H04L 12/46* | (2006.01) | |
| *H04L 12/66* | (2006.01) | |
| *H04L 12/803* | (2013.01) | |
| *H04L 12/947* | (2013.01) | |
| *H04L 9/08* | (2006.01) | |
| *H04L 9/32* | (2006.01) | |

(52) U.S. Cl.
CPC ......... *G06F 9/5072* (2013.01); *G06F 11/008* (2013.01); *G06F 11/07* (2013.01); *G06F 11/0709* (2013.01); *G06F 11/0793* (2013.01); *G06F 11/1438* (2013.01); *G06F 11/1482* (2013.01); *G06F 11/2035* (2013.01); *G06F 11/3433* (2013.01); *G06F 15/177* (2013.01); *H04L 9/0819* (2013.01); *H04L 9/3213* (2013.01); *H04L 12/4633* (2013.01); *H04L 12/4641* (2013.01); *H04L 12/66* (2013.01); *H04L 41/044* (2013.01); *H04L 41/0806* (2013.01); *H04L 41/12* (2013.01); *H04L 41/20* (2013.01); *H04L 45/38* (2013.01); *H04L 45/72* (2013.01); *H04L 45/74* (2013.01); *H04L 47/32* (2013.01); *H04L 49/25* (2013.01); *H04L 49/70* (2013.01); *H04L 61/256* (2013.01); *H04L 61/2514* (2013.01); *H04L 61/2521* (2013.01); *H04L 61/2539* (2013.01); *H04L 61/2592* (2013.01); *H04L 63/029* (2013.01); *H04L 63/0209* (2013.01); *H04L 63/0236* (2013.01); *H04L 63/0263* (2013.01); *H04L 63/0272* (2013.01); *H04L 63/0428* (2013.01); *H04L 63/062* (2013.01); *H04L 63/20* (2013.01); *H04L 67/10* (2013.01); *H04L 67/1097* (2013.01); *G06F 2009/4557* (2013.01); *G06F 2009/45595* (2013.01); *H04L 47/125* (2013.01); *H04L 61/2015* (2013.01); *H04L 2209/24* (2013.01); *H04L 2212/00* (2013.01)

(58) Field of Classification Search
CPC ..... H04L 41/20; H04L 41/12; H04L 63/0272; H04L 63/0209; H04L 63/0263; H04L 63/20; H04L 63/0236; H04L 63/062; H04L 63/0428; H04L 63/029; H04L 61/2592; H04L 61/2539; H04L 61/2514; H04L 61/2521; H04L 61/2015; H04L 61/256; H04L 45/38; H04L 45/72; H04L 45/74; H04L 47/32; H04L 47/125; H04L 9/3213; H04L 9/0819; H04L 67/10; H04L 67/1097; H04L 2212/00; H04L 2209/24; H04L 12/4633; H04L 12/66; H04L 12/4641; G06F 11/0709; G06F 11/1438; G06F 11/008; G06F 11/1482; G06F 11/0793; G06F 11/3433; G06F 11/2035; G06F 11/07; G06F 9/5072; G06F 9/45533; G06F 9/45558; G06F 15/177; G06F 2009/45595; G06F 2009/4557
See application file for complete search history.

(56) References Cited

U.S. PATENT DOCUMENTS

| | | | |
|---|---|---|---|
| 7,423,962 | B2 | 9/2008 | Atuterinen |
| 7,953,895 | B1 | 5/2011 | Narayanaswamy et al. |
| 9,356,866 | B1 | 5/2016 | Sivaramakrishnan et al. |
| 9,413,730 | B1 | 8/2016 | Narayan et al. |
| 9,485,149 | B1 | 11/2016 | Traina et al. |
| 9,519,782 | B2 | 12/2016 | Aziz et al. |
| 9,590,904 | B2 | 3/2017 | Heo et al. |
| 9,699,070 | B2 | 7/2017 | Davie et al. |
| 9,832,118 | B1 | 11/2017 | Miller et al. |
| 9,871,720 | B1 | 1/2018 | Tillotson |
| 10,135,675 | B2 | 11/2018 | Yu et al. |
| 10,228,959 | B1 | 3/2019 | Anderson et al. |
| 2002/0062217 | A1 | 5/2002 | Fujimori |
| 2002/0199007 | A1 | 12/2002 | Clayton et al. |
| 2007/0186281 | A1 | 8/2007 | McAlister |
| 2007/0226795 | A1 | 9/2007 | Conti et al. |
| 2007/0256073 | A1* | 11/2007 | Troung .................. G06F 21/53 718/1 |
| 2010/0318609 | A1* | 12/2010 | Lahiri .................... G06F 9/455 709/205 |
| 2011/0317703 | A1 | 12/2011 | Dunbar et al. |
| 2012/0082063 | A1 | 4/2012 | Fujita |
| 2013/0044636 | A1 | 2/2013 | Koponen et al. |
| 2013/0044641 | A1 | 2/2013 | Koponen et al. |
| 2013/0058208 | A1* | 3/2013 | Pfaff .................. H04L 12/4633 370/217 |
| 2013/0263118 | A1* | 10/2013 | Kannan ............... G06F 9/45558 718/1 |
| 2013/0297768 | A1 | 11/2013 | Singh |
| 2013/0304903 | A1 | 11/2013 | Mick et al. |
| 2013/0318219 | A1 | 11/2013 | Kancherla |
| 2014/0010239 | A1 | 1/2014 | Xu et al. |
| 2014/0052877 | A1 | 2/2014 | Mao |
| 2014/0108665 | A1 | 4/2014 | Arora et al. |
| 2014/0143853 | A1 | 5/2014 | Onodera |
| 2014/0156818 | A1 | 6/2014 | Hunt et al. |
| 2014/0226820 | A1 | 8/2014 | Chopra et al. |
| 2014/0245420 | A1 | 8/2014 | Tidwell et al. |
| 2014/0280961 | A1 | 9/2014 | Martinez et al. |
| 2014/0317677 | A1 | 10/2014 | Vaidya et al. |
| 2014/0337500 | A1 | 11/2014 | Lee |
| 2014/0376560 | A1 | 12/2014 | Senniappan et al. |
| 2015/0052522 | A1 | 2/2015 | Chanda et al. |
| 2015/0063360 | A1 | 3/2015 | Thakkar et al. |
| 2015/0096011 | A1 | 4/2015 | Watt |
| 2015/0098465 | A1 | 4/2015 | Pete et al. |
| 2015/0106804 | A1 | 4/2015 | Chandrashekhar et al. |
| 2015/0124645 | A1 | 5/2015 | Yadav et al. |
| 2015/0128245 | A1 | 5/2015 | Brown et al. |
| 2015/0139238 | A1 | 5/2015 | Pourzandi et al. |
| 2015/0172183 | A1* | 6/2015 | DeCusatis ........... H04L 12/4633 370/392 |
| 2015/0172331 | A1* | 6/2015 | Raman ................. H04L 65/403 709/204 |
| 2015/0263983 | A1 | 9/2015 | Brennan et al. |
| 2015/0263992 | A1 | 9/2015 | Kuch et al. |
| 2015/0264077 | A1 | 9/2015 | Berger et al. |
| 2015/0271303 | A1 | 9/2015 | Neginhal et al. |
| 2015/0295800 | A1 | 10/2015 | Bala et al. |
| 2015/0373012 | A1 | 12/2015 | Bartz et al. |
| 2016/0094364 | A1 | 3/2016 | Subramaniyam et al. |
| 2016/0105488 | A1 | 4/2016 | Thakkar et al. |
| 2016/0124742 | A1 | 5/2016 | Rangasamy et al. |
| 2016/0134418 | A1 | 5/2016 | Liu et al. |
| 2016/0182567 | A1 | 6/2016 | Sood et al. |
| 2016/0191304 | A1 | 6/2016 | Muller |

(56) References Cited

U.S. PATENT DOCUMENTS

| | | | |
|---|---|---|---|
| 2016/0274926 A1* | 9/2016 | Narasimhamurthy | ........................ G06F 9/45558 |
| 2016/0308762 A1 | 10/2016 | Teng et al. | |
| 2016/0337329 A1 | 11/2016 | Sood et al. | |
| 2016/0352623 A1 | 12/2016 | Jayabalan et al. | |
| 2016/0352682 A1 | 12/2016 | Chang et al. | |
| 2016/0352747 A1 | 12/2016 | Khan et al. | |
| 2016/0364575 A1 | 12/2016 | Caporal et al. | |
| 2017/0034129 A1 | 2/2017 | Sawant et al. | |
| 2017/0034198 A1 | 2/2017 | Powers et al. | |
| 2017/0060628 A1 | 3/2017 | Tarasuk-Levin et al. | |
| 2017/0091458 A1 | 3/2017 | Gupta et al. | |
| 2017/0091717 A1 | 3/2017 | Chandraghatgi et al. | |
| 2017/0093646 A1 | 3/2017 | Chanda | |
| 2017/0097841 A1 | 4/2017 | Chang et al. | |
| 2017/0099188 A1 | 4/2017 | Chang et al. | |
| 2017/0104365 A1* | 4/2017 | Ghosh | ..................... H02J 9/061 |
| 2017/0111230 A1* | 4/2017 | Srinivasan | ............... H04L 41/12 |
| 2017/0118115 A1* | 4/2017 | Tsuji | ..................... H04L 45/745 |
| 2017/0126552 A1 | 5/2017 | Pfaff et al. | |
| 2017/0163442 A1 | 6/2017 | Shen et al. | |
| 2017/0223518 A1 | 8/2017 | Upadhyaya et al. | |
| 2017/0279826 A1 | 9/2017 | Mohanty et al. | |
| 2017/0289060 A1 | 10/2017 | Aftab et al. | |
| 2017/0302529 A1* | 10/2017 | Agarwal | ................. H04L 41/12 |
| 2017/0310580 A1 | 10/2017 | Caldwell et al. | |
| 2018/0006943 A1 | 1/2018 | Dubey | |
| 2018/0013791 A1 | 1/2018 | Healey et al. | |
| 2018/0026944 A1 | 1/2018 | Phillips | |
| 2018/0027079 A1* | 1/2018 | Ben Ali | ............... H04L 67/141 |
| 2018/0053001 A1 | 2/2018 | Folco et al. | |
| 2018/0062880 A1 | 3/2018 | Yu et al. | |
| 2018/0062881 A1 | 3/2018 | Chandrashekhar et al. | |
| 2018/0062917 A1 | 3/2018 | Chandrashekhar et al. | |
| 2018/0062923 A1 | 3/2018 | Katrekar et al. | |
| 2018/0062933 A1 | 3/2018 | Hira et al. | |
| 2018/0063036 A1 | 3/2018 | Chandrashekhar et al. | |
| 2018/0063086 A1 | 3/2018 | Hira et al. | |
| 2018/0063176 A1 | 3/2018 | Katrekar et al. | |
| 2018/0063193 A1 | 3/2018 | Chandrashekhar et al. | |
| 2018/0197122 A1 | 7/2018 | Kadt et al. | |

OTHER PUBLICATIONS

Non-Published commonly Owned U.S. Appl. No. 15/253,832, filed Aug. 31, 2016, 110 pages, Nicira Inc.
Non-Published commonly Owned U.S. Appl. No. 15/253,833, filed Aug. 31, 2016, 111 pages, Nicira Inc.
Non-Published commonly Owned U.S. Appl. No. 15/279,382, filed Sep. 28, 2016, 112 pages, Nicira Inc.
Non-Published commonly Owned U.S. Appl. No. 15/279,394, filed Sep. 28, 2016, 110 pages, Nicira Inc.
Non-Published commonly Owned U.S. Appl. No. 15/279,403, filed Sep. 28, 2016, 110 pages, Nicira Inc.
Non-Published commonly Owned U.S. Appl. No. 15/279,409, filed Sep. 28, 2016, 111 pages, Nicira Inc.
Non-Published commonly Owned U.S. Appl. No. 15/367,157, filed Dec. 1, 2016, 117 pages, Nicira Inc.
Non-Published commonly Owned U.S. Appl. No. 15/367,155, filed Dec. 1, 2016, 117 pages, Nicira Inc.
Non-Published Commonly Owned International Patent Application PCT/US17/13827, filed Jan. 17, 2017, 118 pages, Nicira, Inc.
PCT International Search Report and Written Opinion dated Jun. 28, 2017 for commonly owned International Patent Application PCT/US17/013827, 19 pages, Nicira, Inc.
Koponen, Teemu, et al., "Network Virtualization in Multi-tenant Datacenters," Proceedings of the 11th USENIX Symposium on Networked Systems Design and Implementation (NSDI'14), Apr. 2-4, 2014, 15 pages, Seattle, WA, USA.
Non-Published commonly Owned U.S. Appl. No. 15/831,369, filed Dec. 4, 2017, 47 pages, Nicira Inc.
Non-Published commonly Owned U.S. Appl. No. 15/831,372, filed Dec. 4, 2017, 47 pages, Nicira Inc.
Author Unknown, "Network Controller," Dec. 16, 2014, 4 pages, available at: https://web.archive.org/web/20150414112014/https://technet.microsoft.com/en-us/library/dn859239.aspx.
Sunliang, Huang, "Future SDN-based Data Center Network," Nov. 15, 2013, 5 pages, ZTE Corporation, available at http://wwwen.zte.com.cn/endata/magazine/ztetechnologies/2013/no6/articles/201311/t20131115_412737.html.
Wenjie, Zhu (Jerry), "Next Generation Service Overlay Networks," IEEE P1903 NGSON (3GPP Draft), Aug. 22, 2014, 24 pages, IEEE.

* cited by examiner

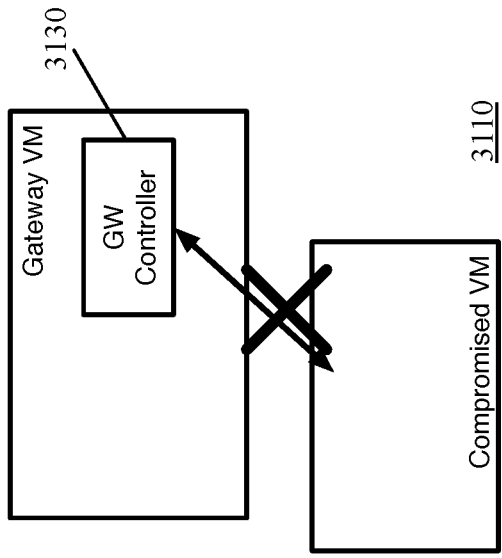
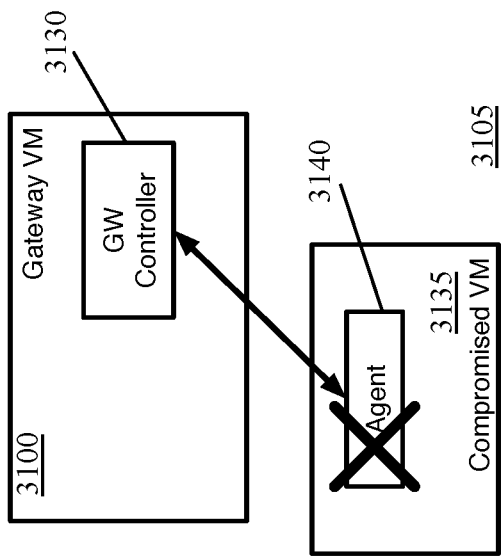
*Figure 31*

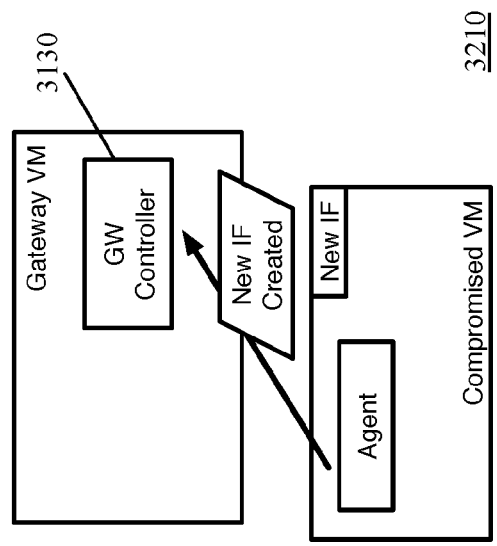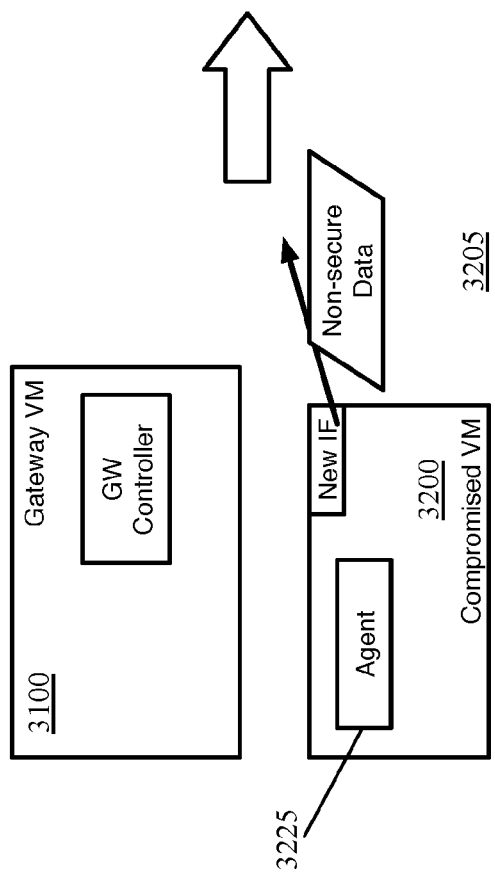
Figure 32

MANAGED FORWARDING ELEMENT EXECUTING IN SEPARATE NAMESPACE OF PUBLIC CLOUD DATA COMPUTE NODE THAN WORKLOAD APPLICATION

BACKGROUND

A common datacenter setup includes numerous servers that host virtual machines or other data compute nodes, with forwarding elements (e.g., software virtual switches) in the virtualization software of the server handling packet forwarding and network security for these data compute nodes. In a private datacenter (e.g., an enterprise network), technology exists that allows the owner of the datacenter to control the hypervisors of the host servers and thereby implement their own security and packet forwarding rules.

Public datacenters provide companies with the ability to expand or move their networks out of their own private datacenters, thereby reducing the cost and other burdens of the physical servers and the regular upkeep required for them. However, public datacenters have their own owners that control the virtualization software, and may not have as robust or transparent security capabilities. As such, some companies are hesitant to move their networks into these public datacenters because of the inability to exercise direct security control.

BRIEF SUMMARY

Some embodiments of the invention provide a network management and control system with the ability to manage a logical network that spans across (i) a private datacenter, in which the system can access and control the forwarding elements and (ii) one or more public multi-tenant datacenters in which the system does not have access to the forwarding elements. In the private datacenter of some embodiments, the network management and control system (referred as network control system herein) manages software forwarding elements that execute in the virtualization software (e.g., hypervisor) of the host machines, and therefore can implement the administrator's desired network forwarding and security policies. However, in the public datacenter, the network control system does not have access to the virtualization software, and therefore may not be able to implement the same networking policies to workloads operating in the public datacenter.

Some embodiments use a hierarchical network control system to expand the private datacenter management and control into the public datacenter. Specifically, some embodiments operate network controllers and managed forwarding elements inside virtual machines (VMs) or other data compute nodes (DCNs) operating in the public datacenter, in order to enforce network security and forwarding rules for packets sent to and from those DCNs. In some embodiments, the public datacenter(s) provide tenants with one or more isolated sets of resources (i.e., data compute nodes) over which the tenant has control, also referred to as virtual private clouds (VPCs). With some cloud providers, the tenant can define a virtual network with network subnets and routing tables, and/or place their DCNs into security groups defined by the public cloud provider.

To implement the hierarchical network control system, some embodiments implement a first level of network controller (referred to as a gateway controller) in a first DCN in each VPC (or a set of DCNs as active-standby gateway controllers in each VPC). These gateway DCNs also operate a gateway datapath in some embodiments, for communication with the logical network in other VPCs of the same datacenters or in other datacenters (either the private datacenter or another public datacenter), and with external networks. Within each workload DCN (i.e., a DCN executing a workload application, such as a web server, application server, database server, etc.), a managed forwarding element (MFE) is inserted into the datapath between the workload application and the network interface of the DCN. In addition, a local control agent executes on each of the workload DCNs, to configure their respective MFEs.

A central control plane cluster operating in the private datacenter (or in a separate VPC) distributes configuration rules to local controllers operating on host machines in the private datacenter based on the span of the rule (i.e., the MFEs that will need to implement the rule based on the type of rule and the logical ports to which the rule applies). For distributing these rules to the control system operating in the public datacenter VPC, the central controller views all of the logical ports that correspond to DCNs in the VPC as connected to a MFE controlled by the gateway controller. As such, all of these rules are pushed to the gateway controller by the central controller.

The gateway controller then does its own separate span calculation, in order to identify the MFEs in the VPC that require each rule received from the central controller, and distributes these rules to the local control agents operating to control the MFEs. The local control agents, upon receiving the rules, convert the rules into a format specific to the MFEs operating on their DCN. For instance, some embodiments use flow-based MFEs such as Open vSwitch (OVS) instances executing on the DCNs in the public datacenter VPC, in which case the local control agents convert the rules into flow entries and/or other configuration data for the OVS instance.

The gateway controller, in some embodiments, is also responsible for managing the overlay tunnels within its VPC. Because the central controller views the entire VPC as being a single MFE, it only configures a tunnel endpoint for the gateway controller node (i.e., a datapath configured on the gateway DCN. However, for communication between the workload applications within the VPC (and between the workload applications and the gateway datapath), the central controller does not configure the overlay. As such, the gateway controller sets up the tunnels (e.g., STT, GENEVE, etc. tunnels) between these VMs, by configuring the MAC to virtual tunnel endpoint (VTEP) IP bindings for each MFE. This information is also passed to the various local control agents on the workload DCNs, so that each MFE has the ability to tunnel packets to the other MFEs in the same VPC.

As mentioned, the gateway DCN includes a gateway controller and a datapath. The datapath, in some embodiments, operates as a gateway to connect the workloads in its VPC to (i) workloads connected to the logical network that operate in other VPCs and other datacenters and (ii) the external network. In some embodiments, the gateway DCN includes three network interfaces: an uplink interface that receives packets from and sends packets to the external networks (via a cloud provider internet gateway), a VTEP interface with an address on the local VPC subnet, and a control interface used exclusively for control traffic. In addition to the datapath and the gateway controller, some embodiments may include a distributed network encryption (DNE) manager for handling encryption keys used for securing traffic by the MFEs within the VPC (including, in some cases, the gateway datapath), a DHCP module for handling DHCP within the VPC, and a public cloud manager (PCM) that enables the management plane and gateway controller to interact with the public cloud management system.

An additional feature of the gateway DCN is the ability to handle compromised DCNs within its VPCs. For example, if a hacker gains access to a DCN executing a MFE, the hacker could (i) uninstall the local control agent and/or MFE, (ii) create a new interface that does not send traffic through the MFE, (iii) disconnect the existing interface from the MFE, or (iv) directly reprogram the MFE by disconnecting the MFE from the local control agent. If the interfaces are edited, or the control agent is disconnected from the MFE, then the agent will detect the change and notify the gateway controller of the problem. If the agent itself is removed, then the gateway controller will detect the loss of connectivity to the agent and identify that the DCN is compromised. In either case, the gateway controller manages the threat by ensuring that the DCNs will be unable to send or receive traffic.

The hierarchical network control system enables the implementation of a logical network that stretches from the private datacenter into the public datacenter. In different embodiments, different logical topologies may be implemented in different ways across datacenters. For example, some embodiments constrain the DCNs attached to a given logical switch to a single VPC in the private datacenter, or multiple VPCs within the same datacenter that are peered in order to operate similarly to a single VPC (although this logical switch may be logically connected through a logical router to a logical switch implemented in another VPC or another datacenter). In other embodiments, a single logical switch may have DCNs in multiple non-peered VPCs of the same public datacenter, multiple VPCs of multiple public datacenters, and/or both public and private datacenters.

While the above describes the extension of the control plane into a VPC and the gateway controller that enables this extension, these various components within the VPC must be initially configured and brought on-board with the management plane and central control plane in some embodiments. In some embodiments, the initial setup of the network and control system in the public cloud is managed by an operations manager (also referred to as a life cycle manager, or LCM). The network administrator interacts with this LCM (e.g., via a user interface) which uses the public cloud credentials of the network administrator to access the LCM and initially configure the various VMs in the VPC.

The LCM identifies each VPC in which the administrator wants to implement the logical network, and automatically instantiates a gateway DCN (or an active-standby set of gateway DCNs) in each of these VPCs. In some embodiments, the gateway DCN is provided as a prepackaged instance formatted for the particular public cloud provider. In addition, the LCM of some embodiments receives information from the administrator as to which DCNs existing in the VPC should be managed by the network control system, and provides logical switch and security group information regarding these DCNs to the management plane.

As part of the initial configuration, the gateway controller needs to be certified with the management plane (and verify the management plane application as valid), and similarly with the central controller application(s) with which the gateway controller interacts. In addition, each local control agent operating in one of the workload DCNs verifies itself with the gateway controller, in a hierarchical manner similar to that of the configuration rule distribution.

As mentioned, the MFEs of some embodiments are flow-based MFEs such as OVS instances. In different embodiments, these OVS instances may be setup in either a non-overlay mode, a first overlay mode that uses separate internal and external IP addresses, or a second overlay mode that uses the same IP address for its VTEP and the internal workload application. In all three cases, two bridges are set up in the OVS instance, but in three different manners for the three options. The workload application connects to an internal port on an integration bridge, which performs network security and/or logical forwarding operations. A physical interface (PIF) bridge connects to the virtual network interface controller (VNIC) of the DCN on which the MFE operates.

In the non-overlay mode of some embodiments, the IP address of the workload application is the same as the IP address of the VM network interface (assigned by the cloud provider) that faces the cloud provider network (referred to herein as the underlay network). In this case, the MFE does not perform any packet forwarding, and instead is configured to perform micro-segmentation and/or network security processing such as distributed firewall rule processing. This network security processing is performed by the integration bridge, and packets are by default sent to the PIF bridge via a patch port between the two bridges.

In other embodiments, the MFEs are configured such that the internal interface to which the workload application connects (e.g., on the integration bridge) has a different IP address than the outward-facing interface (on the PIF bridge). In this case, the MFE (e.g., the integration bridge) performs packet forwarding according to the logical network configuration in addition to any network security or other processing. Packets are sent by the workload application using a first internal IP address that maps to the logical switch port to which the workload DCN connects, then encapsulated using the IP address assigned by the cloud provider (i.e., that of the VNIC). The integration bridge performs the encapsulation in some embodiments and sends the packet through a second network stack to a VTEP on the PIF bridge.

Finally, the network administrator may want to keep the same IP addresses for workloads that are already in existence, but make use of the logical network for packet processing, tunneling, etc. In this third case, the MFE is configured in a separate namespace of the workload VM from the application. This enables the workload application to connect to an interface of the namespace having its existing IP address, and then use a veth pair to connect this interface to the MFE in its separate namespace, which uses the same IP address for its VTEP. The use of separate namespaces for the workload application and for the MFE allows separate network stacks to use the same IP address, in some embodiments.

The above-described use of overlay encapsulation primarily to east-west traffic between the workload DCNs in a public cloud VPC. However, many logical networks include workloads that should be accessible by external clients. For instance, a typical three-tier (web servers, app servers, database servers) setup will require at least the web servers to be able to connect with clients via the Internet. Because the VPC subnets are typically private IP addresses that may be re-used by numerous VPCs of different tenants (and re-used at various different datacenters), network address translation (NAT) is generally used to modify the source IP address of outgoing packets (and, correspondingly, the destination IP address of incoming packets) from the internally-used private IP address to a public IP address.

Furthermore, when the logical network is implemented at least partially in a public datacenter, the actual translation to a public IP address might need to be performed by the cloud provider's internet gateway, rather than by any of the MFEs managed by the network control system. However, because the cloud provider will not have assigned the internal IP addresses used in the overlay mode, packets should not be sent to the provider's gateway using these internal addresses. Instead, the MFEs of some embodiments perform their own NAT to translate the internal IP addresses to addresses registered with the cloud provider.

Different embodiments may implement this address translation in a different manner. Some embodiments apply NAT as part of the gateway datapath. In this case, north-bound packets are tunneled from the source MFE to the gateway, where the IP address is translated in a consistent manner to a secondary IP address. Some embodiments use a NAT table that maps each internal workload IP address to a secondary IP address registered with the cloud provider. All of these secondary IP addresses are then associated with the gateway's northbound interface, and the cloud provider's gateway performs translation from these secondary IP addresses to public IP addresses. In the centralized case, other network services may also be applied at the gateway, such as service chaining (sending packets out to third-party service appliances for various middlebox processing), intrusion detection, north-south firewall, VPN, audit logging, etc. In addition, when the gateway performs NAT, any load balancing will need to be performed in the gateway as well (the cloud provider may not be able to perform load balancing in this case because as far as the provider's gateway is concerned, all traffic is sent to the gateway interface).

Other embodiments perform the first level of NAT in a distributed manner, in the MFE operating on the source DCN (the destination DCN for incoming traffic). In this case, for outgoing packets, the MFE at the source DCN performs address translation and sends the translated packet directly to the cloud provider gateway, bypassing the gateway. As such, the source MFE differentiates between overlay traffic that it encapsulates using its VTEP IP and north-south traffic that it sends unencapsulated onto the cloud provider underlay network (in some embodiments, using the same IP address as the VTEP). Because this traffic (in both directions) does not pass through the gateway, any service chaining, intrusion detection, north-south firewall rules, logging, etc. is performed at the MFE operating on the workload VM.

For load balancing, distributed internal NAT allows the use of existing load balancing features of the cloud provider. Instead of using multiple public IP addresses, a single public IP address (or only a small number of addresses) can be used, and all incoming connections are sent to this address. The internet gateway (or a special load balancing appliance) of the cloud provider performs load balancing to distribute these connections across different workload VMs (which still need to perform their own internal NAT) in a balanced manner.

For packets sent between logical network workloads, some embodiments enable the use of distributed network encryption (DNE) managed by the network control system. In some embodiments, DNE for the DCNs in the public datacenter is only available between DCNs operating within the same VPC or within peered VPCs, while in other embodiments DNE is available between any two DCNs attached to logical ports of the logical network (including between a workload DCN and a gateway).

Distributed network encryption, in some embodiments, allows the network control system administrator to set encryption and/or integrity rules for packets. These rules define (i) what packets the rule will be applied to and (ii) the encryption and/or integrity requirements for those packets. Some embodiments define the packets to which a rule applies in term of the source and destination of the packet. These source and destination endpoints may be defined based on IP addresses or address ranges, MAC addresses, logical switch ports, virtual interfaces, L4 port numbers and ranges, etc., including combinations thereof.

Each rule, in addition, specifies whether packets meeting the source and destination characteristics require encryption (along with authentication), only authentication, or plaintext (which may be used as a setting in order to allow broadcast packets. Encryption requires the use of a key to encrypt a portion or all of a packet (e.g., the entire inner packet, only the L4 and up headers, the entire inner and out packet for a tunneled packet, etc.), while authentication does not encrypt the packet but uses the key to create authentication data that the destination can use to verify that the packet was not tampered with during transmission.

To have the MFEs in a network implement the DNE rules, the network control system needs to distribute the keys to the MFEs in a secure manner. Some embodiments use a DNE module in the gateway DCN in order to communicate with the DNE aspects of the network control system and distribute keys to the MFEs operating in the workload DCNs in its VPC. For each rule requiring the use of an encryption key, the DNE module receives a ticket for a key from the central controller. The DNE module uses the ticket to request the key from a secure key management storage, which verifies that the ticket is authentic and returns a master key. The DNE module of some embodiments calculates session keys for each connection specified by the rule (e.g., a single connection between two workloads in the VPC, multiple connections within the VPC, connections between workloads and the gateway, etc.) and distributes these keys to the appropriate local control agents.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 31 and 32 illustrate examples of a gateway controller identifying compromised VMs in its public datacenter VPC.

DETAILED DESCRIPTION OF THE INVENTION

Figure 1:
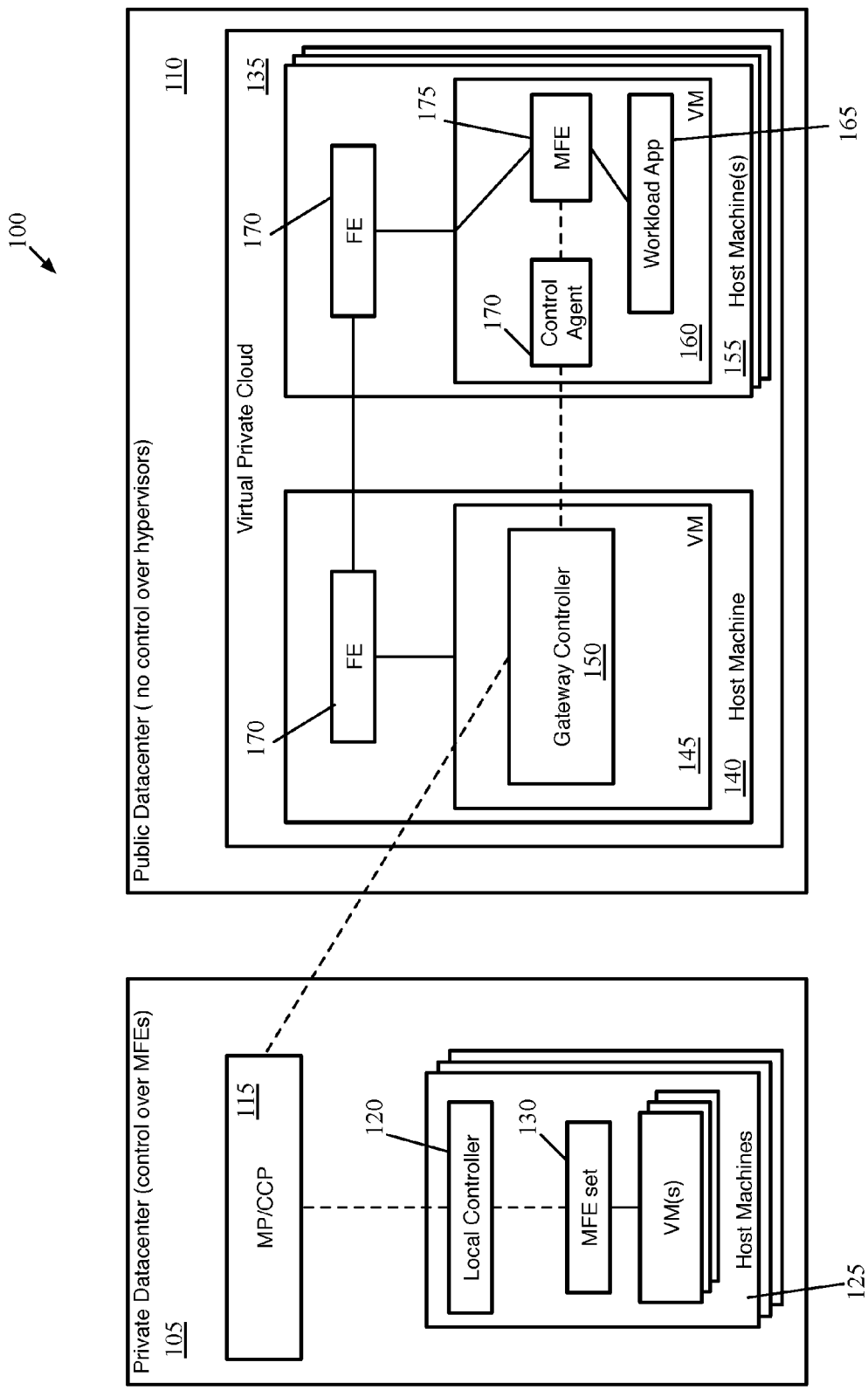
FIG. 1 conceptually illustrates a hierarchical network control system of some embodiments that manages forwarding elements in both a private datacenter and a public datacenter.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments of the invention provide a network management and control system with the ability to manage a logical network that spans across (i) a private datacenter, in which the system can access and control the forwarding elements and (ii) one or more public multi-tenant datacenters in which the system does not have access to the forwarding elements. In the private datacenter of some embodiments, the network management and control system (referred as network control system herein) manages software forwarding elements that execute in the virtualization software (e.g., hypervisor) of the host machines, and therefore can implement the administrator's desired network forwarding and security policies. However, in the public datacenter, the network control system does not have access to the virtualization software, and therefore may not be able to implement the same networking policies to workloads operating in the public datacenter.

Some embodiments use a hierarchical network control system to expand the private datacenter management and control into the public datacenter. Specifically, some embodiments operate network controllers and managed forwarding elements inside virtual machines (VMs) or other data compute nodes (DCNs) operating in the public datacenter, in order to enforce network security and forwarding rules for packets sent to and from those DCNs. In some embodiments, the public datacenter(s) provide tenants with one or more isolated sets of resources (i.e., data compute nodes) over which the tenant has control, also referred to as virtual private clouds (VPCs). With some cloud providers, the tenant can define a virtual network with network subnets and routing tables, and/or place their DCNs into security groups defined by the public cloud provider.

To implement the hierarchical network control system, some embodiments implement a first level of network controller (referred to as a gateway controller) in a first DCN in each VPC (or a set of DCNs as active-standby gateway controllers in each VPC). These gateway DCNs also operate a gateway datapath in some embodiments, for communication with the logical network in other VPCs of the same datacenters or in other datacenters (either the private datacenter or another public datacenter), and with external networks. Within each workload DCN (i.e., a DCN executing a workload application, such as a web server, application server, database server, etc.), a managed forwarding element (MFE) is inserted into the datapath between the workload application and the network interface of the DCN. In addition, a local control agent executes on each of the workload DCNs, to configure their respective MFEs.

A central control plane cluster operating in the private datacenter (or in a separate VPC) distributes configuration rules to local controllers operating on host machines in the private datacenter based on the span of the rule (i.e., the MFEs that will need to implement the rule based on the type of rule and the logical ports to which the rule applies). For distributing these rules to the control system operating in the public datacenter VPC, the central controller views all of the logical ports that correspond to DCNs in the VPC as connected to a MFE controlled by the gateway controller. As such, all of these rules are pushed to the gateway controller by the central controller.

The gateway controller then does its own separate span calculation, in order to identify the MFEs in the VPC that require each rule received from the central controller, and distributes these rules to the local control agents operating to control the MFEs. The local control agents, upon receiving the rules, convert the rules into a format specific to the MFEs operating on their DCN. For instance, some embodiments use flow-based MFEs such as Open vSwitch (OVS) instances executing on the DCNs in the public datacenter VPC, in which case the local control agents convert the rules into flow entries and/or other configuration data for the OVS instance.

The gateway controller, in some embodiments, is also responsible for managing the overlay tunnels within its VPC. Because the central controller views the entire VPC as being a single MFE, it only configures a tunnel endpoint for the gateway controller node (i.e., a datapath configured on the gateway DCN. However, for communication between the workload applications within the VPC (and between the workload applications and the gateway datapath), the central controller does not configure the overlay. As such, the gateway controller sets up the tunnels (e.g., STT, GENEVE, etc. tunnels) between these VMs, by configuring the MAC to virtual tunnel endpoint (VTEP) IP bindings for each MFE. This information is also passed to the various local control agents on the workload DCNs, so that each MFE has the ability to tunnel packets to the other MFEs in the same VPC.

As mentioned, the gateway DCN includes a gateway controller and a datapath. The datapath, in some embodiments, operates as a gateway to connect the workloads in its VPC to (i) workloads connected to the logical network that operate in other VPCs and other datacenters and (ii) the external network. In some embodiments, the gateway DCN includes three network interfaces: an uplink interface that receives packets from and sends packets to the external networks (via a cloud provider internet gateway), a VTEP interface with an address on the local VPC subnet, and a control interface used exclusively for control traffic. In addition to the datapath and the gateway controller, some embodiments may include a distributed network encryption (DNE) manager for handling encryption keys used for securing traffic by the MFEs within the VPC (including, in some cases, the gateway datapath), a DHCP module for handling DHCP within the VPC, and a public cloud manager (PCM) that enables the management plane and gateway controller to interact with the public cloud management system.

An additional feature of the gateway DCN is the ability to handle compromised DCNs within its VPCs. For example, if a hacker gains access to a DCN executing a MFE, the hacker could (i) uninstall the local control agent and/or MFE, (ii) create a new interface that does not send traffic through the MFE, (iii) disconnect the existing interface from the MFE, or (iv) directly reprogram the MFE by disconnecting the MFE from the local control agent. If the interfaces are edited, or the control agent is disconnected from the MFE, then the agent will detect the change and notify the gateway controller of the problem. If the agent itself is removed, then the gateway controller will detect the loss of connectivity to the agent and identify that the DCN is compromised. In either case, the gateway controller manages the threat by ensuring that the DCNs will be unable to send or receive traffic.

The hierarchical network control system enables the implementation of a logical network that stretches from the private datacenter into the public datacenter. In different embodiments, different logical topologies may be implemented in different ways across datacenters. For example, some embodiments constrain the DCNs attached to a given logical switch to a single VPC in the private datacenter, or multiple VPCs within the same datacenter that are peered in order to operate similarly to a single VPC (although this logical switch may be logically connected through a logical router to a logical switch implemented in another VPC or another datacenter). In other embodiments, a single logical switch may have DCNs in multiple non-peered VPCs of the same public datacenter, multiple VPCs of multiple public datacenters, and/or both public and private datacenters.

While the above describes the extension of the control plane into a VPC and the gateway controller that enables this extension, these various components within the VPC must be initially configured and brought on-board with the management plane and central control plane in some embodiments. In some embodiments, the initial setup of the network and control system in the public cloud is managed by an operations manager (also referred to as a life cycle manager, or LCM). The network administrator interacts with this LCM (e.g., via a user interface) which uses the public cloud credentials of the network administrator to access the LCM and initially configure the various VMs in the VPC.

The LCM identifies each VPC in which the administrator wants to implement the logical network, and automatically instantiates a gateway DCN (or an active-standby set of gateway DCNs) in each of these VPCs. In some embodiments, the gateway DCN is provided as a prepackaged instance formatted for the particular public cloud provider. In addition, the LCM of some embodiments receives information from the administrator as to which DCNs existing in the VPC should be managed by the network control system, and provides logical switch and security group information regarding these DCNs to the management plane.

As part of the initial configuration, the gateway controller needs to be certified with the management plane (and verify the management plane application as valid), and similarly with the central controller application(s) with which the gateway controller interacts. In addition, each local control agent operating in one of the workload DCNs verifies itself with the gateway controller, in a hierarchical manner similar to that of the configuration rule distribution.

As mentioned, the MFEs of some embodiments are flow-based MFEs such as OVS instances. In different embodiments, these OVS instances may be setup in either a non-overlay mode, a first overlay mode that uses separate internal and external IP addresses, or a second overlay mode that uses the same IP address for its VTEP and the internal workload application. In all three cases, two bridges are set up in the OVS instance, but in three different manners for the three options. The workload application connects to an internal port on an integration bridge, which performs network security and/or logical forwarding operations. A physical interface (PIF) bridge connects to the virtual network interface controller (VNIC) of the DCN on which the MFE operates.

In the non-overlay mode of some embodiments, the IP address of the workload application is the same as the IP address of the VM network interface (assigned by the cloud provider) that faces the cloud provider network (referred to herein as the underlay network). In this case, the MFE does not perform any packet forwarding, and instead is configured to perform micro-segmentation and/or network security processing such as distributed firewall rule processing. This network security processing is performed by the integration bridge, and packets are by default sent to the PIF bridge via a patch port between the two bridges.

In other embodiments, the MFEs are configured such that the internal interface to which the workload application connects (e.g., on the integration bridge) has a different IP address than the outward-facing interface (on the PIF bridge). In this case, the MFE (e.g., the integration bridge) performs packet forwarding according to the logical network configuration in addition to any network security or other processing. Packets are sent by the workload application using a first internal IP address that maps to the logical switch port to which the workload DCN connects, then encapsulated using the IP address assigned by the cloud provider (i.e., that of the VNIC). The integration bridge performs the encapsulation in some embodiments and sends the packet through a second network stack to a VTEP on the PIF bridge.

Finally, the network administrator may want to keep the same IP addresses for workloads that are already in existence, but make use of the logical network for packet processing, tunneling, etc. In this third case, the MFE is configured in a separate namespace of the workload VM from the application. This enables the workload application to connect to an interface of the namespace having its existing IP address, and then use a veth pair to connect this interface to the MFE in its separate namespace, which uses the same IP address for its VTEP. The use of separate namespaces for the workload application and for the MFE allows separate network stacks to use the same IP address, in some embodiments.

The above-described use of overlay encapsulation primarily to east-west traffic between the workload DCNs in a public cloud VPC. However, many logical networks include workloads that should be accessible by external clients. For instance, a typical three-tier (web servers, app servers, database servers) setup will require at least the web servers to be able to connect with clients via the Internet. Because the VPC subnets are typically private IP addresses that may be re-used by numerous VPCs of different tenants (and re-used at various different datacenters), network address translation (NAT) is generally used to modify the source IP address of outgoing packets (and, correspondingly, the destination IP address of incoming packets) from the internally-used private IP address to a public IP address.

Furthermore, when the logical network is implemented at least partially in a public datacenter, the actual translation to a public IP address might need to be performed by the cloud provider's internet gateway, rather than by any of the MFEs managed by the network control system. However, because the cloud provider will not have assigned the internal IP addresses used in the overlay mode, packets should not be sent to the provider's gateway using these internal addresses. Instead, the MFEs of some embodiments perform their own NAT to translate the internal IP addresses to addresses registered with the cloud provider.

Different embodiments may implement this address translation in a different manner. Some embodiments apply NAT as part of the gateway datapath. In this case, north-bound packets are tunneled from the source MFE to the gateway, where the IP address is translated in a consistent manner to a secondary IP address. Some embodiments use a NAT table that maps each internal workload IP address to a secondary IP address registered with the cloud provider. All of these secondary IP addresses are then associated with the gateway's northbound interface, and the cloud provider's gateway performs translation from these secondary IP addresses to public IP addresses. In the centralized case, other network services may also be applied at the gateway, such as service chaining (sending packets out to third-party service appliances for various middlebox processing), intrusion detection, north-south firewall, VPN, audit logging, etc. In addition, when the gateway performs NAT, any load balancing will need to be performed in the gateway as well (the cloud provider may not be able to perform load balancing in this case because as far as the provider's gateway is concerned, all traffic is sent to the gateway interface).

Other embodiments perform the first level of NAT in a distributed manner, in the MFE operating on the source DCN (the destination DCN for incoming traffic). In this case, for outgoing packets, the MFE at the source DCN performs address translation and sends the translated packet directly to the cloud provider gateway, bypassing the gateway. As such, the source MFE differentiates between overlay traffic that it encapsulates using its VTEP IP and north-south traffic that it sends unencapsulated onto the cloud provider underlay network (in some embodiments, using the same IP address as the VTEP). Because this traffic (in both directions) does not pass through the gateway, any service chaining, intrusion detection, north-south firewall rules, logging, etc. is performed at the MFE operating on the workload VM.

For load balancing, distributed internal NAT allows the use of existing load balancing features of the cloud provider. Instead of using multiple public IP addresses, a single public IP address (or only a small number of addresses) can be used, and all incoming connections are sent to this address. The internet gateway (or a special load balancing appliance) of the cloud provider performs load balancing to distribute these connections across different workload VMs (which still need to perform their own internal NAT) in a balanced manner.

For packets sent between logical network workloads, some embodiments enable the use of distributed network encryption (DNE) managed by the network control system. In some embodiments, DNE for the DCNs in the public datacenter is only available between DCNs operating within the same VPC or within peered VPCs, while in other embodiments DNE is available between any two DCNs attached to logical ports of the logical network (including between a workload DCN and a gateway).

Distributed network encryption, in some embodiments, allows the network control system administrator to set encryption and/or integrity rules for packets. These rules define (i) what packets the rule will be applied to and (ii) the encryption and/or integrity requirements for those packets. Some embodiments define the packets to which a rule applies in term of the source and destination of the packet. These source and destination endpoints may be defined based on IP addresses or address ranges, MAC addresses, logical switch ports, virtual interfaces, L4 port numbers and ranges, etc., including combinations thereof.

Each rule, in addition, specifies whether packets meeting the source and destination characteristics require encryption (along with authentication), only authentication, or plaintext (which may be used as a setting in order to allow broadcast packets. Encryption requires the use of a key to encrypt a portion or all of a packet (e.g., the entire inner packet, only the L4 and up headers, the entire inner and out packet for a tunneled packet, etc.), while authentication does not encrypt the packet but uses the key to create authentication data that the destination can use to verify that the packet was not tampered with during transmission.

To have the MFEs in a network implement the DNE rules, the network control system needs to distribute the keys to the MFEs in a secure manner. Some embodiments use a DNE module in the gateway DCN in order to communicate with the DNE aspects of the network control system and distribute keys to the MFEs operating in the workload DCNs in its VPC. For each rule requiring the use of an encryption key, the DNE module receives a ticket for a key from the central controller. The DNE module uses the ticket to request the key from a secure key management storage, which verifies that the ticket is authentic and returns a master key. The DNE module of some embodiments calculates session keys for each connection specified by the rule (e.g., a single connection between two workloads in the VPC, multiple connections within the VPC, connections between workloads and the gateway, etc.) and distributes these keys to the appropriate local control agents.

The above describes the network management and control system of some embodiments. The following sections describe different aspects of the expansion of the system into public datacenters in greater detail. Section I describes the hierarchical network control system of some embodiments, while Section II describes the architecture of gateway DCNs. Next, Section III describes the initial configuration of a public cloud VPC. Section VI then describes different physical implementations of logical topologies, stretching topologies across multiple VPCs and/or datacenters. Section V describes different configurations for the MFEs operating in workload DCNs, while Section VI describes the provision of NAT and other services in both centralized and distributed manners. Next, Section VII describes the implementation of distributed network encryption in the public datacenter, while Section VIII describes threat detection and handling. Finally, Section IX describes an electronic system with which some embodiments of the invention are implemented.

I. Hierarchical Network Control System

As mentioned above, some embodiments use a hierarchical network control system to expand the management of a private datacenter into a public multi-tenant datacenter ("public cloud") such as Amazon Web Services, Microsoft Azure, etc. FIG. 1 conceptually illustrates such a hierarchical network control system 100 of some embodiments that manages forwarding elements in both a private datacenter 105 and a public datacenter 110. Both of the datacenters 105 and 110 include host machines for hosting virtual machines (VMs) or other data compute nodes (DCNs). In the private datacenter 105, the network control system has the ability to manage the hypervisors (virtualization software), and therefore the forwarding elements that are integrated with those hypervisors. However, in the public datacenter 110, the network control system does not have access to the hypervisors, as these are controlled by the owner of the datacenter.

As shown, the network control system within the private datacenter includes a management plane/central control plane (MP/CCP) cluster 115 and a local controller 120 on each of numerous host machines 125. The local controller 120 exercises direct control over a set of managed forwarding elements (MFEs) 130 on the host machine. As shown, VMs (or other data compute nodes) on the host machine connect to the MFE set 130 (e.g., via a virtual network interface controller (VNIC)) in order to send and receive data traffic. Based on forwarding and configuration data received via the network control system, the MFE set 130 performs forwarding and network security (e.g., distributed firewall (DFW) rules, access control list (ACL) rules, etc.) operations on the data packets sent to and from these VMs. The MFE set may be a single managed forwarding element (e.g., a single virtual switch that performs L2, L3, and additional processing) in some embodiments, or may be a combination of various managed forwarding and security elements (e.g., a set of filters, L2 switch(es), L3 router(s), etc. that all operate within the virtualization software).

As described herein, the MP/CCP cluster 115 includes a management plane (MP) and central control plane (CCP) with distinct features. In some such embodiments, the MP and CCP are separate applications that may operate on the same or different physical machines. In addition, the MP/CCP cluster 115 of some embodiments may include a single management plane application with a single central control plane application, a cluster of management plane applications with a cluster of central control plane applications, a single management plane application with a cluster of central control plane applications, or vice versa. It should be understood that in other embodiments, the various features of these applications could be combined into a single manager or controller application (or cluster of such applications) without departing from the invention.

In some embodiments, the management plane provides application programming interfaces (APIs) through which administrators (e.g., via a cloud management application) of the private datacenter 105 enter configuration data to configure one or more logical networks to be implemented within the private datacenter 105 and/or one or more public datacenter(s). The logical network configuration from the administrator may include a network of logical L2 switches and logical L3 routers (with the logical router possibly including connections to other logical routers and/or subnets external to the logical network (e.g., in order to connect to the Internet)). The logical network configuration data may also include network address translation (NAT) rules, load balancing rules, rules for sending packets to third-party services, network security rules (e.g., DFW rules), etc.

The management plane of some embodiments converts the logical network configuration into rules defining logical forwarding elements (e.g., logical switches and routers), logical ports for the logical forwarding elements, security and encryption rules for the logical ports, etc. The central control plane of some embodiments handles the distribution of these rules to the appropriate MFEs. In some embodiments, the central control plane keeps track of the location in the physical network of each logical port, and therefore the first-hop managed forwarding element for that logical port. Upon receiving a rule for a particular logical port and/or logical forwarding element, the central control plane identifies the span for that rule (i.e., the MFEs that need to receive the rule in order to properly implement the logical network) and distributes the rule to local controllers 120 that directly interact with the MFEs 130 on their respective host machines 125. The span for a rule regarding a logical port may be just the MFE(s) on the host where that logical port exists (i.e., the MFE set on the host machine that hosts the DCN attached to the logical port), or numerous MFEs (e.g., every MFE on a host machines that hosts a DCN attached to the same logical network as that logical port).

The above describes the network control system of some embodiments for a datacenter in which the network control system has access to the virtualization software of the host machines, and thus can control the networking for numerous DCNs on a single host machine (by controlling the MFEs in the virtualization software). However, when expanding a logical network into the public cloud, the network control system no longer has access to the virtualization software, as the public cloud provider's network management system manages the host machines. The networking and security provided by the public cloud provider may or may not be adequate for the prospective tenant, but in any case is not under the direct control of that tenant and may not mesh adequately with their on-premises network (in the private datacenter).

Thus, FIG. 1 illustrates a technique of some embodiments to expand the network control system 100 into the public datacenter 110 without requiring control over the virtualization software of the host machines in the public datacenter. This figure illustrates a virtual private cloud (VPC) 135 created in the public datacenter 110 for the owner of the private datacenter 105 (referred to herein as the tenant of the public datacenter). The virtual private cloud 135 (or similar constructs, depending on the public cloud provider) is a logically isolated set of resources of the public datacenter 110 over which the tenant has control. With some cloud providers, the tenant can define a virtual network with network subnets and routing tables and/or place their VMs into security groups (that are defined by the public cloud provider). However, the tenant does not have direct control over the forwarding elements in the cloud provider, and may not have the ability to configure their network security features as desired.

Within the VPC, the figure illustrates a first host machine 140 that hosts a VM 145 with a gateway controller 150 and a set of additional host machines 155 that host VMs 160 with workload applications 165. It should be understood that while the host machines 140 and 155 are shown as being part of the VPC, these host machines may also host additional VMs belonging to different VPCs (of the same or other tenants) in some embodiments. As shown, each of the host machines 140 and 155 includes a forwarding element 170. In some embodiments, the host machines include forwarding elements within their virtualization software that are managed by the public cloud provider. The network control system 100, however, has no access to these forwarding elements, as they are part of the cloud provider network.

Though shown here as a single VM 145, in some embodiments at least two VMs with gateway controllers are instantiated in the VPC 135. One of the gateway controllers operates as an active controller and the other as a standby controller in case the active controller fails (e.g., due to the host machine it operates on failing, the VM failing or requiring a restart, etc.). The other aspects of the gateway VM (described below) also operate in the active-standby mode as well, in some embodiments. That is, an active gateway VM and a standby gateway VM are instantiated in some embodiments.

The VM 145, in some embodiments, is a prepackaged machine image that includes a gateway controller 150. The gateway controller 150 receives data from the MP/CCP cluster 115 (e.g., from the central control plane application) for all of the logical ports implemented within the VPC 135. In some embodiments, in the view of the MP/CCP cluster 115, the gateway controller is equivalent to a local controller 120 for a MFE with numerous logical ports connected (assuming there are numerous logical ports mapped to VMs operating in the VPC 135). As such, the MP/CCP cluster 115 identifies the gateway controller 150 as a recipient for all of the configuration rules required for any of the logical ports in the VPC 135. Though not shown here, in some embodiments the gateway VM 145 also operates a gateway datapath for providing centralized services (e.g., NAT, load balancing, etc.) and for processing/routing packets sent between the VMs 160 and external sources (e.g., via the Internet). The rules required by this datapath are also distributed to the gateway controller 150, in some embodiments. The gateway VM of some embodiments is described in greater detail below by reference to FIG. 7.

The VMs 160 are workload VMs, each of which runs a workload application 165 (e.g., a web server, application server, database server, etc.). In addition, to enable first-hop processing configurable by the network control system 100, each of these VMs also operates a control agent 170 and a managed forwarding element 175 (e.g., a virtual switch such as Open vSwitch). The gateway controller 150, upon receiving a configuration rule, identifies the span of that rule within the VPC 135 (i.e., the various MFEs 175 that require the rule), and passes these configuration rules to the appropriate control agents 170. The control agent 170 uses this data to configure the MFE 175 to apply networking and/or security rules to packet sent to and from the workload application 165, similar to how the local controller 120 configures the MFEs 130.

Figure 2:
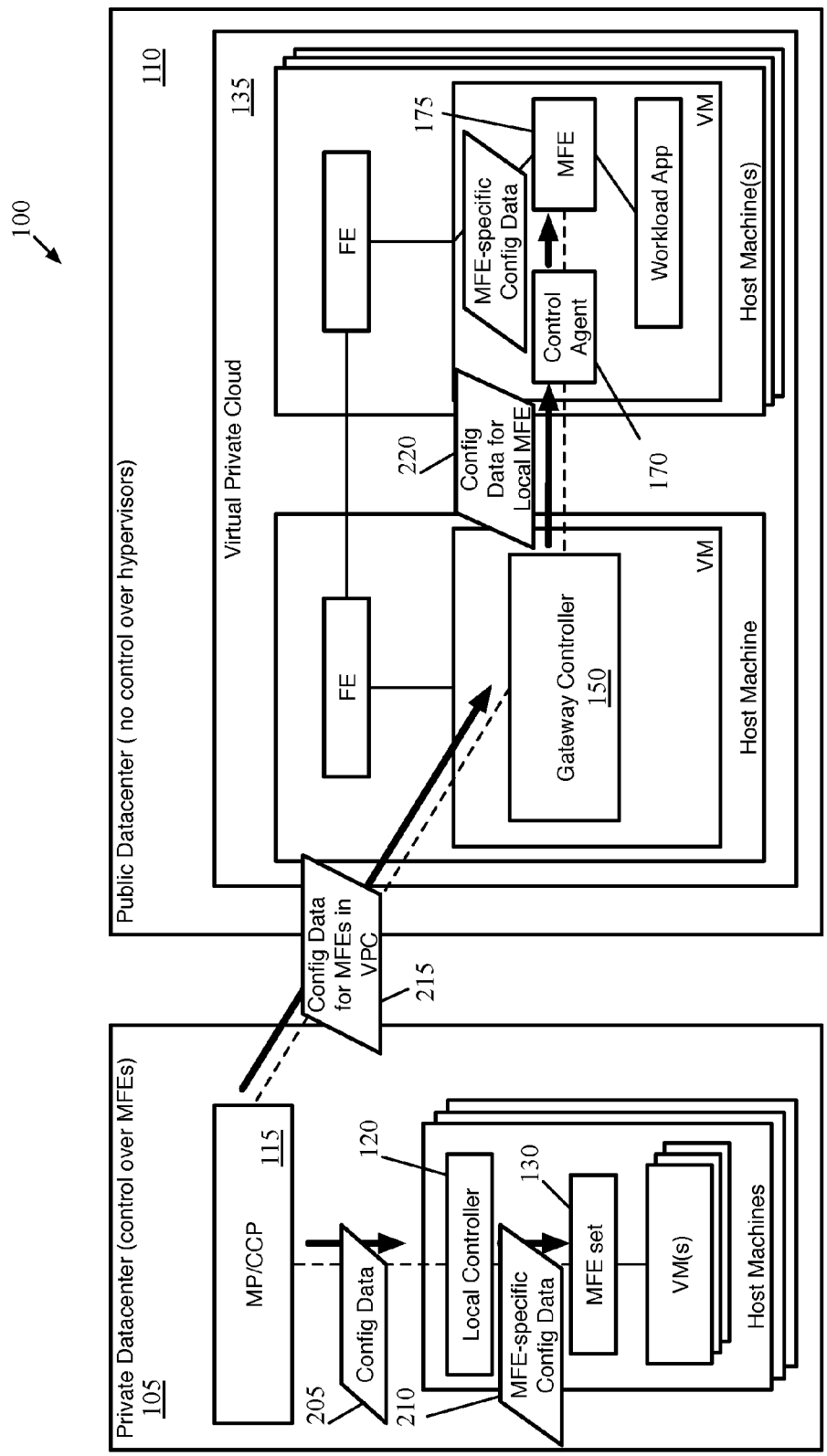
FIG. 2 conceptually illustrates the flow of control data through the network control system of FIG. 1.

FIG. 2 conceptually illustrates the flow of control data through the network control system 100. The MP/CCP cluster 115 generates a new configuration rule (e.g., based on a change within the network, configuration data received by the management plane when an administrator modifies a logical network, etc.). In some embodiments, the management plane generates this rule and provides the rule to the central control plane, which determines the span of the configuration rule. As shown, the MP/CCP cluster 115 passes this data 205 to the local controllers 120 within the private datacenter 105 that require the data. Within the private datacenter, the information is distributed via a control channel. The local controllers that receive this data 205 convert the data into a format appropriate for the specific type of MFE present in its host machines. In some embodiments, the datacenter might include host machines that use feature-based forwarding elements such as ESX hypervisors, flow-based forwarding elements such as kernel virtual machine (KVM) hypervisors running Open vSwitch (OVS), or other types of software forwarding elements. The local controllers 120 receive the configuration data 205 and convert it into the appropriate format (e.g., flow entries for OVS), then distribute this configuration data 210 to their local MFEs 130.

For configuration rules whose span includes the VPC 135 in the public datacenter 110, the MP/CCP cluster 115 sends configuration data 215 to the gateway controller 150. The configuration data 215 is the same format as the configuration data 205 in some embodiments, as the MP/CCP cluster views the gateway controller as being simply another local controller. However, to send the configuration data 215 to the gateway controller 150, some embodiments use a virtual private network (VPN) setup between the private datacenter 105 and the VPC 135. Some embodiments use the same VPN for control traffic as for logical network data traffic between the private datacenter and VPC, while other embodiments use separate data. To the cloud provider forwarding elements, the control traffic appears the same as any other data being sent over the VPN. The gateway controller 150 receives the configuration data 215, and calculates the span within its VPC 135 for each rule. For each WE 175 within the VPC 135, the gateway controller 150 sends the appropriate configuration data 220 to the local control agent 170 operating on the same VM as the WE. This configuration data 220 is sent to the control agents 170 through the cloud provider's network (e.g., through the forwarding elements 170).

In addition, in some embodiments, the gateway controller 150 is responsible for managing the overlay network within the VPC 135. Because the MP/CCP cluster 115 views the entire VPC as having a single managed forwarding element, the cluster only configures a tunnel endpoint for the gateway controller node (i.e., the datapath configured on the gateway VM 145). However, for communication between the workload applications within the VPC (and between the workload applications and the gateway datapath), the MP/CCP cluster does not configure the overlay. As such, the gateway controller 150 sets up the tunnels (e.g., STT, GENEVE, etc. tunnels) between these VMs by configuring the MAC:VTEP IP bindings, etc. The overly data (e.g., the MAC:VTEP IP bindings) is also passed to the various control agents 170 as part of the configuration data 220.

Once the control agent 170 receives the configuration data, the control agent 170 converts this data into a format specific to the WE 175 and provides the WE-specific configuration data 225 to the MFE 175. In some embodiments, this configuration data 225 comprises flow entries for a flow-based WE and/or database entries for a WE configuration database. For instance, in some embodiments the control agent 170 uses the OpenFlow and/or OVSDB protocols to communicate with the WE 175 when the WE is an OVS instance.

As an example, initial configuration data sent from the MP/CCP cluster 115 to the gateway controller might specify that a new logical port has been added to a logical switch, and that logical port is attached to a MFE operating in the VPC. In this example, at least one logical port of the same logical switch is already attached to a different MFE operating in the VPC. The configuration data received by the gateway controller 150 does not specify the specific location because, to the CCP, the logical port connects to the gateway.

The gateway controller 150 calculates the span of this configuration data as the MFEs within the VPC to which all of the additional logical ports on the same logical switch connect. These MFEs need the information so that they can properly forward packets to the workload application corresponding to the new logical port, and so the gateway controller 150 distributes this data to the local control agents 170 for each of these identified MFEs. The gateway controller 150 also distributes the overlay information (e.g., MAC:VTEP IP binding) for the MFE to which the new logical port connects to each of the identified MFEs, and distributes the overlay information for these other identified MFEs to the MFE to which the new logical port connects.

The control agent 170 for a particular MFE 175 uses this information to generate logical forwarding flow entries (i.e., specifying that packets addressed to the MAC address associated with the logical port are forwarded logically to that logical port, as well as egress mapping and physical forwarding (tunneling) flow entries (i.e., mapping the logical port to the physical destination and appending the encapsulation information to send packets to the other MFEs) for its MFE. Similarly, the control agent 170 for the MFE 175 to which the new logical port connects will receive information about the other logical port locations, and generate its own corresponding flow entries so as to be able to send packets to and receive packets from the corresponding MFEs.

Figure 3:
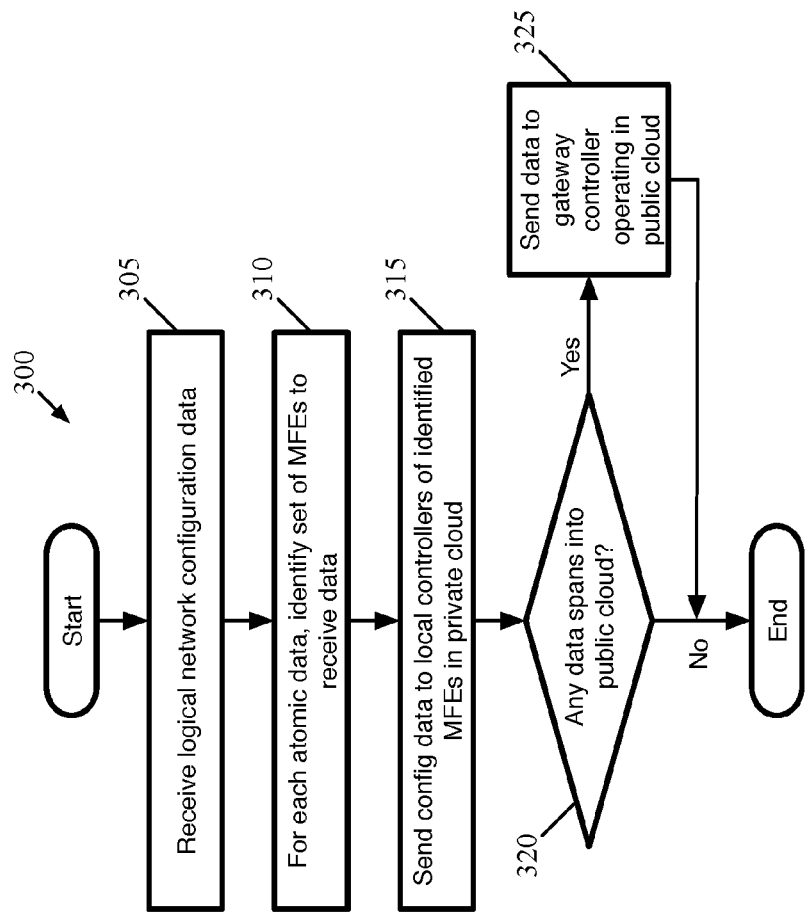
FIG. 3 conceptually illustrates a process of some embodiments to distribute configuration data to managed forwarding elements located in both private and public datacenters.

FIG. 3 conceptually illustrates a process 300 of some embodiments to distribute configuration data to managed forwarding elements located in both private and public datacenters. The process 300 is performed by a central controller (i.e., a central control plane application) in some embodiments, based on configuration data received from a management plane application. It should be understood that, in some embodiments, the distribution of the configuration data may actually be performed by multiple central controllers in a cluster, as different controllers in the cluster may handle the distribution to different forwarding elements. In addition, this process assumes that the management plane and central control plane are located in a private (enterprise) datacenter. If the MP/CCP cluster is operating within a VPC of a public datacenter, then it performs similar span calculations for each piece of configuration data and distributes the data to gateway controllers for each VPC in which the logical network operates.

As shown, the process 300 begins by receiving (at 305) logical network configuration data. As explained above, in some embodiments the management plane generates configuration rules for a logical network based on input received from an administrator (e.g., through a cloud management application). The management plane provides these rules to the central control plane. This configuration data might relate to the creation or deletion of logical forwarding elements or logical ports of these logical forwarding elements, new configuration data regarding one of these logical entities, new security group definitions or distributed firewall rules, etc.

The process then identifies (at 310), for each atomic piece of data (e.g., each rule), the set of MFEs to receive that piece of data. The central controller determines the span for each rule based on the topology of the logical network and its physical implementation, as well as the type of rule and logical entities (e.g., logical forwarding elements and logical ports) to which the rule pertains. For instance, a distributed network encryption rule for communication between two logical ports may only need to be distributed to the MFEs to which those logical ports directly attach. On the other hand, a rule regarding a logical port to MAC address binding will be distributed to not only the MFE to which the logical port attaches but also to any other MFE that might be processing packets for which the logical port is a destination (e.g., any MFE to which a logical port attaches that could send packets to the specific logical port without the packets requiring centralized processing).

Having determined the span of each atomic piece of configuration data, the process sends (at 315) the configuration data to local controllers for identified MFEs in the private cloud. That is, the central control plane distributes the data to the appropriate local controllers in its same datacenter.

The process also determines (at 320) whether the span of any of the data includes the logical ports located in the public cloud. As described above, the central control plane views all of the logical ports in a public cloud VPC as attached to a single MFE. This process assumes a single VPC in a single public datacenter, as shown in FIG. 1. As described below, multiple VPCs in one or more public datacenters are possible in some embodiments, in which case a similar determination would need to be made for each VPC. If data needs to be sent to the MFEs in the public cloud, the process sends (at 325) this data to the gateway controller operating in the public cloud. In some embodiments, the data is distributed using a VPN connection between the central controller and the DCN on which the gateway operates.

Figure 4:
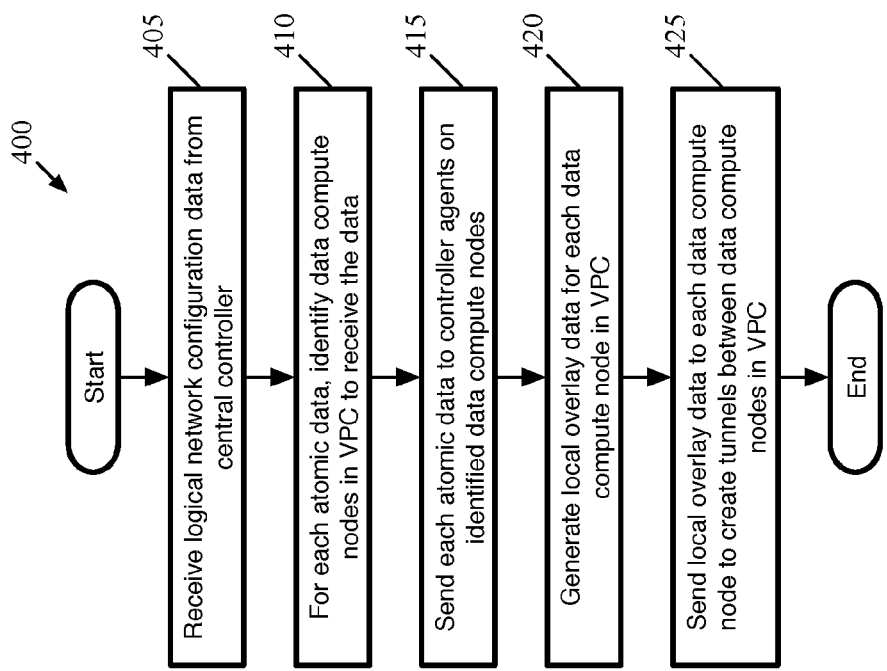
FIG. 4 conceptually illustrates a process of some embodiments for distributing logical network configuration data to the MFEs within a VPC.

FIG. 4 conceptually illustrates a process 400 of some embodiments for distributing logical network configuration data to the MFEs within a VPC. The process 400 is performed by a gateway controller 400 in some embodiments, in order to distribute this data to the MFEs within its VPCs that require the data. As shown, the process begins by receiving (at 405) logical network configuration data from a central controller. This central controller may be located in a private datacenter managed by the public datacenter tenant, in a different VPC of the same public datacenter as the gateway controller, or a different public datacenter.

For each atomic piece of data (e.g., each rule), the process 400 identifies (at 410) the data compute nodes in the VPC to receive the data. As mentioned with respect to FIG. 3, each rule has a span (i.e., the MFEs that require the rule) based on the topology of the logical network and its physical implementation, as well as the type of rule and logical entities (e.g., logical forwarding elements and logical ports) to which the rule pertains. Thus, within the VPC, each rule may not need to be distributed by the gateway controller to every control agent. The process then sends (at 415) each configuration rule to the local control agents on the data compute nodes identified for the rule. The configuration data, in some embodiments, is sent over the physical network of the public cloud provider, in the same manner as standard data packets.

The process 400 also generates (at 420) local overlay data for each data compute node in the VPC. Because the central controller views the entire VPC as connected to a single MFE, the central controller only defines a virtual tunnel endpoint (VTEP) for the gateway VM. However, for communication within the VPC, the various MFEs use an overlay network as well. Thus, the gateway controller defines the MAC:IP bindings for these VTEPs (with the IP addresses determined based on the private (or public, depending on the configuration) IP addresses configured by the tenant for the VMs in the VPC. The setup of these overlays will be discussed in greater detail below in Sections IV and V.

The process then sends (at 425) the local overlay data to each of the data compute nodes within the VPC in order to create tunnels between the data compute nodes in the VPC. This allows the MFEs at each of these data compute nodes to properly encapsulate packets to be sent from their VTEP to the VTEPs of other MFEs within the VPC (depending on the setup of the public datacenter, these packets will then be encapsulated again by the provider-controlled forwarding element on the host machine, as described in more detail below).

It should be understood that the process 400 is a conceptual process and that the gateway controller may not perform these operations in the linear manner illustrated. For instance, some embodiments perform the operations 420 and 425 anytime a new data compute node is created in the VPC, while the operations 405-415 are performed anytime a new configuration rule is received from the central controller (which will occur when a new data compute node is created, but also anytime other configuration aspects are changed).

The example shown in FIGS. 1 and 2 illustrates the case in which a logical network spans both the private datacenter 105 and a single VPC 135 in the public datacenter. It should be understood that different variations are also possible in other embodiments. For instance, FIG. 5 conceptually illustrates an example of a network control system for a logical network implemented entirely within a public datacenter 500. In this case, the MP/CCP cluster 505 operates on host machines 510 within a first VPC 515. Like the gateway controller, the management plane and/or central control plane applications could be provided as part of preconfigured VM images that can be instantiated in the public datacenter 500. The management plane and/or central control plane applications could operate on the same VM or VMs or on separate VMs, and each could operate as a cluster of multiple VMs on multiple host machines in some embodiments. The VPC 520 is configured in the same manner as the VPC 135 shown in FIG. 1, with a first VM 525 (or two VMs in active-standby configuration) hosting the gateway controller 530 and control agents 535 managing MFEs 540 on the workload VMs 545.

Figure 6:
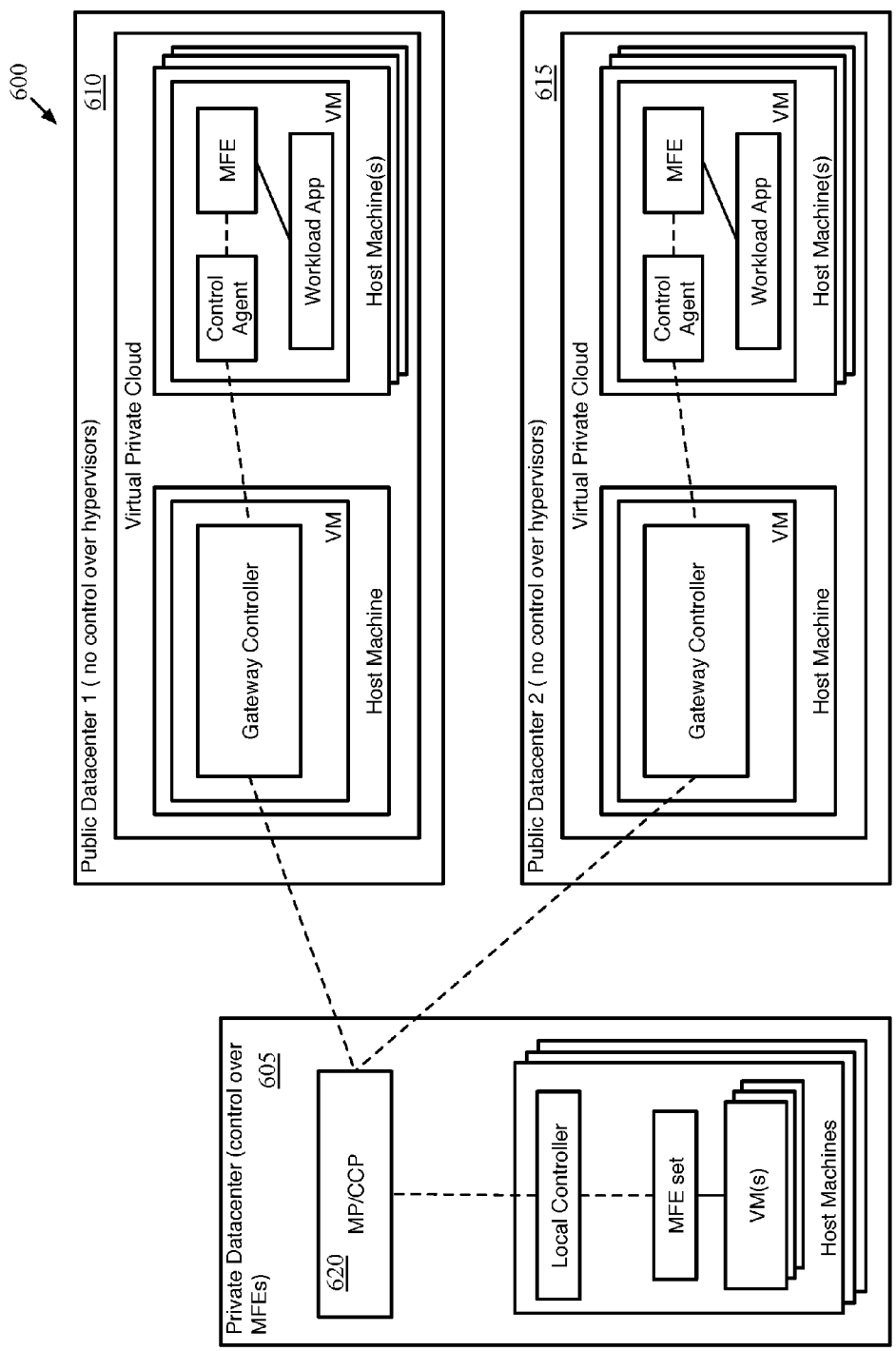
FIG. 6 conceptually illustrates a network control system of some embodiments that expands a logical network into multiple public datacenters.

FIG. 6 conceptually illustrates a network control system 600 of some embodiments that expands a logical network into multiple public datacenters 610 and 615. As shown in this figure, the MP/CCP cluster 620 operates in a private datacenter 605, and manages MFEs in the datacenter via local controllers, as described above. In this example, the logical network is expanded into first and second public datacenters 610 and 615, each of which includes a VPC with a gateway VM instance (or an active-standby pair) and multiple host machines configured as described by reference to FIG. 1. The MP/CCP cluster 620 views each of these gateway controllers as akin to a single local controller, and therefore sends each of the gateway controllers all of the configuration data for the workloads in their respective VPCs.

Figure 5:
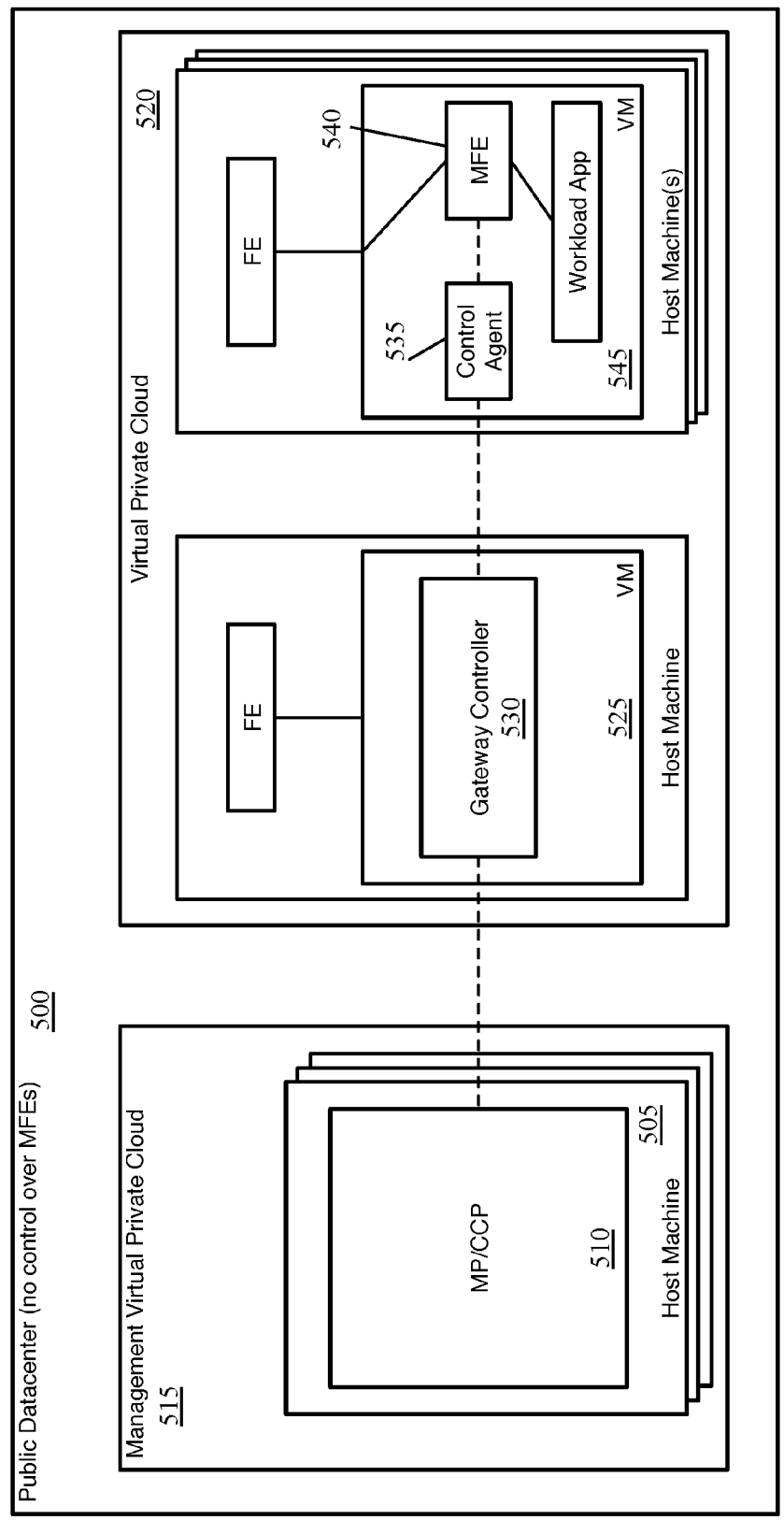
FIG. 5 conceptually illustrates an example of a network control system for a logical network implemented entirely within a public datacenter.

It should be understood that these different architectures in FIGS. 1, 5, and 6 are only three of numerous possible architectures. For instance, a network control system could be stretched across multiple VPCs in one cloud provider, with one gateway controller (or active-standby pair) in each VPC, or use a single gateway controller (or active-standby pair) in one of the VPCs (or a separate VPC) to manage all of the VPCs.

II. Gateway VM Architecture

The above section describes the network controller functions (span computation and overlay management) of the gateway VM of some embodiments. These gateway VMs also perform several other functions in some embodiments, including interfacing with the public cloud APIs, DHCP, DNE management, and a gateway for data packets sent to and from the DCNs in the VPC.

Figure 7:
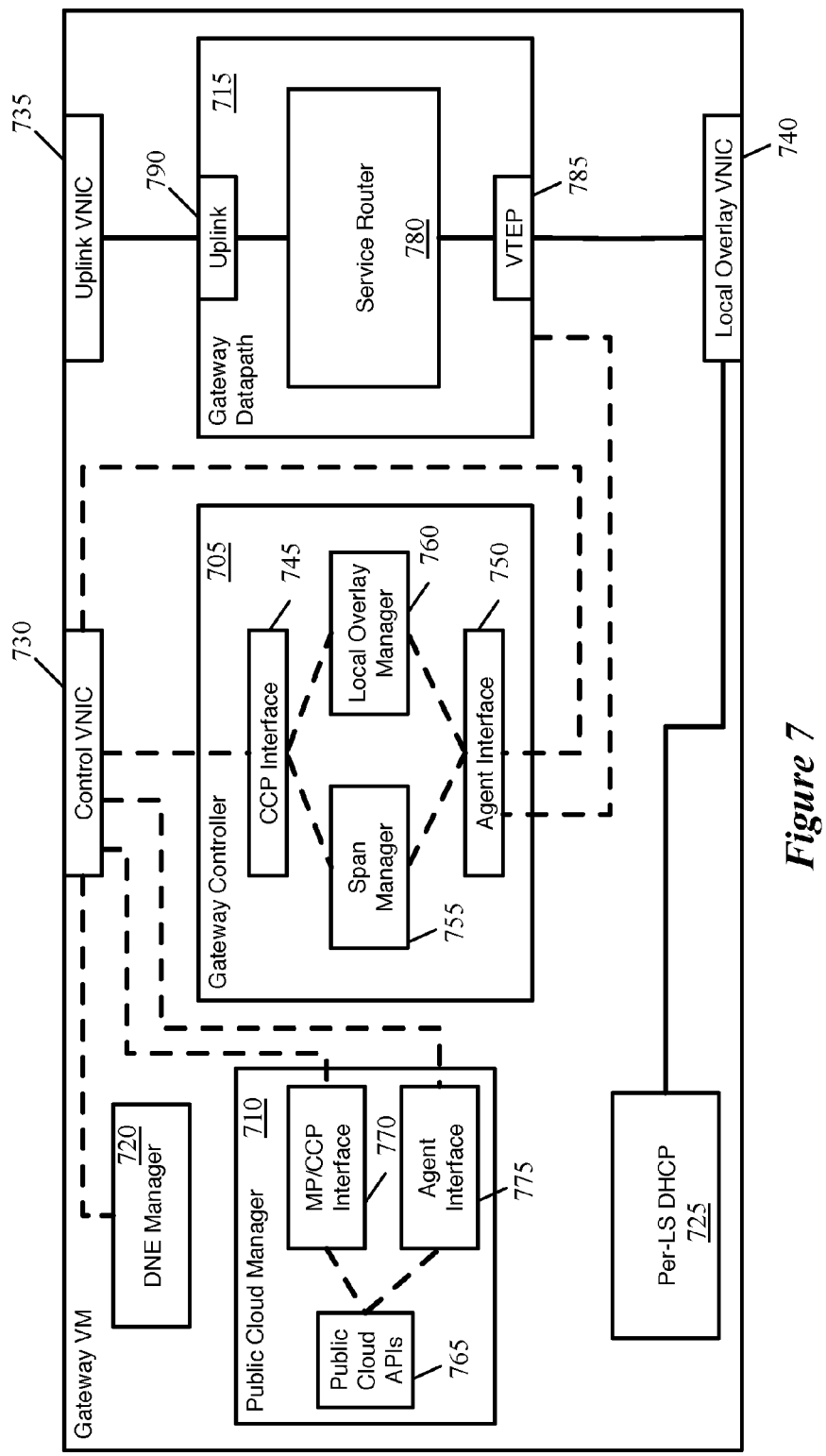
FIG. 7 conceptually illustrates the architecture of a gateway VM of some embodiments.

FIG. 7 conceptually illustrates the architecture of such a gateway VM 700 of some embodiments. As mentioned, in some embodiments, the gateway VM is packaged as a preconfigured VM image (e.g., an Amazon Machine Image) for a specific cloud provider that the administrator of the logical network can instantiate as one of the VMs in the public datacenter VPC. As shown, the gateway VM 700 includes a gateway controller 705, a public cloud manager (PCM) 710, a gateway datapath 715, a DNE management module 720, and a DHCP module 725. It should be understood that, in different embodiments, gateway VMs may include different combinations of these modules as well all or some of these modules along with other modules.

In addition, the gateway VM includes three interfaces—a control VNIC 730, an uplink VNIC 735, and a local overlay VNIC 740. In some embodiments, the control VNIC 730 is used only for control path communications between the local agents on the other hosts in the VPC and the gateway controller 705, and between the MP/CCP cluster and the gateway controller 705 (as well as any communication of the DNE manager 720 or PCM). Some embodiments program security groups in the cloud provider to only allow specific traffic from the CCP and the local agents on this interface, in order to prevent denial of service (DoS) attacks from a compromised VM in the VPC. In addition, to ensure that the control channels stay running even when a malicious VM is sending a high volume of traffic to the gateway datapath 715, some embodiments pin the gateway controller processes (and the agents operating in the other VMs in the VPC) to specific virtual CPUs that do not perform the data plane processing. The uplink VNIC 735 handles north-south packets sent from the gateway datapath 715 towards external destinations (and received from those external destinations), which will generally not be encapsulated by the datapath. The local overlay VNIC 740 handles east-west data packets that the gateway datapath processes to send packets between workload applications within the VPC and data compute nodes in other VPCs, other public datacenters, and/or the on-premises datacenter.

The gateway controller 705 of some embodiments performs the functions described in the above Section I. Through the control VNIC 735, a central control plane interface 745 of the gateway controller 705 receives configuration rules from the central controller and provides information back to the central controller (e.g., when a new VM is created and thus a new logical port needs to be associated with the gateway). The agent interface 750 distributes configuration data to the local agents operating on data compute nodes in the VPC and receives updates from these local agents when events occur on the data compute node (e.g., the creation of an interface on the data compute node, etc.). In some embodiments, both of these interfaces 745 and 750 are part of a netcpa agent operating on the gateway VM.

The gateway controller 705 also includes a span manager 755 and a local overlay manager 760. The span manager receives configuration rules sent from the central controller (via the CCP interface 745), determines the MFEs executing on data compute nodes within the VPC (including, possibly the gateway datapath 715), and sends these configuration rules to the appropriate agents in the VPC. Some embodiments use different adapters and/or different queues for each agent within the VPC, placing each received rule into one or more such queues.

The local overlay manager 760 handles the management of the overlay network within the VPC (for MFEs operating in overlay mode, as described below in Section V). Assuming the MFEs in the VPC are operating in overlay mode, each agent on a VM in the VPC (and the gateway datapath 715) provides its VTEP IP address and MAC address bound to that VTEP IP address to the controller in some embodiments. The local overlay manager 760 of some embodiments identifies which MFEs in the VPC require each provided binding, and handles the provision of this information to the MFEs in the VPC so that data packets sent to the MAC address can be encapsulated using the corresponding VTEP IP address. A first MFE requires the MAC:VTEP IP binding of a second MFE if there is the possibility of the workload application attached to the first MFE sending a data packet to the workload application attached to the second MFE without the data packet needing to travel through the gateway datapath 715.

The public cloud manager (PCM) 710 of some embodiments enables the network control system to interact with the compute management system of the public cloud provider. Specifically, the PCM of some embodiments uses public cloud APIs to retrieve inventory, configuration, status, and statistics information from the public cloud provider. In the examples shown herein, the PCM 710 operates on the gateway VM, though in other embodiments the PCM may operate in the MP/CCP cluster (e.g., in the private datacenter).

As shown, the PCM includes public cloud APIs 765 and interfaces 770 and 775 for communicating with the agent and with the MP/CCP cluster. In some embodiments, the PCM only communicates directly with the management plane, and any communications to and from the agents pass through the gateway controller. The public cloud APIs 765 are used to communicate with the public cloud compute manager.

The gateway datapath 715 operates as a gateway in some embodiments, to handle packet processing for data packets (i) between data compute nodes within its local VPC and other data compute nodes of the same logical network located in different VPCs of the same cloud provider, different VPCs of different cloud providers, and/or the private datacenter and (ii) between data compute nodes within its local VPC and sources/destinations external to the logical network (e.g., clients accessing the data compute nodes through the Internet). The datapath 715 shows a service router 780 (a centralized routing component of a logical router of some embodiments) within the datapath, but it should be understood that the datapath may also include configuration for one or more logical switches and a distributed routing component that are implemented within the VPC.

In different embodiments, the datapath 715 may be a datapath development kit (DPDK)-based datapath, an OVS datapath as used in the data compute nodes of some embodiments, or another type of datapath that can be implemented within a VM. When an OVS datapath is implemented, some embodiments use the OVS datapath for the logical switch and/or distributed router processing, while implementing a separate namespace to handle the centralized routing component processing. On the other hand, some embodiments that use a DPDK-based datapath implement the configuration for all of the logical forwarding element components within the same datapath. Additional description of the gateway datapath of some embodiments is described in U.S. Patent Publication 2016/0226759, which is incorporated herein by reference.

As shown, the datapath 715 uses two ports, a VTEP port 785 and an uplink port 790, which connect to the local overlay VNIC 740 and uplink VNIC 735 respectively. The gateway datapath 715 receives packets sent from local workloads in the VPC via the VTEP 785, which uses an IP address assigned by the cloud provider on the VPC subnet (i.e., on the same subnet as the addresses assigned to the other VMs in the VPC. This VTEP port 785 is also used for packets sent to and from data compute nodes in the private datacenter and other VPCs in the same or other public datacenters, as all of this traffic is encapsulated for the logical network in some embodiments.

The uplink port 790 is used by the datapath 715 to send and receive north-south data traffic between the workloads in the VPC and external sources/destinations. These data packets are sent out of the uplink port without encapsulation (though they may be tunneled separately on the cloud provider network to a cloud provider gateway). In addition, these packets may require centralized services, such as NAT, distributed firewall rules for north-south traffic, service chaining, etc.

For logical L2 switches stretched across multiple VPCs and/or datacenters, the gateway datapath 715 acts as an intermediate forwarding element, simply tunneling the packet (using the VTEP 785) to a similarly configured gateway at another VPC or to a destination forwarding element in the private datacenter (via a VPN). Some embodiments additionally perform security operations (e.g., applying distributed firewall rules for such packets), and decrypt and then re-encrypt (in order to examine and potentially process) packets that are sent between two endpoints requiring encryption. Packets sent between two different logical switches may also require the service router processing 780 if centralized services (NAT, load balancing, etc.) are required for such packets.

The DNE manager 720 interacts with the network control system in order to manage encryption rules and keys for the data compute nodes located in the network. When the central control plane receives rules specifying encryption and/or authentication requirements for packets sent to or from any of the workloads operating in the local VPC, the central controller distributes these rules to the DNE manager 720 (either directly or via the gateway controller 705). As described in more detail below and in U.S. Patent Application 62/380,338, filed Aug. 26, 2016 and which is incorporated herein by reference, the encryption rules of some embodiments include a ticket used by a controller (in this case, the DNE manager) to acquire a key from a key storage (also referred to as key manager), often located in the private datacenter.

The DNE manager 720 uses this ticket to request a key from the key manager, which provides a master key for the encryption rule. The DNE manager 720 receives the master key and uses this key to generate a session key for the rule. The session key, in some embodiments, is generated as a function of the master key and one or more additional parameters specific to the two endpoints that will be performing encryption. The DNE manager (e.g., via the gateway controller 705) distributes the generated session keys to the appropriate endpoints.

Finally, the DHCP module 725 acts as a DHCP server to perform IP address management within the VPC. Some embodiments use the same DHCP module 725 for multiple subnets if multiple logical switches are implemented within the VPC. When a VM in the VPC boots up, in some embodiments it uses the DHCP server in its local gateway in order to receive its network address.

III. Initial VPC Configuration

While the above sections describe the extension of the control plane into a VPC and the gateway controller that enables this extension, these various components within the VPC must be initially configured and brought on-board with the management plane and central control plane in some embodiments. In some embodiments, the initial setup of the network and control system in the public cloud is managed by an operations manager (also referred to as a life cycle manager, or LCM). The network administrator interacts with this LCM (e.g., via a user interface) which uses the public cloud credentials of the network administrator to access the LCM and initially configure the various VMs in the VPC.

Figure 8:
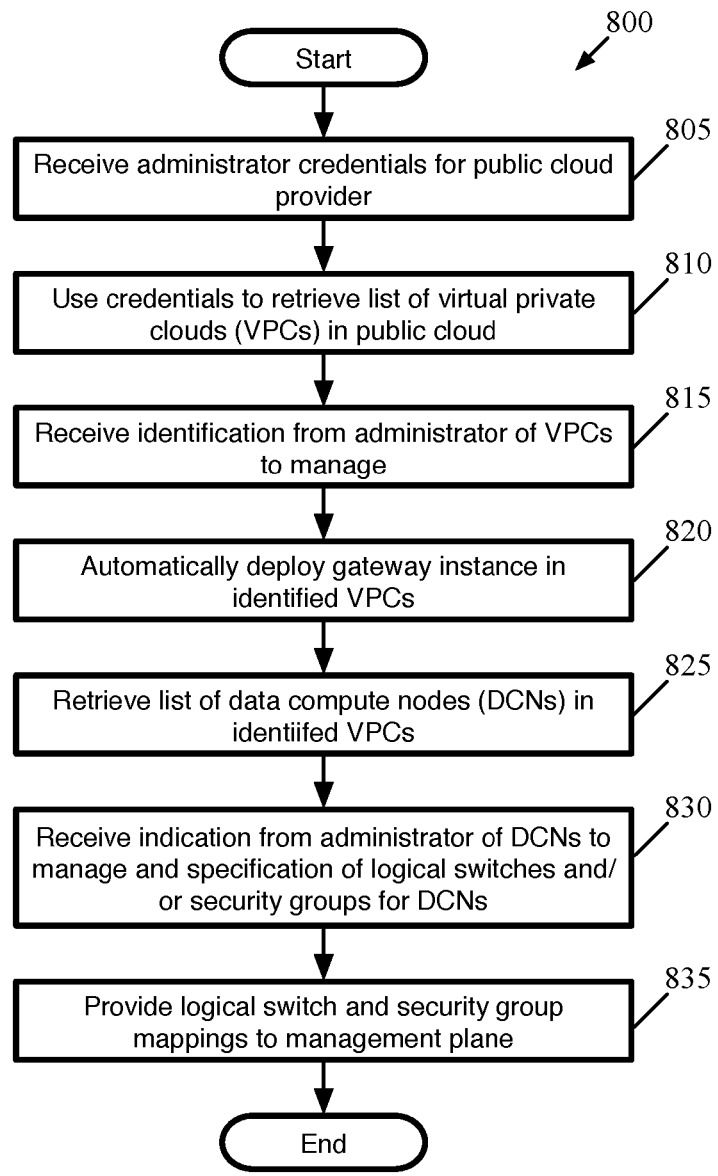
FIG. 8 conceptually illustrates a process of some embodiments to initially extend a network control system managing a private datacenter into one or more VPCs of a public datacenter.

FIG. 8 conceptually illustrates a process 800 of some embodiments to initially extend a network control system managing a private datacenter into one or more VPCs of a public datacenter. The process 800 is performed, in some embodiments, by a life cycle manager (LCM) that interacts with the private datacenter management systems (e.g., with the compute manager) to perform this initial setup. The LCM is different from the PCM described above, as the LCM handles initial configuration of the DCNs in the public datacenter (including the gateway DCN on which the PCM runs), while the PCM handles ongoing interaction with the public datacenter management system. It should be understood that the process 800 is only one possible workflow for the LCM, and assumes that DCNs are already instantiated in the public datacenter. Other workflows might exist in some embodiments, for example for the case in which VPCs have been defined but DCNs do not yet exist in these VPCs.

As shown, the process 800 begins by receiving (at 805) administrator credentials for the public cloud provider of the datacenter within which the network will be configured. The credentials may include a username and password, as well as potentially other credentials required by the datacenter. The LCM of some embodiments may provide a single interface that allows the user to interact with multiple public cloud providers, such as Amazon, Google, Microsoft, etc. in a unified manner, and through which the user inputs these credentials. The process then uses (at 810) these credentials to retrieve a list of VPCs in the public cloud that are registered to the user. For this, the LCM provides these credentials to an interface of the public cloud management system, and is provided with the requested data regarding the user's VPCs. In some embodiments, the user will have already configured a number of VPCs in the public cloud, with subnets allocated, etc.

Next, the process 800 receives (at 815) an identification from the administrator/user as to which VPCs will be managed by the network control system. These are the VPCs into which the logical network will be extended in some embodiments. In some embodiments, the LCM presents the list through a user interface to the administrator, who then selects some or all of the available VPCs through the interface. The process automatically deploys (at 820) a gateway instance in each of the identified VPCs. The gateway instance, in some embodiments, is a VM having the components described above in Section II. As mentioned, in some embodiments each gateway VM is an instance of a prepackaged machine image specifically designed for the public cloud provider into whose datacenter the gateway VM is deployed.

In addition, the process 800 retrieves (at 825) a list of DCNs (e.g., VMs) in the VPCs identified by the administrator. As with the retrieval of the VPCs, in some embodiments the LCM queries the public cloud management system for this information. The process receives (at 830) an indication from the administrator as to which of the existing DCNs should be managed by the network control system, as well as a specification of the logical switches and/or security groups for these DCNs. In this case, the logical network topology and security group definitions have already been configured, and the DCNs in the public cloud are mapped to these entities. The process 800 provides (at 835) the logical switch and security group mappings to the management plane, so that the appropriate configuration rules can be generated and distributed via the network control system for processing packets sent to and from these DCNs.

Figure 9:
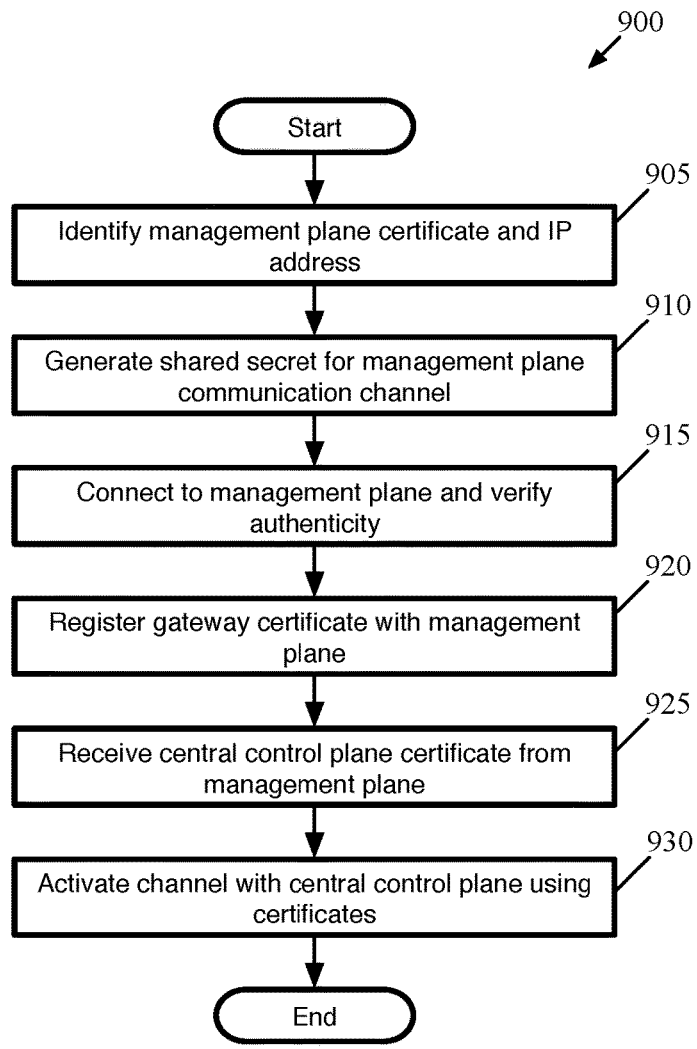
FIG. 9 conceptually illustrates a process of some embodiments for certifying a gateway with the management and control planes.

The above process describes the LCM instantiating a gateway DCN in a public cloud; however, the gateway controller on that gateway DCN will also need to be certified with the MP/CCP cluster in some embodiments, in order to receive data from the central controllers. FIG. 9 conceptually illustrates a process 900 of some embodiments for certifying a gateway controller with the management and control planes. The process 900 is performed by the gateway controller upon instantiation of a gateway DCN containing the gateway controller.

As shown, the process 900 begins by identifying (at 905) a management plane certificate and IP address. In some embodiments, the management plane certificate is provided with the instantiation of the gateway DCN for a particular management plane instance or cluster of instances. In some embodiments, this information is provided with the gateway DCN (e.g., in a configuration file to which the gateway controller has access). The process also generates (at 910) a shared secret used for a secure communication channel with the management plane. Some embodiments generate this shared secret based on a command-line interface (CLI) command input by the administrator or the LCM.

Next, using the shared secret and the management plane IP address, the process 900 connects (at 915) to the management plane and verifies the authenticity of the management plane (i.e., to ensure that it has connected to an authorized management plane application. In some embodiments, the management plane application provides its certificate (or a value, such as a hash, generated from the certificate) and the gateway verifies that the certificates match. The process also registers (at 920) its own certificate with the management plane. This certificate is also verified by the management plane in some embodiments. At this point, the gateway has a connection to the management plane cluster, but not the central control plane, and thus cannot receive configuration rules.

Next, the process 900 receives (at 925) a central control plane certificate from the management plane, via the communication channel set up with the management plane. Using the central control plane certificate, the process activates (at 930) a channel with the central control plane. The management plane will have provided the gateway certificate to the central control plane, which verifies that the certificate received from the gateway matches this certificate. Similarly, the gateway controller verifies that the certificate received from the central control plane matches that received from the management plane. With this channel set up, the gateway controller can begin receiving configuration data from the central control plane, once the central control plane determines which configuration data to distribute to the gateway controller.

Once the gateway is onboarded with the management plane and central control plane, the agents in the DCNs of the VPC can be similarly onboarded. However, unlike the gateway or a local controller in the private datacenter, these local agents do not communicate with the MP/CCP cluster operating in the private datacenter, because these entities view the gateway controller as the controller for all of these logical ports. Thus, these agents only verify themselves with the gateway controller.

Figure 10:
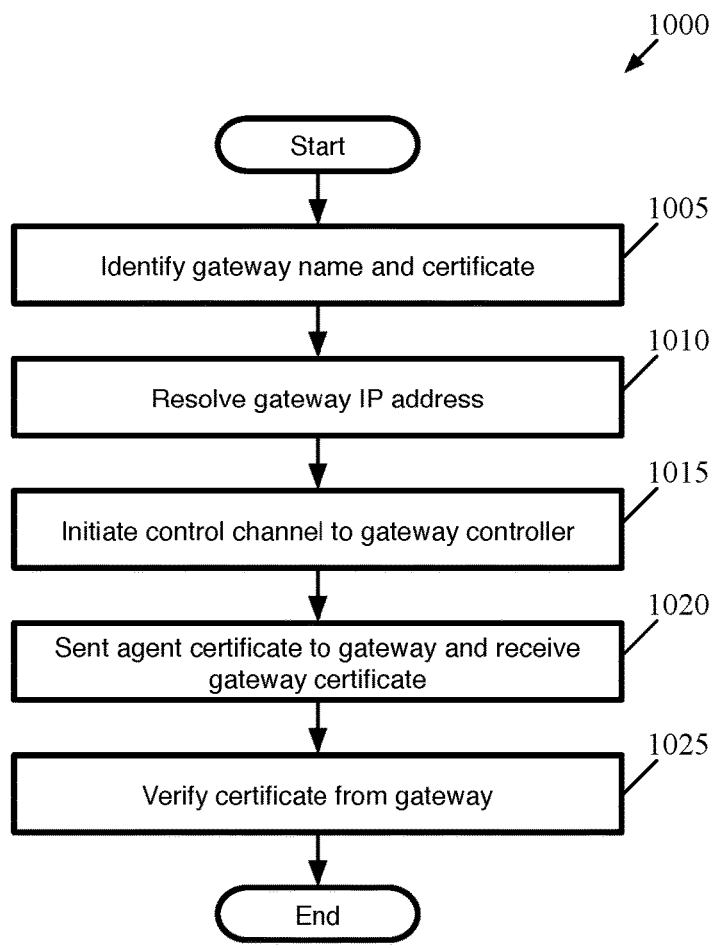
FIG. 10 conceptually illustrates a process of some embodiments performed by a local control agent operating on a DCN in a public cloud VPC to certify itself with the gateway controller for that VPC.

FIG. 10 conceptually illustrates a process 1000 of some embodiments performed by a local control agent executing in a DCN in a public cloud VPC to certify itself with the gateway controller for that VPC. As shown, the process 1000 begins by identifying (at 1005) a gateway name and certificate. In some embodiments, the gateway name is provided as a URL within a configuration file for the control agent (e.g., nsx-gw.aws.com). This configuration file also includes a list of interfaces and their type (e.g., overlay or non-overlay) in some embodiments. The process resolves (at 1010) the gateway IP address based on the gateway name. For instance, some embodiments use a DNS server within the datacenter to resolve the gateway name to its IP address within the VPC.

The process 1000 then initiates (at 1015) a control channel to the gateway controller. The process sends (at 1020) its own agent certificate to the gateway and receives the gateway certificate from the gateway via this control channel. In some embodiments, the gateway is authorized to trust the agent certificate on first use, rather than requiring certificates for every agent to have been pre-registered with the gateway. However, the process 1000 on the agent does verify (at 1025) the certificate received from the gateway to ensure that it has connected to a valid gateway controller.

IV. Physical Implementation of Logical Topology

As mentioned above, by expanding a logical network into one or more public datacenters, a logical topology may be stretched across these datacenters. Some embodiments confine the VMs attached to a given logical switch to one VPC (or the private datacenter), while other embodiments allow for even a single logical switch to be stretched across multiple VPCs or multiple datacenters.

Figure 11:
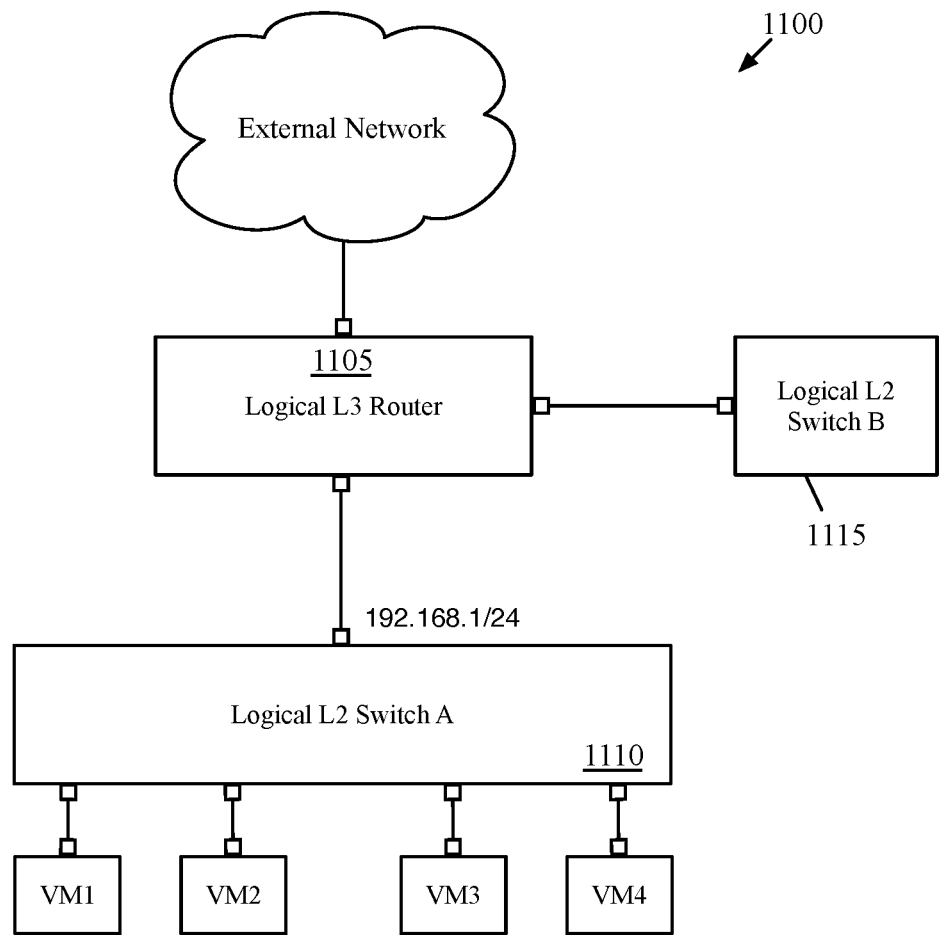
FIG. 11 conceptually illustrates a logical topology of some embodiments, as an administrator might input the topology into the management plane.

FIG. 11 conceptually illustrates a logical topology 1100 of some embodiments, as an administrator might input the topology into the management plane. As shown, the logical topology 1100 includes a logical router 1105 and two logical switches 1110 and 1115. Four virtual machines are attached to the logical switch 1110, and the logical router includes an uplink port to an external network. In this case, only one tier of logical router is shown in the logical network, although some embodiments could also include multiple tiers of logical routers. In addition, the management plane of some embodiments might define several logical routing components (e.g., a distributed router and one or more centralized service routers) for the logical router 1105. The multiple tiers of logical routers and creation of multiple routing components for a logical router are described in further detail in U.S. Patent Publication 2016/0226754, which is incorporated herein by reference.

The logical switches 1110 and 1115 attached to the logical router are each assigned a subnet, in some embodiments, and thus the workload VMs created to attach to a particular logical switch should be assigned IP addresses in the appropriate subnet. However, as described in greater detail below in Section V.B, in some embodiments the IP address of the VM with regard to the cloud provider is different than the IP address of the logical port mapped to that VM, as the IP address facing the cloud provider network is that of the tunnel endpoint created for the MFE operating on the VM. In this case, the logical switch 1110 is assigned the subnet 192.168.1.0/24. In addition, four VMs are shown attached to the logical switch 1110.

Figure 12:
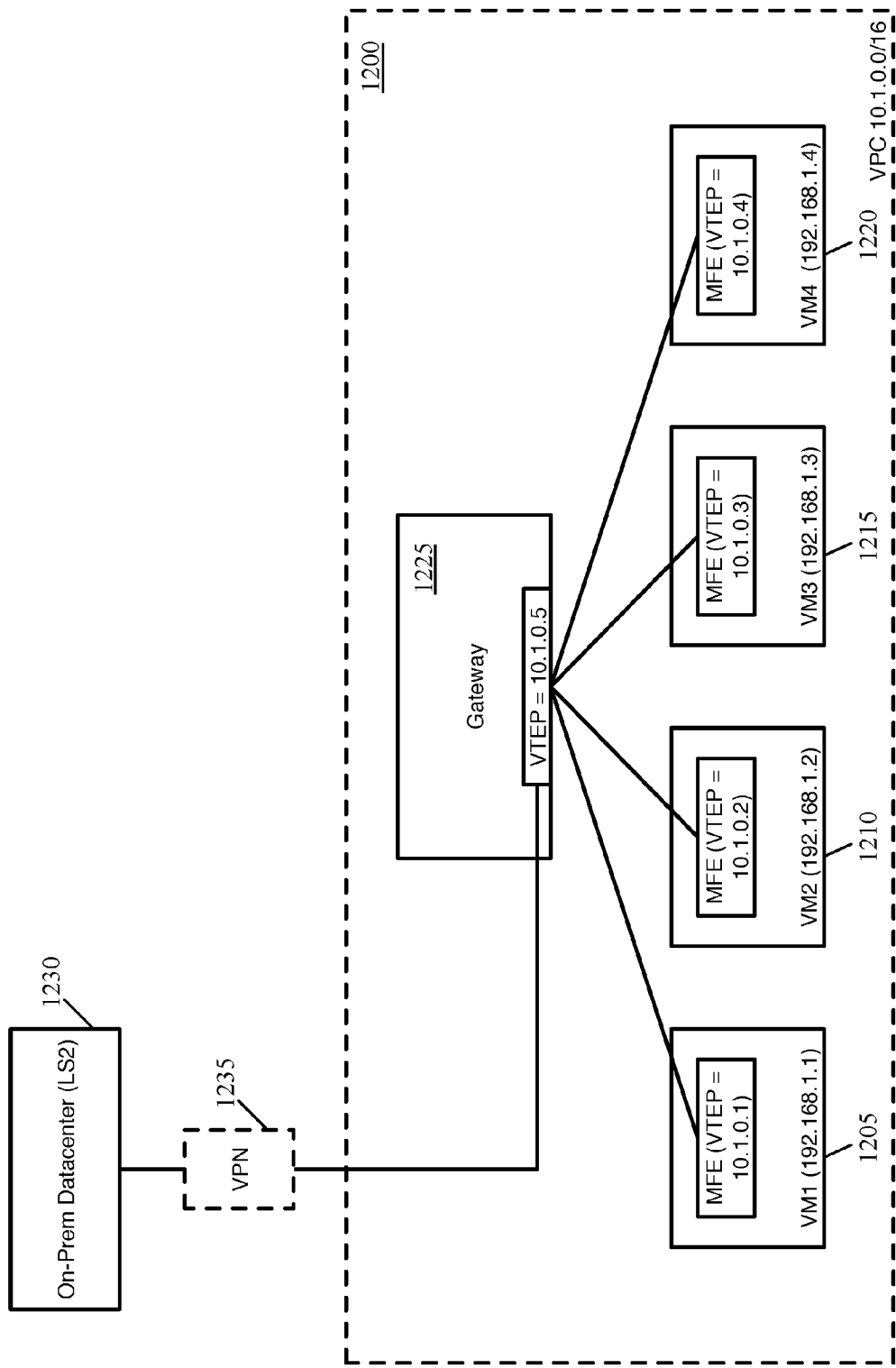
FIG. 12 illustrates an example of four VMs attached to a logical switch, as implemented within a single VPC of a single public cloud provider.

FIG. 12 illustrates an example of four VMs 1205-1220 attached to the logical switch 1110, as implemented within a single VPC 1200 of a single public cloud provider. In this example, all of the VMs attached to the logical switch 1110 are instantiated in the same VPC, with only the VMs attached to that logical switch instantiated in the VPC. This VPC 1200 is assigned a subnet 10.1.0.0/16, which may be a public or private subnet depending on how the administrator has configured the VPC on the public cloud. In this example (and the other examples in this section), the MFEs are all operating in overlay mode, such that the VM IP address is different than the workload application IP address (i.e., the IP address associated with the logical switch port).

As shown, each of the VMs is assigned a different workload IP in the 192.168.1.0/24 subnet (192.168.1.1, 192.168.1.2, 192.168.1.3, and 192.168.1.4 respectively). When the workload application sends a packet, this IP address will be the source IP used in the header of that packet. However, the MFEs operating on these VMs have VTEPs with different IP addresses on the 10.1.0.0/16 subnet (10.1.0.1, 10.1.0.2, 10.1.0.3, and 10.1.0.4 respectively). The packets that exit the VM will thus be encapsulated using this VTEP IP address as the source IP address (after logical processing is performed by the MFE in the source VM), in order to be sent to other destinations in the VPC.

The figure also illustrates tunnels between these four MFEs and a gateway 1225 in the VPC. These tunnels pass through the underlying network of the public cloud provider (referred to herein as the "underlay"). In addition, though not shown here for simplicity, tunnels are created (through the underlay network) between each pair of the MFEs operating on the VMs 1205-1220. The gateway can also send packets to (and receive packets from) destinations within the on-premises private datacenter 1230. To send these packets, the gateway 1225 encapsulates the packets using its VTEP IP (10.1.0.5), so that the destination will identify the incoming packet as a logical network packet. To secure traffic between the gateway 1225 in the VPC 1200 and the destinations in the private datacenter 1230 (e.g., VMs attached to logical switch 1115), the packets are sent via a VPN tunnel 1235 in some embodiments. In this example, the gateway's connection to external networks is not shown, as this will be discussed in more detail in sections below pertaining to centralized and distributed network address translation and other services.

Figure 13:
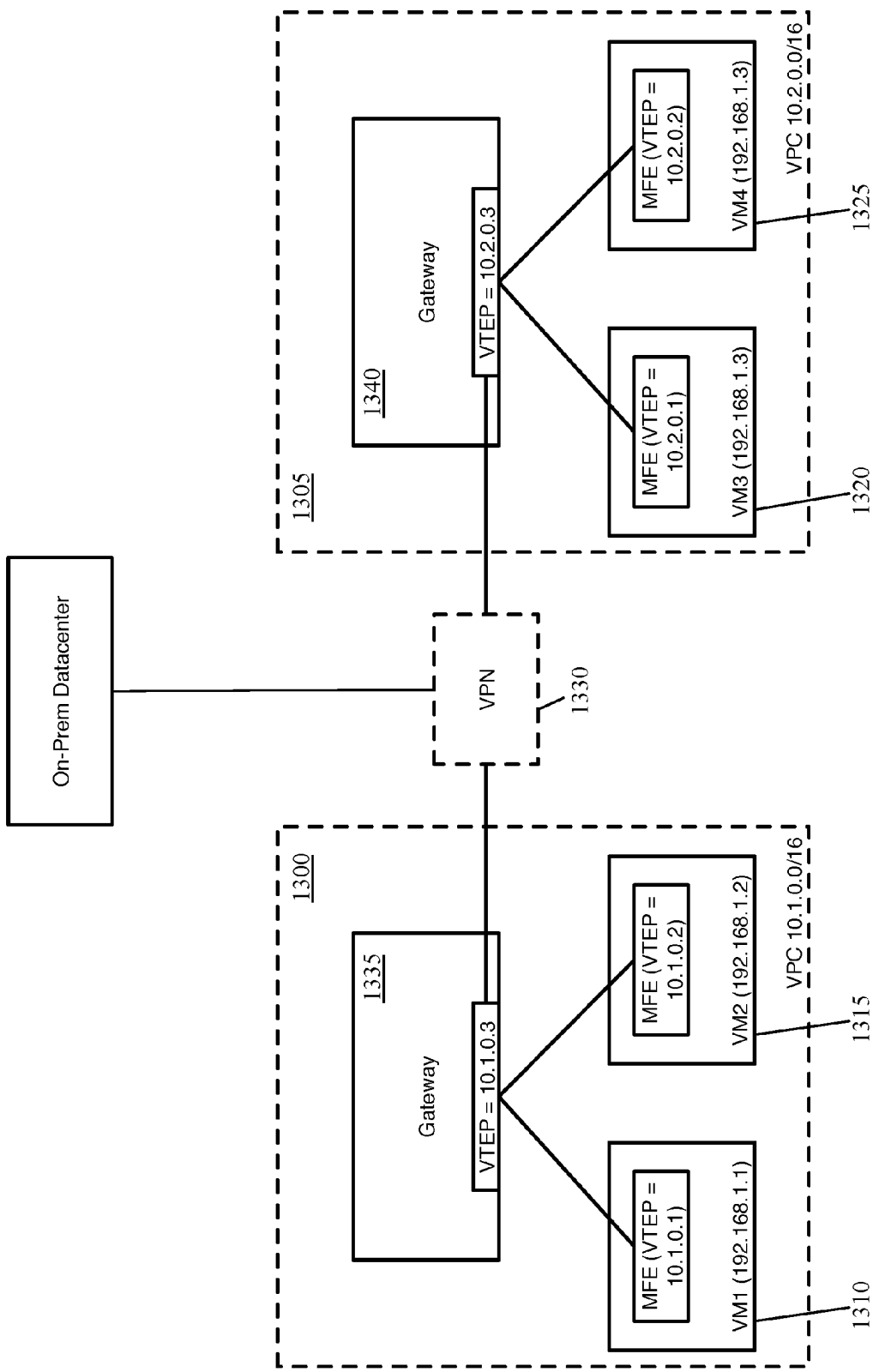
FIG. 13 illustrates an example in which a logical switch is stretched across two separate VPCs within a single datacenter (i.e., of the same cloud provider).

FIG. 13 illustrates an example in which the logical switch 1110 is stretched across two separate VPCs 1300 and 1305 within a single datacenter (i.e., of the same cloud provider). In this case, four VMs 1310-1325 have the same IP addresses for their workload applications on a single subnet (192.168.1.0/24). However, because the two VPCs have different subnets (the first VPC is assigned 10.1.0.0/16 and the second VPC is assigned 10.2.0.0/16), the VTEPs of the MFEs are not all on the same subnet. Thus, the VTEPs on the two VMs 1310 and 1315 in the first VPC 1300 are assigned IP addresses 10.1.0.1 and 10.1.0.2, while the VTEPs on the two VMs 1320 and 1325 in the second VPC 1305 are assigned IP addresses 10.2.0.1 and 10.2.0.2.

Gateways 1335 and 1340 are also instantiated within each of the VPCs, and each has a VTEP on the subnet of its respective VPC. In the situation in which the VPCs are not peered, then packets sent between the two gateways are sent using a VPN connection (i.e., the VPCs might as well be located in separate datacenters). However, some cloud providers enable peering of VPCs, in which case packets can be sent directly from one endpoint in one of the VPCs to a second endpoint in another peered VPC. Thus, if the two VPCs 1300 and 1305 are peered, then packets sent from one of VMs 1310 and 1315 to one of VMs 1320 and 1325 need not be sent via the VPN 1330. In fact, some embodiments do not even require these packets to be sent through the gateways 1335 and 1340, but can be tunneled through the provider network directly from one VM to the other. However, if the VPCs 1300 and 1305 are not peered, then such inter-VPC packets should be sent from the VM to its gateway via an intra-VPC tunnel, from the first gateway to a second gateway in the destination VPC via a VPN, and from the second gateway to the destination VM.

For connection to the private datacenter 1345 (e.g., to reach VMs attached to the second logical switch 1115), the gateways use the VPN 1330. This VPN 1330 is representative of various possible VPN configurations used to link the private datacenter with one or more VPCs at one or more cloud providers. For instance, some embodiments use a full mesh of VPN tunnels between each destination, while other embodiments use a hub-and-spoke VPN or a combination of the two. In addition, different embodiments may use a VPN provided by the public cloud provider or by the network control system, or a combination thereof (e.g., if using a mesh of VPNs).

Figure 14:
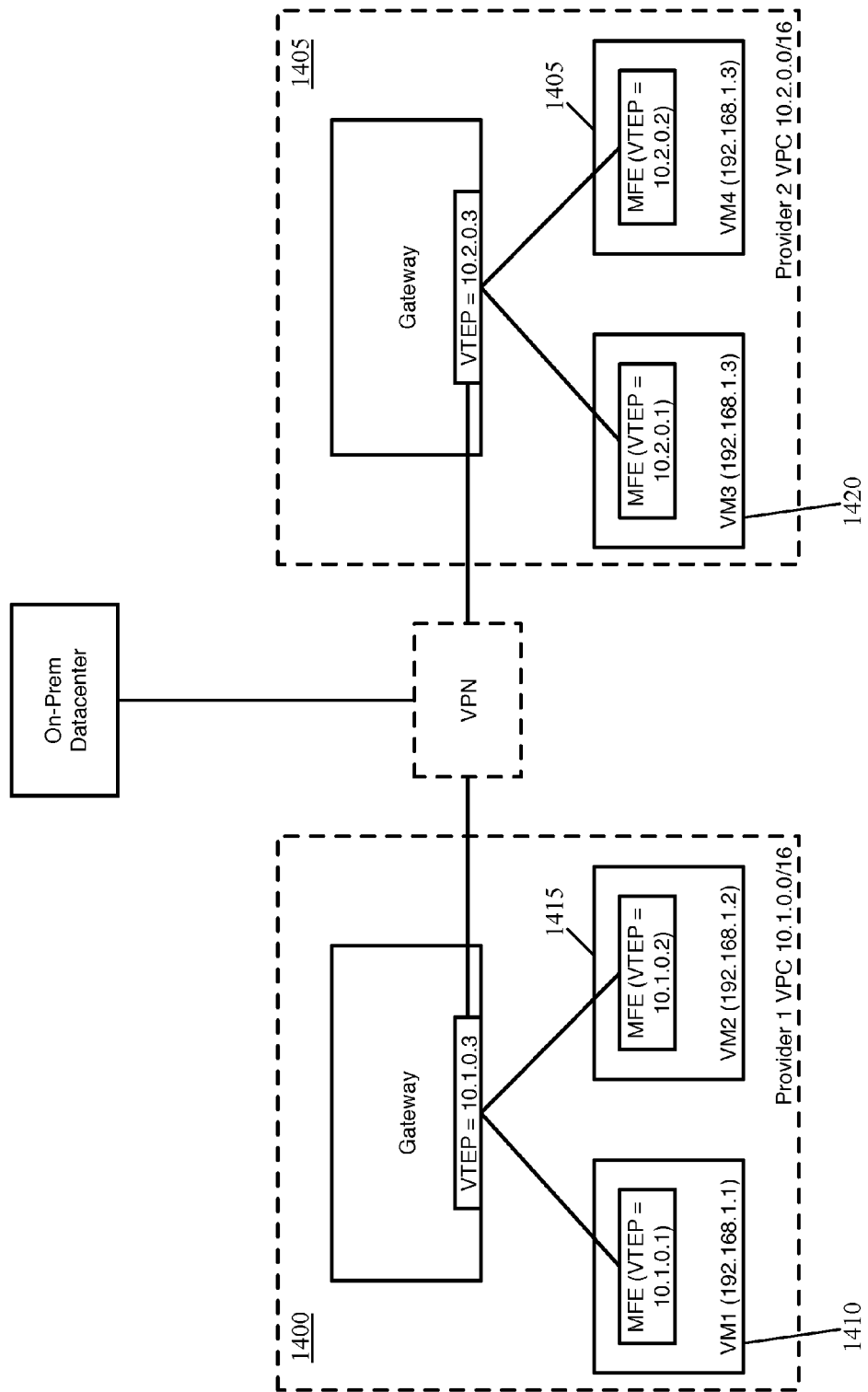
FIG. 14 illustrates an example in which a logical switch is stretched across VPCs located in datacenters of two completely different cloud providers.

FIG. 14 illustrates a similar configuration to that of FIG. 13, but with the VMs 1410-1425 attached to the logical switch 1110 stretched across VPCs 1400 and 1405 that are located in datacenters of two completely different cloud providers. This situation differs from that of FIG. 13 in that there is generally no option to peer VPCs between two different datacenters (and especially two different datacenters of different cloud providers), so any communication between workloads in the datacenters will be sent via the VPN 1430. As in the discussion of FIG. 13, some embodiments may use a hub-and-spoke VPN in the multi-public cloud configuration, while other embodiments use separate VPN connections for (i) each public cloud to the other and (ii) each public cloud to the private data-center.

In addition to the examples shown in these figures, it should be understood that other configurations are possible. For example, a single logical switch could be stretched between the private datacenter and one or more public datacenters. In any of FIGS. 12-14, one or more of the VMs attached to the logical switch could be implemented within the on-premises datacenter rather than in one of the public cloud VPCs.

V. MFE Configuration in Workload VM

As described above, in order to enable the network control system to configure packet processing rules for data traffic sent to and from workload DCNs in the public cloud, some embodiments install managed forwarding elements in the workload DCNs along with local control agents to configure the MFEs. This MFE is connected to the DCN's network interface, such that all packets sent to and from the workload applications running in these DCNs pass through (and are processed by) the MFE according to configuration data installed by the local control agent.

These MFEs may be configured differently in different embodiments of the invention. For example, some embodiments configure the MFEs in non-overlay mode, in which the IP address of the workload application is the same as the IP address of the DCN's network interface. In this case, the MFE does not perform any packet processing, and instead is configured to perform micro-segmentation and/or network security processing such as distributed firewall rule processing. In other embodiments, the MFEs are configured such that an interface to which the workload application connects has a different IP address than the outward-facing interface of the DCN, used for the VTEP. In this case, the MFE performs packet forwarding according to the logical network configuration in addition to any network security or other processing. Finally, the administrator may want to keep the same IP addresses for workloads that are already in existence but make use of the logical network for packet processing, tunneling, etc. In this third case, the MFE is configured in a separate namespace of the DCN from the workload application. This enables the workload application to connect to an interface having its existing IP address, and then use a veth pair to connect this interface to the MFE in its separate namespace, which uses the same IP address for its VTEP.

A. MFE in Non-Overlay Mode

Figure 15:
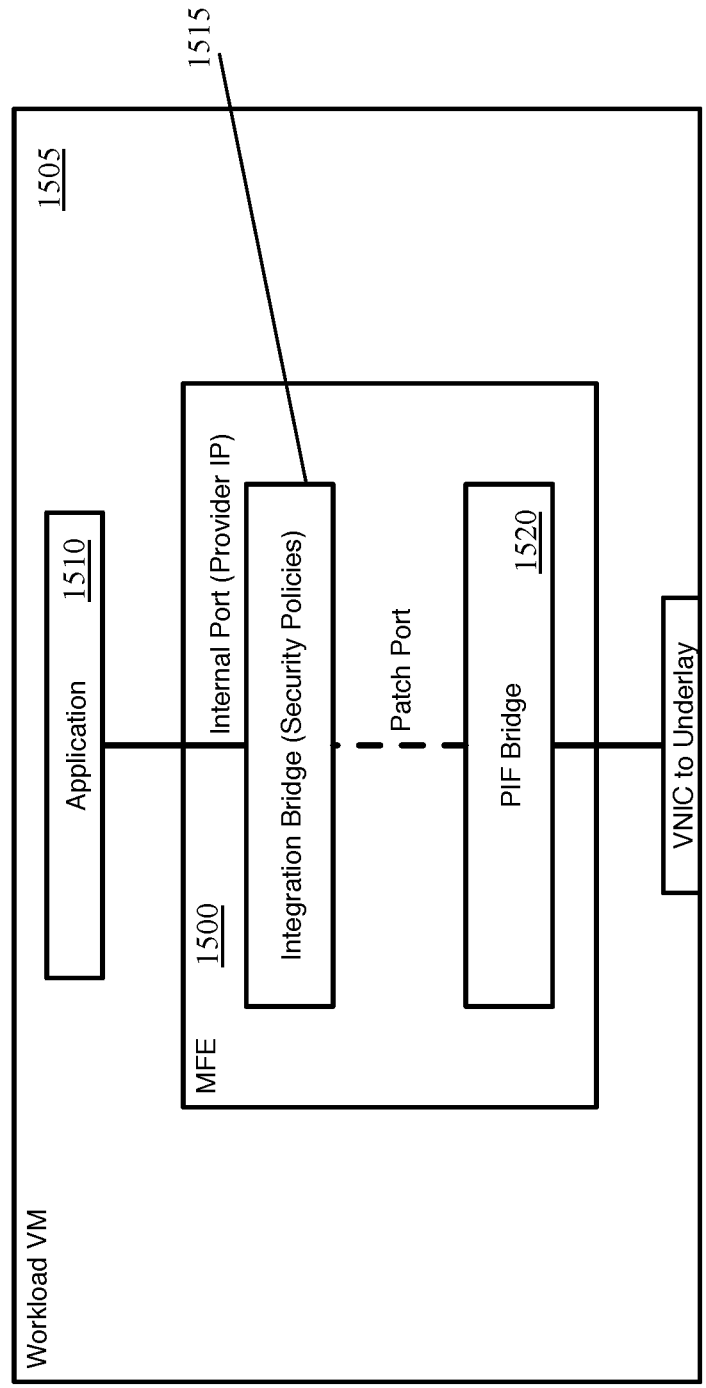
FIG. 15 conceptually illustrates a VM with a managed forwarding element configured in non-overlay mode.

FIG. 15 conceptually illustrates a VM 1505 with a managed forwarding element 1500 configured in non-overlay mode. In this example, the MFE is an Open vSwitch (OVS) instance. In all of these examples, the MFE is configured to include two bridges—an integration bridge (to which the application workload connects via the network stack of the VM), and a physical interface (PIF) bridge that connects to the virtual network interface controller (VNIC) of the VM.

As shown in this figure, the workload application 1510 (e.g., a web server, application server, etc.) operating on the VM 1505 connects via an internal port to the integration bridge 1515 of the MFE. This internal port is associated with the network stack of the VM, and thus has the IP address of the VM as provided by the public cloud provider (e.g., the 10.1.0.0/24 IP address in the example of FIG. 12). The integration bridge 1515, in some embodiments, does not perform forwarding or encapsulation. Instead, the integration bridge 1515 automatically forwards all packets to the PIF bridge 1520 via a patch port, after performing any security processing (assuming the packet is not dropped or denied).

The integration bridge also processes packets received from the application 1510 (or from the PIF bridge and send to the application 1510) using flow entries that implement any network security or other non-forwarding policies. For instance, the integration bridge implements DFW rules that apply to the logical port to which the VM 1505 attaches. These rules may be specified in terms of source and/or destination MAC addresses, and may allow, drop, deny, etc. packets sent to or from these specified addresses and/or under specific conditions (e.g., connection openings), in some embodiments. In addition, different embodiments may implement a combination of logging, distributed encryption rules (both encryption for outgoing packets and decryption for incoming packets), and tunneling to third party service appliances (e.g., middlebox appliances).

Figure 16:
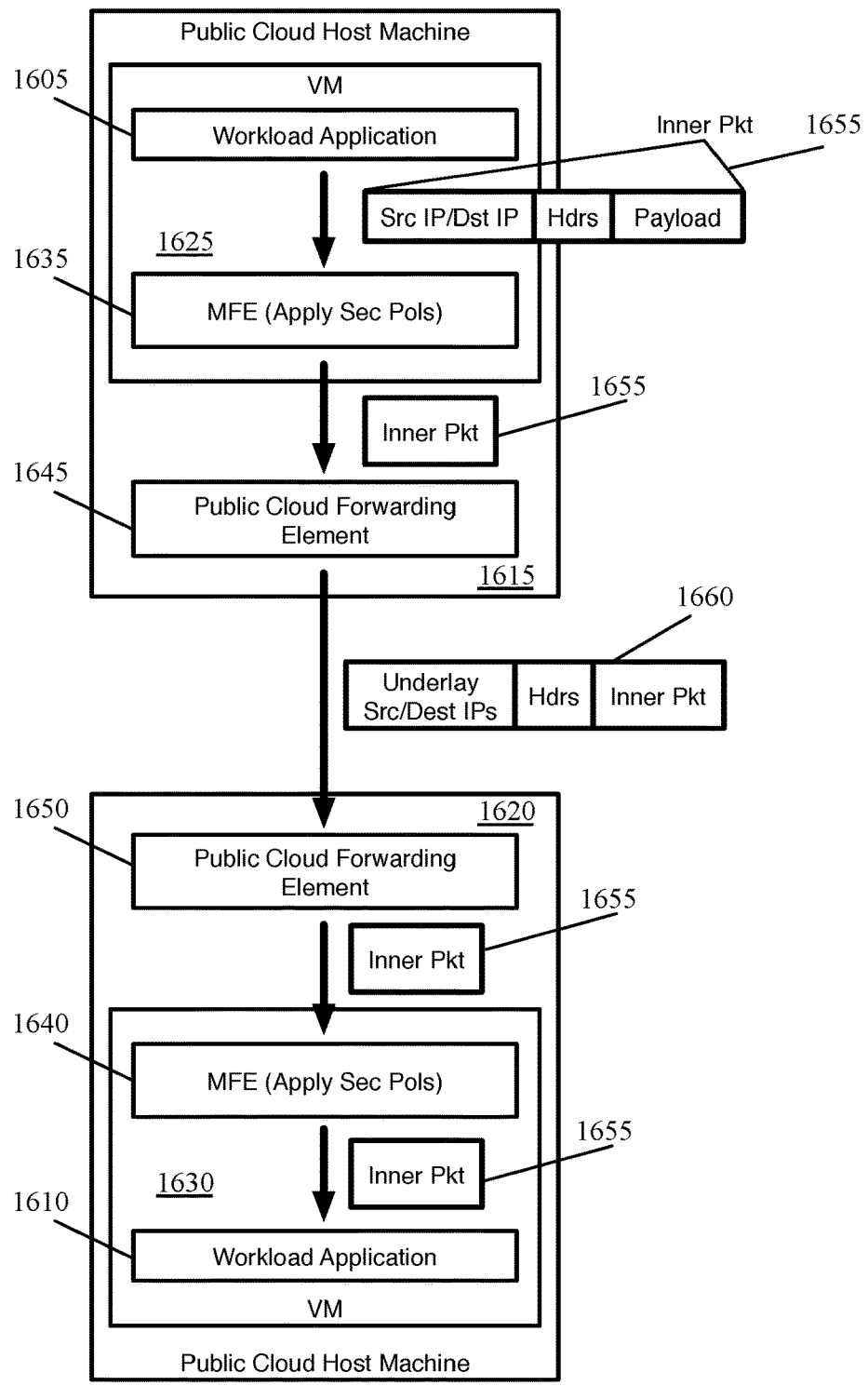
FIG. 16 illustrates an example of packet processing through a VPC by MFEs operating in non-overlay mode, showing a first workload application sending a packet to another workload application on the same VPC.

FIG. 16 illustrates an example of packet processing through a VPC by MFEs operating in non-overlay mode, specifically showing a first workload application 1605 sending a packet to another workload application 1610 on the same VPC. FIG. 16 includes two host machines 1615 and 1620 operating VMs in the same VPC in a public datacenter. A first VM 1625 operates on the first host machine 1615, with a workload application 1605 and a MFE 1635 executing in the first VM. A second VM 1630 operates on the second host machine 1620, with a workload application 1610 and a MFE 1640 executing in the second VM. In this case, both of the MFEs operate in non-overlay mode. In addition, each of the host machines 1615 and 1620 includes respective public cloud forwarding elements 1645 and 1650 to which their respective VMs connect. These public cloud forwarding elements may be software virtual switches (and, in fact could be the same type of virtual switch as the MFEs 1635 and 1640). However, unlike the MFEs 1635 and 1640, the network control system does not have access to these forwarding elements, as they are controlled by the public cloud provider.

As shown, the first workload application 1605 sends a packet 1655 to the MFE 1635 on its VM 1625. The packet 1655 includes source and destination IP addresses, various headers (e.g., TCP/UDP, IP, Ethernet, etc.), as well as a payload. As used in this document, a packet refers to a collection of bits in a particular format sent across a network. It should be understood that the term packet may be used herein to refer to various formatted collections of bits that may be sent across a network, such as Ethernet frames, IP packets, TCP segments, UDP datagrams, etc. While the examples below refer to packets, it should be understood that the invention should not be limited to any specific format or type of data message.

The MFE 1635, upon receiving the packet 1655, applies any applicable security policies (e.g., firewall rules) or other non-forwarding policies with which it has been configured by the local control agent (not shown). Assuming the packet is not dropped, the MFE 1635 outputs the packet 1655 from the VM interface, which connects to the public cloud forwarding element 1645. Assuming the public cloud network uses tunneling between host machines, the public cloud forwarding element 1645 encapsulates the packet with its own underlay encapsulation and sends this encapsulated packet 1660 out over the physical cloud provider network. The underlay encapsulation uses the IP of an interface of the first host machine 1615 as its source address and the IP of an interface of the destination host machine 1620 as its destination address.

The packet 1660 is then received by the host machine 1620 and decapsulated by the public cloud forwarding element 1650. The forwarding element 1650 sends the packet 1655 to the interface of the workload VM 1630 based on its destination address, where the MFE 1640 processes this packet. The MFE 1640 performs its network security processing, and delivers the packet to the workload application 1610. In some embodiments, the MFEs at both the source and destination perform network security, in case the source VM and its MFE are compromised by an attacker.

Because the network control system is not providing any forwarding, in some embodiments a logical switch cannot span more than one VPC (the L2 domain is restricted to the underlying VPC subnet). In addition, L3 forwarding is limited to routing within the VPC or between VPCs using peering or VPNs. However, the non-overlay mode does allow the applications to continue operating on the IP addresses from the cloud provider, thereby facilitating easy seamless integration with other services provided by the cloud provider, such as storage or load balancing services. North-south traffic uses the gateway datapath as a default gateway, in which case a separate routing table provided by the cloud provider and attached to the northbound interface of the gateway points to the cloud provider's internet gateway as the default gateway.

B. MFE in Overlay Mode

Figure 17:
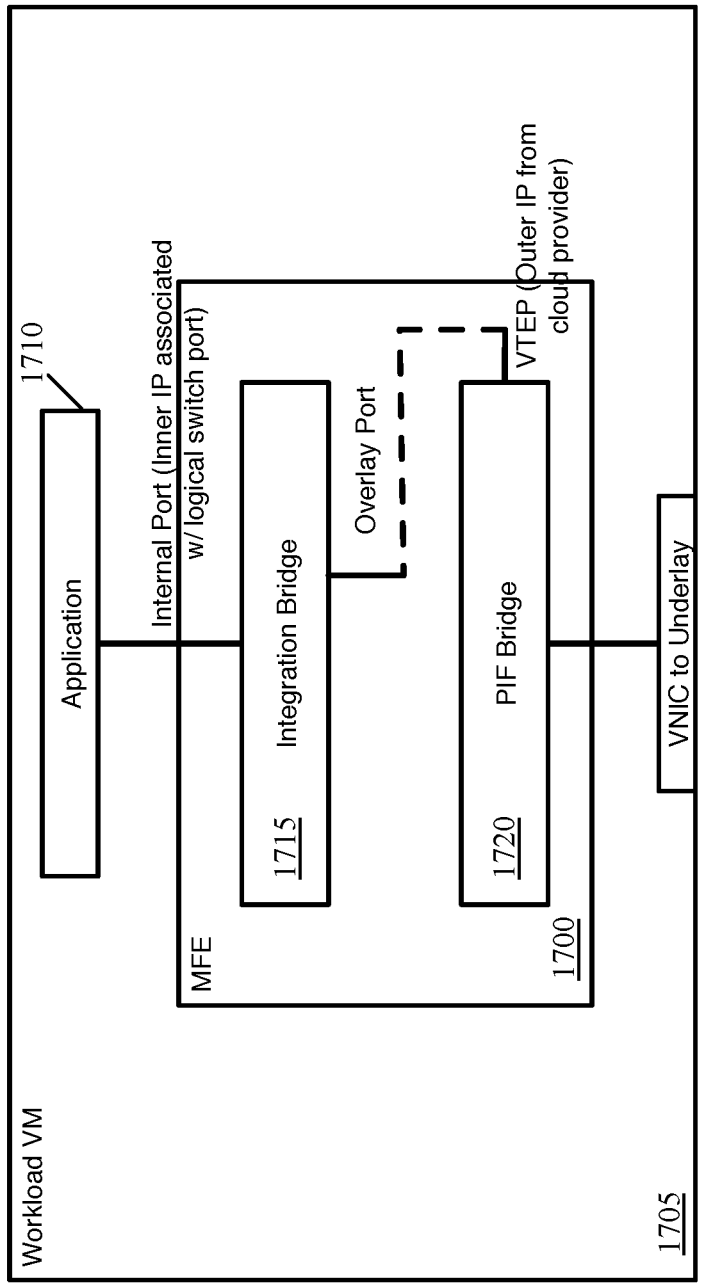
FIG. 17 conceptually illustrates a VM with a managed forwarding element configured in overlay mode, with distinct IP addresses for (i) the internal port used by the application and (ii) the VTEP that encapsulates packets to be sent to other VMs on the same VPC.

FIG. 17 conceptually illustrates a VM 1705 with a managed forwarding element 1700 configured in overlay mode, with distinct IP addresses for (i) the internal port used by the application and (ii) the VTEP that encapsulates packets to be sent to other VMs on the same VPC. As in FIG. 15, the MFE 1700 is an OVS instance configured with an integration bridge 1715 and a PIF bridge 1720. The workload application 1710 (e.g., a web server, application server, etc.) operating on the VM 1705 connects via an internal port to the integration bridge 1715 of the MFE. However, in this case, the internal port is associated with a network stack for an IP address corresponding to the logical port to which the workload is attached, and thus belonging to the subnet of the logical switch with which the logical port is associated (e.g., the 192.168.1.0/24 addresses in FIG. 12).

In this case, the integration bridge 1715 performs logical L2 and/or L3 processing for packets sent to and from the workload application 1710. This may include ingress and egress context mapping and ingress and egress ACLs for each logical forwarding element in the logical topology, as well as logical switching and/or routing. In addition, the integration bridge performs distributed firewall, distributed encryption, tunneling to third-party service appliances, etc. in some embodiments, as in the case of the non-overlay MFEs.

Unlike the MFE 1500, the MFE 1700 is not configured with a patch port to send packets between the two bridges. Instead, the integration bridge 1715 includes an overlay port that connects to a VTEP on the PIF bridge 1720 (e.g., via a second network stack for the cloud provider IP address). This VTEP has the cloud provider IP address (e.g., the 10.1.0.0/16 addresses in FIG. 12), which the integration bridge 1715 uses to encapsulate packets sent out of the VM 1705, and which is used by other MFEs in the same VPC, including the gateway datapath, to tunnel packets for the workload application to the MFE 1700. These packets sent to the VTEP IP address (via the VNIC of the VM 1705, which has the cloud provider IP address) are decapsulated by the integration bridge 1715 before delivery to the workload application 1710.

Figure 18:
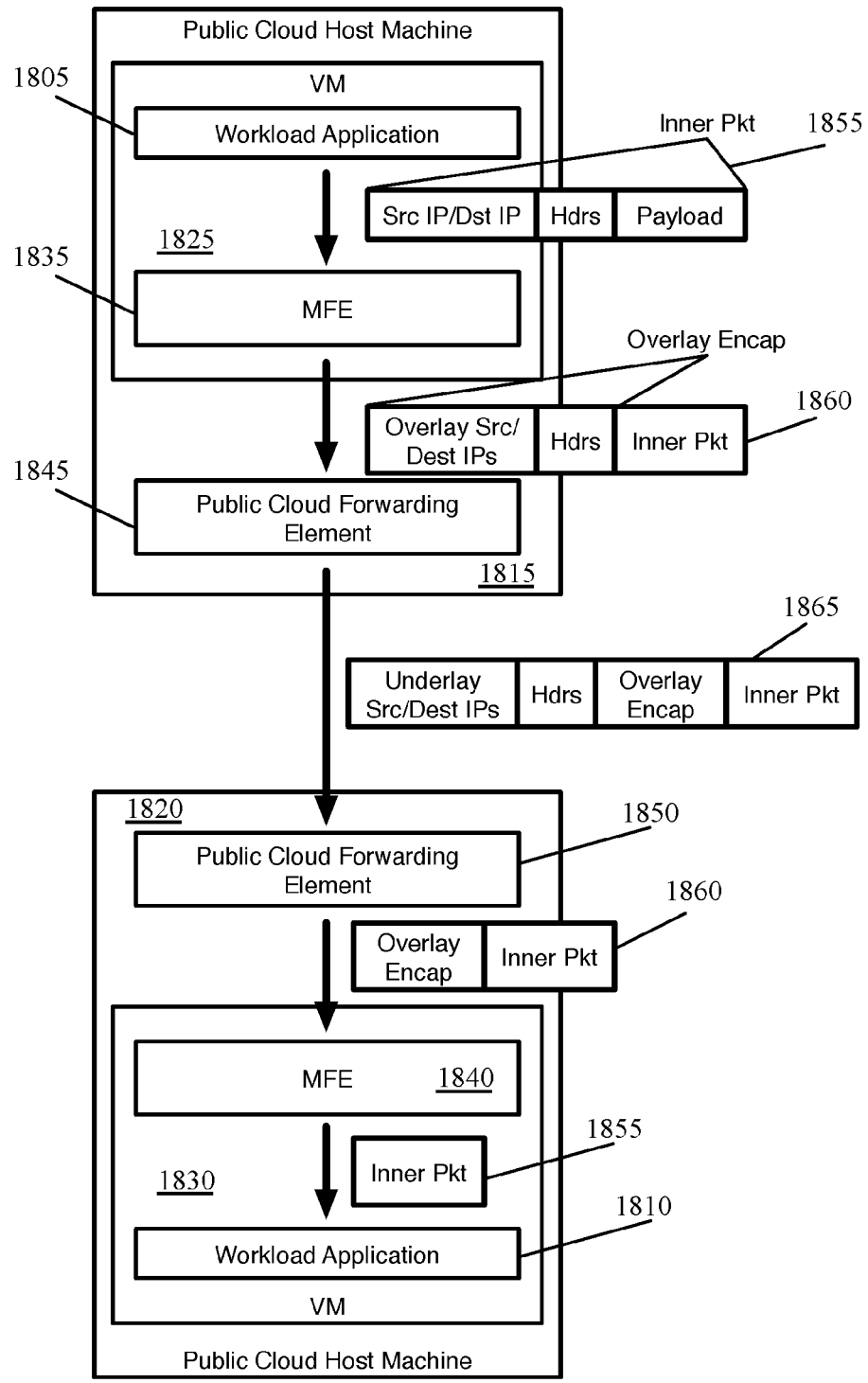
FIG. 18 illustrates an example of packet processing through a VPC by MFEs operating in overlay mode, specifically showing a first workload application sending a packet to another workload application on the same VPC.

FIG. 18 illustrates an example of packet processing through a VPC by MFEs operating in overlay mode, specifically showing a first workload application 1805 sending a packet to another workload application 1810 on the same VPC. FIG. 18 includes two host machines 1815 and 1820 operating VMs in the same VPC in a public datacenter. A first VM 1825 operates on the first host machine 1815, with a workload application 1805 and a MFE 1835 executing in the first VM. A second VM 1830 operates on the second host machine 1820, with a workload application 1810 and a MFE 1840 executing in the second VM. In this case, both of the MFEs operate in overlay mode, with internal IPs associated with logical switch ports and VTEP IPs associated with the VPC subnet of the cloud provider. In addition, each of the host machines 1815 and 1820 includes a respective public cloud forwarding element 1845 and 1850 to which their respective VMs connect. These public cloud forwarding elements may be software virtual switches (and, in fact could be the same type of virtual switch as the MFEs 1835 and 1840). However, unlike the MFEs 1835 and 1840, the network control system does not have access to these forwarding elements, as they are controlled by the public cloud provider.

As shown, the first workload application 1805 sends a packet 1855 to the MFE 1835 on its VM 1825. The packet 1855 includes source and destination IP addresses, various headers (e.g., TCP/UDP, IP, Ethernet, etc.), as well as a payload. In this case, the source IP address is the internal IP address of the workload application (rather than the VM interface IP address).

The MFE 1835, upon receiving the packet 1855, performs logical forwarding in addition to any application security policies (e.g., firewall rules) according to its configuration by the local control agent. If the destination MAC address of the packet is on the same logical switch as the sending workload, then the processing through the topology will only include the L2 processing for that logical switch. If the destination is on a different logical switch, then the logical processing will include processing for the source logical switch, processing for at least one distributed logical router, and processing for the logical switch to which the destination MAC address attaches (possibly in addition to any transition logical switches between logical routing components, if multiple routing components are involved.

Assuming that the packet is not dropped, the MFE 1835 encapsulates the packet 1855 so as to tunnel the packet to its destination (using, e.g., GENEVE, STT, etc.), and outputs this encapsulated packet 1860 from the VM interface, which connects to the public cloud forwarding element 1845. If the public cloud network uses tunneling between host machines, the public cloud forwarding element 1845 encapsulates the packet a second time with its own underlay encapsulation and sends this twice-encapsulated packet 1865 out over the physical cloud provider network. The underlay encapsulation uses the IP of an interface of the first host machine 1815 as its source address and the IP of an interface of the destination host machine 1820 as its destination address.

After traveling through the underlay (cloud provider) network, the packet 1865 is received by the host machine 1820, where the public cloud forwarding element 1850 removes the outer (underlay) encapsulation. The forwarding element 1850 sends the once-encapsulated packet 1860 to the interface of the workload VM 1830 based on the destination VTEP address, where the MFE 1840 processes this packet. The MFE 1840 removes the overlay encapsulation, performs any additional logical processing and network security processing, and delivers the inner packet 1855 to the workload application 1810.

The workload application may also send packets to destinations on the logical network but located outside the VPC (e.g., at a different VPC of the same datacenter, at a different public datacenter of the same or a different cloud provider, or at the tenant's own private datacenter). In some embodiments, these packets are tunneled to the gateway within the VPC and sent out via VPN (or another secure manner) to the destination at another datacenter. The destination could be on the same logical switch (as in the examples shown in Section IV above), or on a separate logical switch (in which case the gateway might provide centralized router processing, if required).

Figure 19:
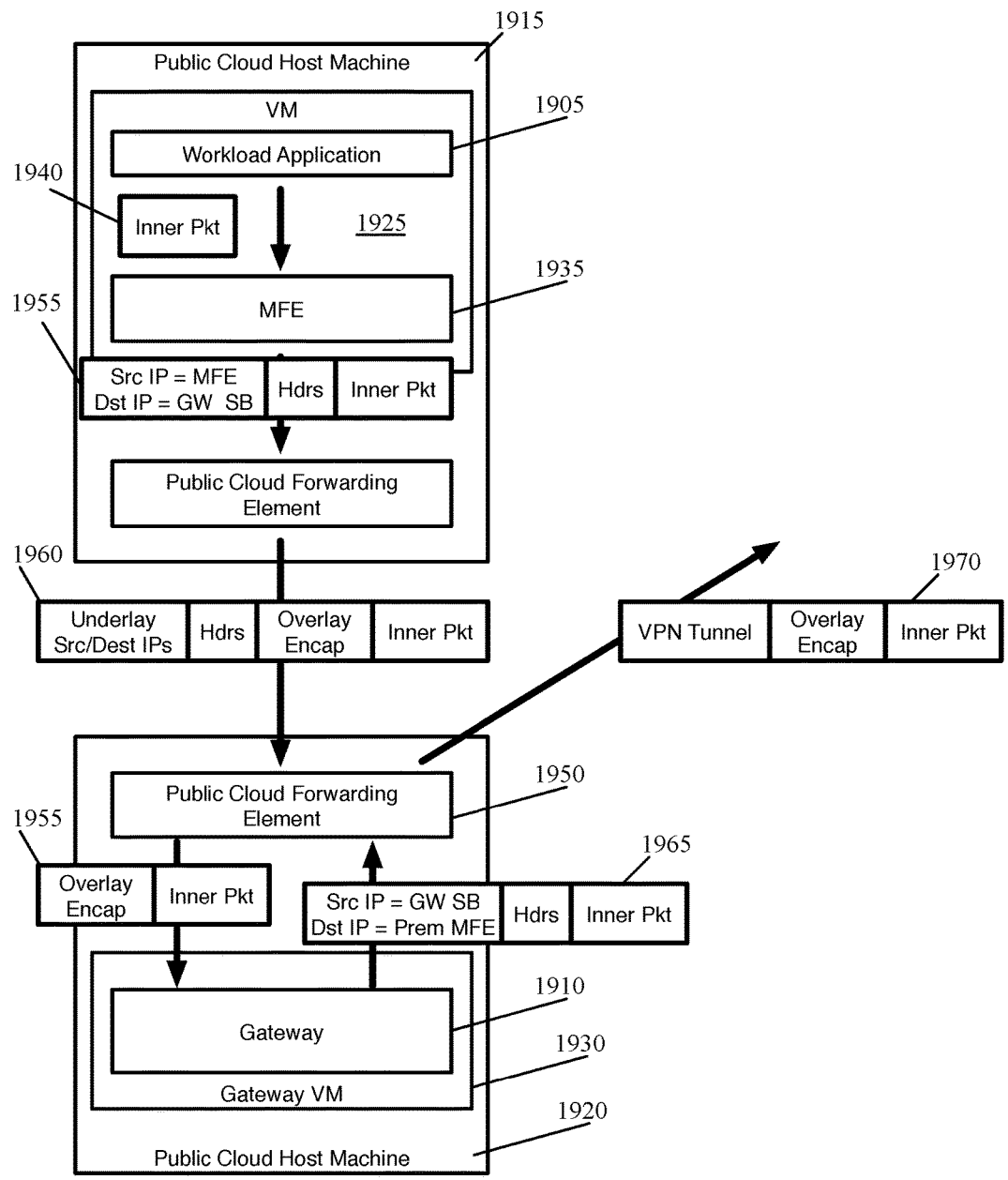
FIG. 19 illustrates an example of packet processing through a VPC by MFEs in overlay mode for a packet sent to a logical network destination outside the VPC.

FIG. 19 illustrates an example of packet processing through a VPC by MFEs in overlay mode for a packet sent to a logical network destination outside the VPC. FIG. 19 includes two host machines 1915 and 1920 operating VMs in the same VPC in a public datacenter. A workload VM 1925 operates on the first host machine 1915, with a workload application 1905 and a MFE 1935 (in overlay mode) executing in the workload VM. A gateway VM 1930 operates on the second host machine 1920, with a gateway datapath 1910 executing on the VM (in addition to a controller, PCM, etc. that are not shown here as they do not participate in the packet processing). As mentioned, the MFE 1935 operates in overlay mode, with an internal IP address associated with the logical switch port to which the workload attaches and a VTEP IP address associated with the VPC subnet of the cloud provider. In addition, each of the host machines 1915 and 1920 includes a respective public cloud forwarding element 1945 and 1950 to which their respective VMs connect. As in the previous cases, these public cloud forwarding elements may be software virtual switches, to which the network control system does not have access.

As shown, the workload application 1905 sends a packet 1940 to the MFE 1935 on its VM 1925. As with the previous packets, this packet 1940 contains source and destination IP addresses (and source and destination MAC addresses), various headers, and a payload. As with the previous figure, the source IP address is the internal IP address of the workload application 1905 (not the VM interface IP address). The destination IP address of the packet corresponds to a logical network destination located outside of the VPC (and outside of a peered VPC in the same datacenter). This could be a DCN located in a private datacenter, a different public datacenter (from the same or different provider), etc. If the destination is on the same logical switch as the workload application, then the destination MAC address in the packet 1940 is also that of this destination. On the other hand, if the destination is on a different logical switch, then the destination MAC is that of the logical router port to which the workload's logical switch connects.

The MFE 1935, upon receiving the packet 1940, performs logical forwarding in addition to any application security policies (e.g., firewall rules) according to its configuration by the local control agent. If the destination MAC address of the packet is on the same logical switch as the sending workload, then the processing through the topology will only include logical switch processing for that logical switch. If the destination is on a different logical switch, then the logical processing will include processing for the source logical switch (to which the workload application 1905) attaches, processing for at least one distributed router, and processing for the logical switch to which the destination MAC address attaches. In either case, the MFE identifies the destination logical switch port as mapping to the gateway VTEP (as all logical ports external to the VPC map to the gateway).

Assuming the packet is not dropped (e.g., based on distributed firewall rules), the MFE 1935 encapsulates the packet 1940 so as to tunnel the packet to the gateway (using, e.g., GENEVE, STT, etc.) and outputs this encapsulated packet 1955 from the VM interface, which connects to the public cloud forwarding element 1945. As shown, the source IP address for this encapsulation is that of the VTEP of the MFE 1935 (i.e., the address of the VM interface), while the destination IP address is that of the VTEP of the gateway datapath 1910 (i.e., the address of the gateway VM interface used for tunnel traffic).

Assuming the public cloud forwarding network uses tunneling between host machines, the public cloud forwarding element 1945 encapsulates the packet a second time with its own underlay encapsulation and sends this twice-encapsulated packet 1960 out over the physical cloud provider network. The underlay encapsulation uses the IP addresses of interfaces of the host machines 1915 and 1920 as its source and destination IP addresses, respectively.

After traveling through the underlay (cloud provider) network, the packet 1965 is received by the host machine 1920, where the public cloud forwarding element 1950 removes the underlay encapsulation. The forwarding element 1950 sends the still-encapsulated packet 1955 to the gateway VM 1930, via the gateway VM's interface for tunneled traffic, based on the destination IP address of the overlay encapsulation. The gateway datapath 1910 processes this packet 1955 by removing the encapsulation, identifying the destination logical port for the inner packet 1940, and mapping this port to a destination tunnel endpoint. In this specific example, the destination maps to an on-premises MFE (i.e., in the tenant's own private datacenter). Some embodiments use this as the tunnel endpoint, while other embodiments tunnel the packets to a gateway for the private datacenter). As shown, for the new encapsulated packet 1965, the source IP address is that of the gateway VTEP (i.e., the destination address of the original encapsulated packet 1955), while the destination is the VTEP of the on-premises MFE. In addition, to reach its destination at the private datacenter, the encapsulated packet 1965 is sent through a secure VPN tunnel, as the packet may need to traverse the Internet to reach the destination datacenter. This VPN tunnel may be applied at the gateway in some embodiments, or by a separate VPN gateway provided by the public cloud provider. The VPN-tunneled packet 1970 is then sent out of the datacenter.

C. MFE in Overlay Mode with Single IP

In some cases, a datacenter tenant may want to impose their own network control system on an existing set of DCNs operating in the public datacenter, but do so without modifying the IP address of the workloads. To handle this need, some embodiments enable the MFEs in the public datacenter DCNs and the workload application (e.g., web server, application server, etc.) to operate in different namespaces of the DCN. This enables the two namespaces to have independent network stacks associated with the same IP address (as opposed to the standard overlay mode described above in subsection B, in which two network stacks operating in the same namespace cannot be associated with the same IP address.

Figure 20:
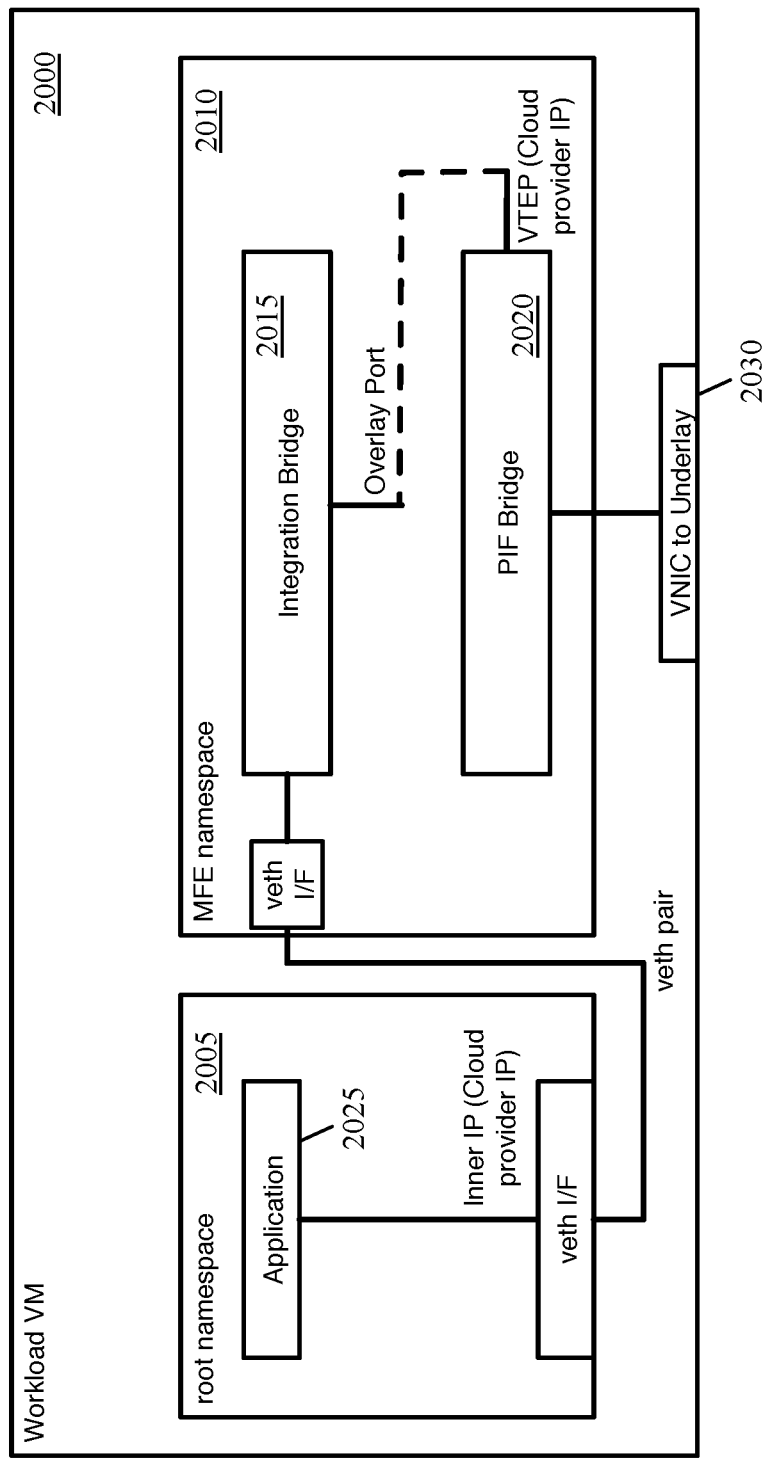
FIG. 20 conceptually illustrates a VM with a managed forwarding element configured in overlay mode, but using the same IP address for the internal port.

FIG. 20 conceptually illustrates a VM 2000 with a managed forwarding element configured in overlay mode, but using the same IP address for the internal port as for the VTEP port. As in the previous examples, the MFE is an OVS instance configured with an integration bridge 2015 and a PIF bridge 2020. However, in this case, the VM 2000 includes both a root namespace 2005 and a second namespace 2010, referred to as the MFE namespace as the MFE bridges are instantiated within this second namespace.

The workload application 2025 operating on the VM 2005 executes in the root namespace 2005, which is what a user of the VM (as opposed to the network administrator) would normally see when logged into the VM. The MFE namespace 2010 includes the integration bridge 2015 and the PIF bridge 2020, which operate in the same manner as for the MFE 1700 described above. That is, the integration bridge 2015 performs logical L2 and L3 processing for packets sent to and from the workload application 2025. This may include egress and ingress ACLs for each logical forwarding element in the logical topology as well as logical switching and/or routing. In addition, the integration bridge 2015 performs distributed firewall, distributed encryption, tunneling to third-party service appliances, etc. as in the other modes of the MFEs. In addition, there is no patch port configured to send packets between the two bridges 2015 and 2020 in this case. Instead, the integration bridge 2015 includes an overlay port that connects to a VTEP on the PIF bridge 2020.

However, the use of two different namespaces allows both the VTEP on the PIF bridge and the application 2025 to both use the same IP address from the cloud provider (i.e., the IP address associated with the VNIC 2030 of the VM 2000). Different network stacks running in each of the two namespaces are both allowed to be associated with the same cloud provider IP address. These two namespaces 2005 and 2010 are connected by a veth (virtual network interface) pair, that connects these veth interfaces configured on each of the two namespaces.

Thus, when the workload application sends a packet to a logical network destination (either in the same VPC or in a different VPC/datacenter), the packet (having the cloud provider IP as its source IP) is sent through the veth pair to the integration bridge 2015, which performs the requisite logical network processing on the packet. The integration bridge 2015 also encapsulates these packets to be sent to another VM on the VPC (either a workload VM or the gateway VM). The source IP in the encapsulation header is the same as the source IP of the inner packet. However, the encapsulation is still used, as the logical network of some embodiments uses the encapsulation header to carry additional context information (e.g., regarding the logical processing performed by the integration bridge). Similarly, packets sent to the workload application (from the gateway or other MFEs in the VPC) will be received at the PIF bridge 2020 with the same destination IP address for both their inner and outer headers. The integration bridge removes the outer (encapsulation) header and identifies any logical context, then delivers the packet through the veth pair to the workload application (i.e., to the network stack in the root namespace). Thus, the packet processing by the MFE, public cloud forwarding elements, gateway, etc. is similar to that shown in FIGS. 18 and 19, in terms of the input and output from the various components shown in those figures, although the internal workings of the MFEs are different.

VI. NAT and Other Services

In the above section V, the packet processing examples all relate to east-west traffic originating from a workload DCN in a public cloud VPC (either sent to another workload in the VPC or in a different datacenter, but still attached to the logical network), and focus on the different types of processing performed by the MFEs operating in those workload DCNs. However, many logical networks include workloads that should be accessible by external clients. For instance, a typical three-tier (web servers, app servers, database servers) setup will require at least the web servers to be able to connect with clients via the Internet. Because the VPC subnets are typically private IP addresses that may be re-used by numerous VPCs of different tenants within a datacenter (and re-used at various different datacenters), network address translation (NAT) is generally used to modify the source IP address of outgoing packets (and, correspondingly, the destination IP address of incoming packets) from the internally-used private IP address to a public IP address.

Furthermore, when the logical network is implemented at least partially in a public datacenter, the actual translation to a public IP address might need to be performed by the cloud provider's internet gateway, rather than by any of the managed forwarding elements. The cloud provider gateway will be the last hop within the datacenter for the packets, and while internal to the datacenter they will need to have the private IP address. However, because the cloud provider will not have assigned the internal IP addresses used by the workload applications (the addresses corresponding to the logical switch ports), packets should not be sent to the provider's gateway using these addresses. Instead, the MFEs managed by the network control system of some embodiments perform their own NAT to translate the internal IP addresses to addresses registered with the cloud provider.

Different embodiments may implement this network address translation in different manners. Some embodiments apply NAT as part of the gateway datapath. In this case, north-bound packets are tunneled from the source MFE to the gateway, where the IP address is translated in a consistent manner to a secondary IP address. Some embodiments use a NAT table that maps each internal workload IP address to a secondary IP address registered with the cloud provider. All of these secondary IP addresses are then associated with the gateway's northbound interface, and the cloud provider's gateway performs translation from these secondary IP addresses to public IP addresses. In the centralized case, other network services may also be applied at the gateway, such as service chaining (sending packets out to third-party service appliances for various middlebox processing), intrusion detection, north-south firewall, VPN, audit logging, etc. In addition, when the gateway performs NAT, any load balancing will need to be performed in the gateway as well (the cloud provider may not be able to perform load balancing in this case because as far as the provider's gateway is concerned, all traffic is sent to the gateway interface).

Other embodiments perform the first level of NAT in a distributed manner, in the MFE operating on the source VM (destination VM for incoming traffic). In this case, for outgoing packets, the source MFE performs address translation and sends the translated packet directly to the cloud provider gateway, bypassing the gateway. As such, the source MFE differentiates between overlay traffic that it encapsulates using its VTEP IP and north-south traffic that it sends unencapsulated onto the cloud provider underlay network. Because this traffic (in both directions) does not pass through the gateway, any service chaining, intrusion detection, north-south firewall rules, logging, etc. is performed at the MFE operating on the workload VM.

For load balancing, distributed internal NAT allows the use of existing load balancing features of the cloud provider. Instead of using multiple public IP addresses, a single address (or only a small number of addresses) can be used, and all incoming connections are sent to this address. The internet gateway (or a special load balancing appliance) of the cloud provider performs load balancing to distribute these connections across different workload VMs (which still need to perform their own internal NAT) in a balanced manner.

A. Centralized NAT

In the centralized NAT case, the MFEs operating in workload VMs are configured in the same overlay mode manner as shown above in Section V.B. In either non-overlay mode or overlay mode with migrated IP addresses, no internal layer of NAT is required, because the IP address with which packets are sent out will match that of the VM's network interface. However, for overlay mode, as mentioned, the internal layer of NAT is performed by the gateway datapath operating in the gateway VM within the VPC of the source (or destination, for incoming packets).

Figure 21:
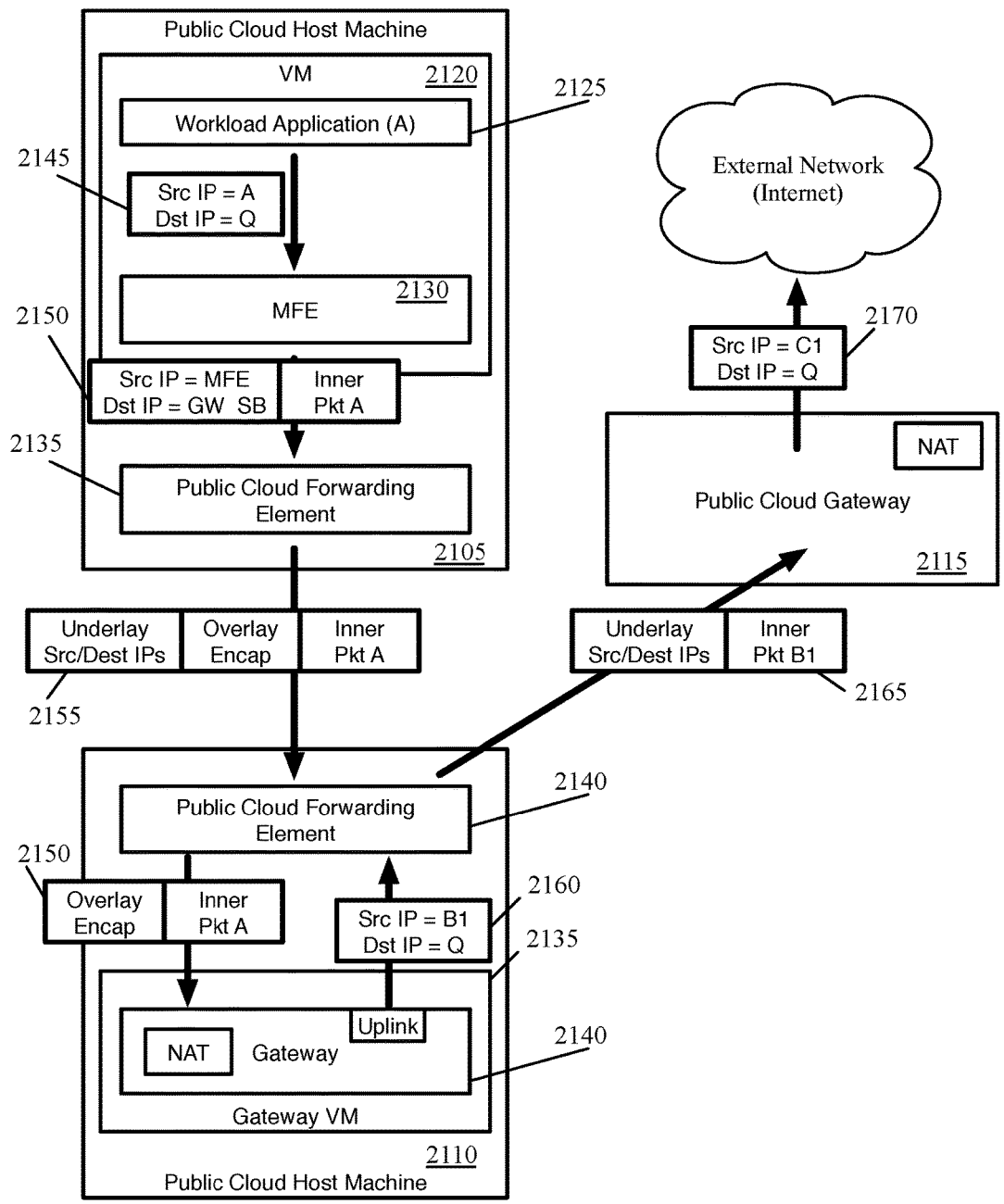
FIG. 21 conceptually illustrates an example of packet processing through a cloud provider network for a northbound packet sent from a workload application to a destination outside the logical network.

FIG. 21 conceptually illustrates an example of packet processing through a cloud provider network for a north-bound packet sent from a workload application to a destination outside the logical network (e.g., an Internet client, a destination on a completely separate logical network, etc.). FIG. 21 includes two host machines 2105 and 2110 operating VMs in the same VPC in a public datacenter, as well as a public cloud gateway 2115 that also operates in the same public datacenter, though not within the same VPC. A workload VM 2120 operates on the first host machine 2120, with a workload application 2125 and a MFE 2130 (in overlay mode) executing in the workload VM. A gateway VM 2135 operates on the second host machine 2110, with a gateway datapath 2140 executing on the VM (in addition to a controller, PCM, etc. that are not shown here). As mentioned, the MFE 2130 operates in overlay mode, with an internal IP address A associated with the logical switch port to which the workload attaches and a VTEP IP address associated with the VPC subnet of the cloud provider. In addition, each of the host machines 2105 and 2110 includes a respective public cloud forwarding element 2145 and 2150 to which their respective VMs connect. As in the previous cases, these public cloud forwarding elements may be software virtual switches, to which the network control system does not have access. The public cloud gateway 2115 may operate as a separate physical appliance, a VM, or any other form factor. This gateway 2115 handles non-VPN traffic between VPCs located in the public datacenter and machines outside the public datacenter.

As shown, the workload application 2125 sends a packet 2145 to the MFE 2130 on its VM 2120. As with the packets in previous examples, this packet 2145 contains source and destination IP addresses (and MAC addresses), various headers, and a payload. The source IP address A is the internal IP address of the workload application 2125 (as opposed to the VM interface IP address), while the destination IP address Q is that of a destination external to the logical network.

At this point, the MFE 2130 performs logical switch and logical router processing (assuming a single-tier logical router topology) and determines that the packet should be sent to the uplink port of the logical router. This uplink port maps to the gateway datapath 2140, so the MFE 2130 encapsulates the packet 2145 to be tunneled to the gateway's VTEP. The MFE 2130 outputs this encapsulated packet 2150 from the VM interface, which connects to the public cloud forwarding element 2135. As shown, the source IP address for this encapsulation is that of the VTEP of the MFE (i.e., the address of the VM interface), while the destination IP address is that of the VTEP of the gateway datapath 2140 (i.e., the address of the gateway VM interface used for tunnel traffic).

Assuming the public cloud forwarding network uses tunneling between host machines, the public cloud forwarding element 2135 encapsulates the packet 2150 a second time with its own underlay encapsulation and sends this twice-encapsulated packet 2155 out over the physical cloud provider network. The underlay encapsulation uses the IP addresses of interfaces of the host machines 2105 and 2110 as its source and destination IP addresses, respectively.

After traveling through the underlay network, the packet 2155 is received by the host machine 2110, where the public cloud forwarding element 2140 removes the underlay encapsulation. The forwarding element 2140 sends the still-encapsulated packet 2150 to the gateway VM 2135 via the gateway VM's interface for tunneled traffic, based on the destination IP address of the overlay encapsulation. The gateway datapath 2140 processes this packet 1955 by removing the encapsulation and identifying that the destination IP address corresponds to its uplink port.

The gateway datapath 2140 (e.g., the centralized routing component in the datapath) then determines that network address translation is required for the packet, in order for the packet to be sent out of the logical network to its destination Q. As such, the gateway datapath uses a NAT table to identify the IP address provided by the public cloud provider to which to map the source address A. When the gateway 2140 is not performing load balancing, some embodiments allocate one IP address per workload application. For centralized NAT, some embodiments do not use the VM interface IPs, because incoming packets should be directed to the gateway 2140 rather than directly to the workload VMs from the public cloud gateway 2115. Instead, the tenant will have a number of "secondary" IP addresses allocated from the public cloud provider, all of which map to the uplink interface of the gateway datapath 2140. In this case, the gateway performs its NAT to modify the source IP address of the packet 2145 from A to B1, while the destination IP address remains Q.

The gateway outputs this translated packet 2160 to the public cloud forwarding element 2140, which subsequently encapsulates the packet 2160 for the public cloud provider underlay tunnel, and sends the encapsulated packet 2165 through the cloud provider network to the public cloud gateway 2115. Here, the public cloud gateway 2115 performs its own NAT using a separate NAT table that maps the various secondary IP addresses to public IP addresses (e.g., to elastic IPs that are dynamically allocable). In this case, the public cloud gateway's NAT table specifies to map the secondary IP address B1 to the public IP address C1. The public cloud gateway then sends this new translated packet 2170 onto an external network (e.g., the Internet) towards its destination Q.

Figure 22:
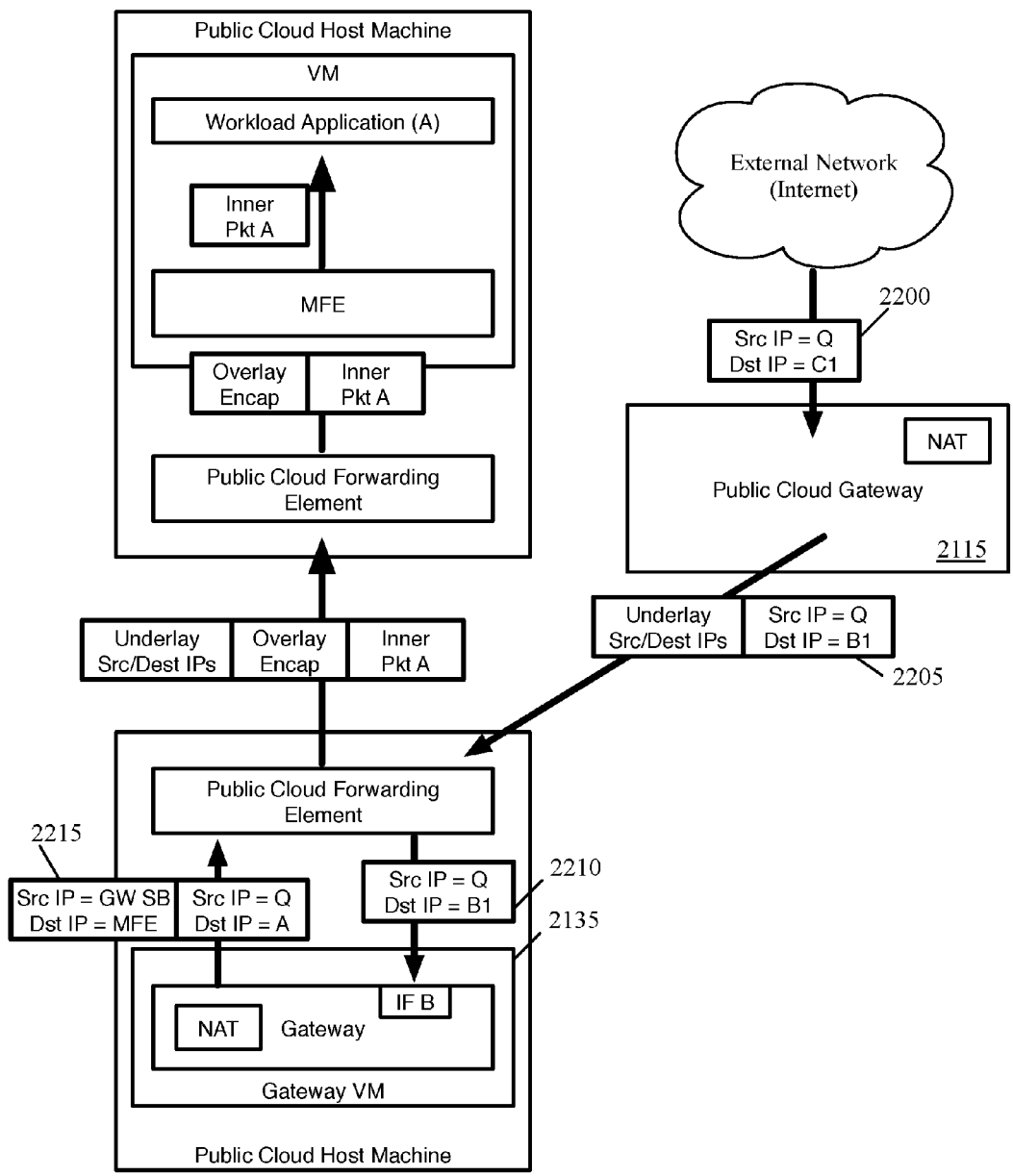
FIG. 22 illustrates the processing within the public cloud gateway when an incoming packet is sent from an external source to one of the public IP addresses associated with the tenant's VPC.

FIG. 22 illustrates the processing within the public cloud gateway when an incoming packet 2200 is sent from a source Q to one of the public IP addresses (C1) associated with the tenant's VPC. In this figure, the packet travels the opposite path of that shown in the previous FIG. 21. That is, the packet 2200 is received by the public cloud gateway 2115, which performs NAT on the destination address according to its NAT table. In some embodiments, this NAT table is static (e.g., a 1:1 static mapping between secondary IPs and public IPs).

The public cloud gateway translates the destination IP address C1 to B1 and outputs the translated packet onto the underlay, sending the encapsulated packet 2205 to the gateway VM 2135 that is associated with the address B1. The public cloud forwarding element 2140 removes the underlay encapsulation and sends this packet 2210 to the uplink interface of the gateway. The gateway datapath 2140 performs its own internal NAT processing to translate the secondary IP address B1 into the new destination address A. In addition, the gateway datapath 2140 performs logical network processing to identify that the destination address A maps to a logical switch port located at the MFE 2120, and thus encapsulates the translated packet using its own southbound interface as the source IP and the VTEP IP address of the MFE 2120 as the destination IP. This packet then follows the path of any intra-VPC packet, being encapsulated again by the public cloud forwarding element 2140 on the host machine 2110, decapsulated by the public cloud forwarding element 2135 on the host machine 2105, delivered to the MFE 2120 which decapsulates the overlay encapsulation, performs any security processing required, and delivers the packet to the workload application.

Figure 23:
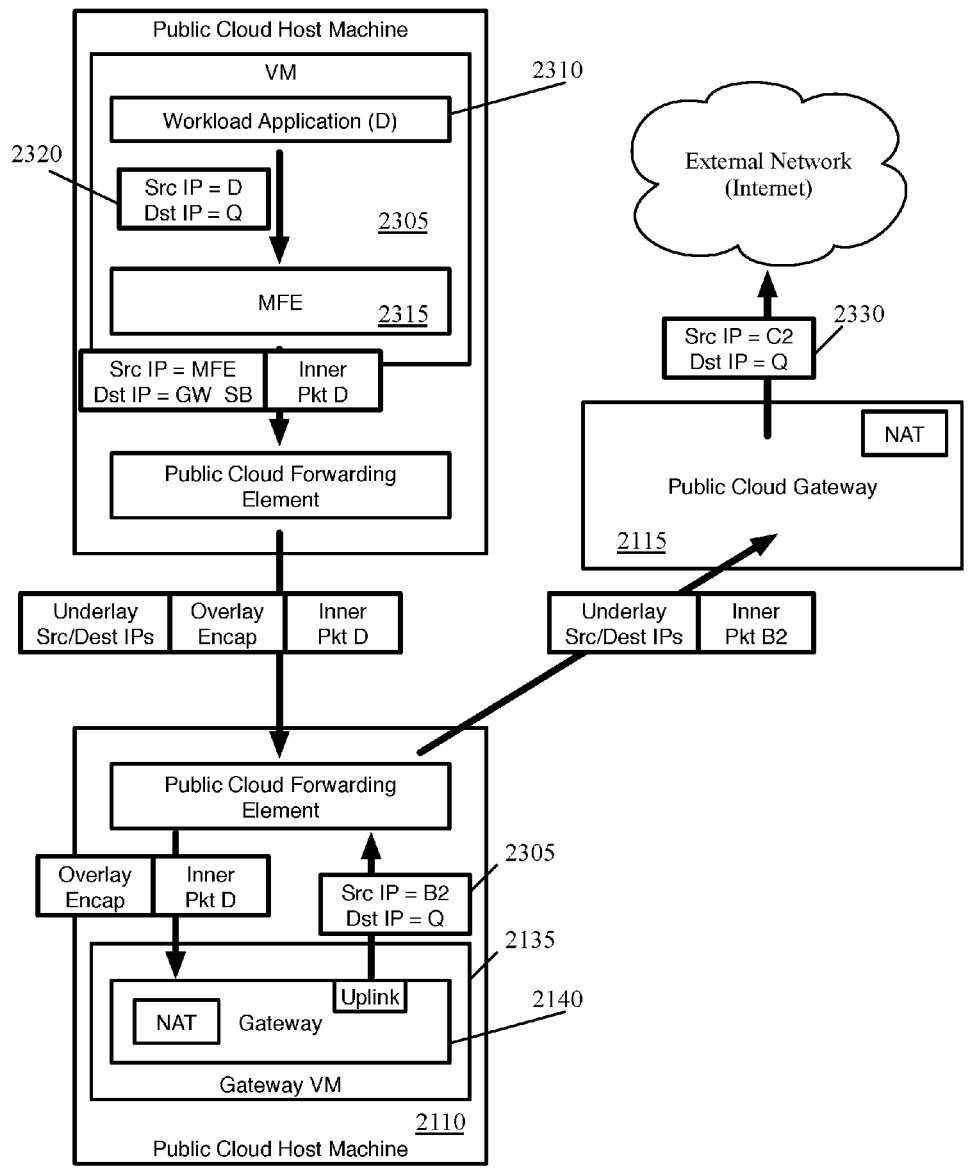
FIG. 23 illustrates the packet processing through the cloud provider network of FIG. 21 for a packet sent from a different workload application on the same VPC as the workload application in FIG. 21.

FIG. 23 illustrates the packet processing through the cloud provider network of FIG. 21 for a packet sent from a different workload application on the same VPC as the workload application 2125. This figure includes the host machine 2110 with a gateway VM 2135 and the public cloud gateway 2115, as well as a host machine 2300 on which a VM 2305 operates. A workload application 2310 and a MFE 2315 execute on the VM 2305. The workload application 2310 has an internal IP address D associated with the logical switch to which it attaches, while the VTEP of the MFE 2315 has a different IP address.

In this example, the workload application 2310 sends a packet 2320 with the source address D. This packet follows a similar path as the packet 2145 in FIG. 21, until it reaches the gateway datapath 2140. This datapath 2140 identifies that source NAT is required for the packet 2145, and therefore consults its internal NAT table to determine that the address D should be mapped to a secondary IP address B2, different from that to which the IP address A maps. The gateway datapath sends the translated packet 2325 out its same uplink interface using a different IP address than in the previous example. As a result, when the translated packet 2325 reaches the public cloud gateway 2115 with a source address B2, the public cloud gateway 2115 translates this source address to a different public IP address C2, and sends the packet 2330 out to the external network.

The above figures assume that the cloud provider will allow multiple IP addresses for a single interface of a VM. If the cloud provider does not enable this feature, then only one public IP address will be possible using centralized NAT. In this case, if only outbound connections are initiated, multiple internal IP addresses may be used, and the NAT table in the gateway uses stateful translation rules to assign return traffic the correct destination IP address. For inbound connection origination, L4 port-based DNAT rules can be configured in the gateway to forward traffic to the correct applications/VMs, so long as the different applications run on different L4 ports.

B. Distributed NAT

Figure 24:
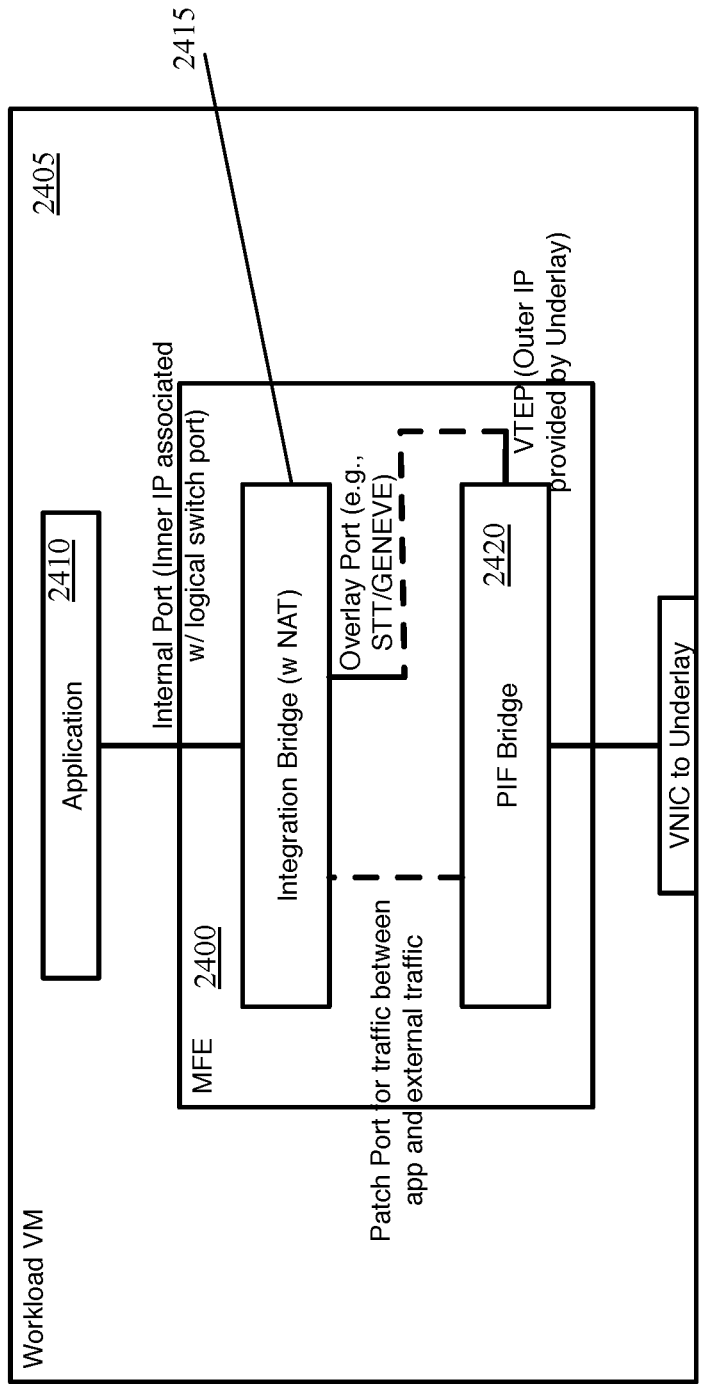
FIG. 24 conceptually illustrates a VM with a managed forwarding element configured in overlay mode with distinct IP address, that also performs NAT for north-south traffic.

In the distributed NAT case of some embodiments, the MFEs operating in the workload DCNs are also configured in the same overlay mode manner as shown above, but these MFEs also perform NAT on north-south packets. As a result, north-south traffic does not need to be sent to the gateway operating in the VPC. FIG. 24 conceptually illustrates a VM 2405 with a managed forwarding element 2400 configured in overlay mode with distinct IP addresses, and which also performs NAT for north-south traffic. The MFE 2400 is configured in a similar manner to the MFE 1700 shown in FIG. 17, with the workload application 2410 connected to the integration bridge 2415 via an internal interface having an inner IP address, and the integration bridge having an overlay port through which packets are sent to a VTEP on the PIF bridge 2420. The VTEP has a separate IP address provided by the cloud provider, which is associated with an interface of the VM.

The difference, in this case, is that a patch port also is configured between the integration bridge 2415 and the PIF bridge 2420. The integration bridge performs logical processing on outgoing packets and, for east-west traffic (e.g., when the destination is identified as corresponding to a logical port other than a logical router uplink port), encapsulates the packets and sends them out of the overlay port. On the other hand, for north-south packets (that map to an uplink port of a logical router), the integration bridge 2415 instead performs source NAT on these packets and sends them directly to the PIF bridge 2420 unencapsulated via the patch port (as was the case with traffic in the non-overlay case). In some embodiments, the MFE also creates stateful rules to process return traffic for the connection; in other embodiments, because only one mapping of a single internal IP address to cloud provider-assigned IP address is used for all connections, no stateful rules are required. The NAT address may be the same as the VTEP IP address in some embodiments, so that the tenant does not need to have the cloud provider assign multiple IP addresses. In other embodiments, the two IP addresses are different, in which case the VM either has multiple interfaces or multiple IP addresses for the same interface.

For incoming traffic, the PIF bridge 2420 identifies whether the packet is tunnel traffic or southbound traffic from an external source. Some embodiments identify whether the packet has a destination IP address in the limited set of IP addresses corresponding to the other VTEPs in the VPC, including the gateway, to classify incoming traffic as intra-VPC overlay traffic. Overlay traffic is sent to the VTEP so that the integration bridge 2415 will receive the traffic on the overlay port and decapsulate the packets, while southbound traffic is sent to the integration bridge 2415 via the patch port. For this southbound traffic, the integration bridge 2415 performs destination NAT either based on stored state (e.g., for return traffic, if state is stored) or using its NAT rules (e.g., for newly initiated incoming connections or in if no stateful NAT rules are stored).

Figure 25:
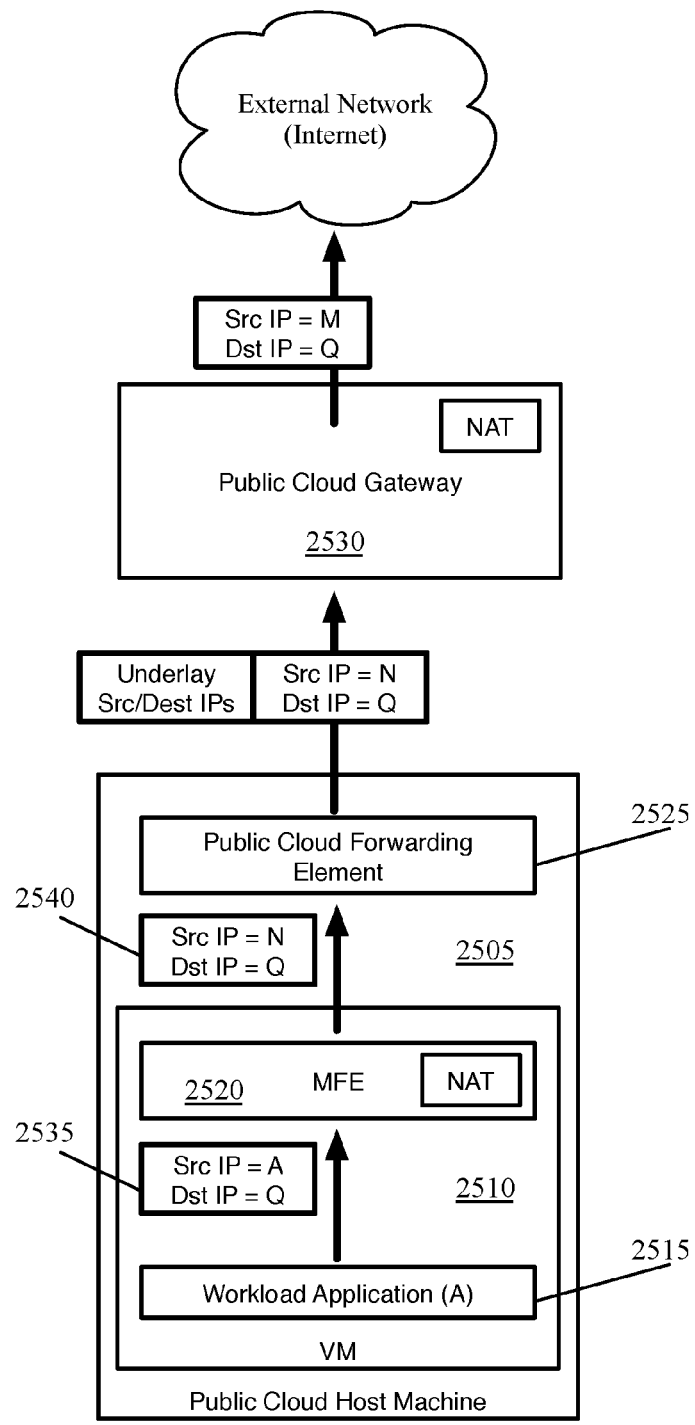
FIGS. 25 and 26 illustrate examples of packet processing through a cloud provider network for northbound and southbound in the distributed NAT setup.
Figure 26:
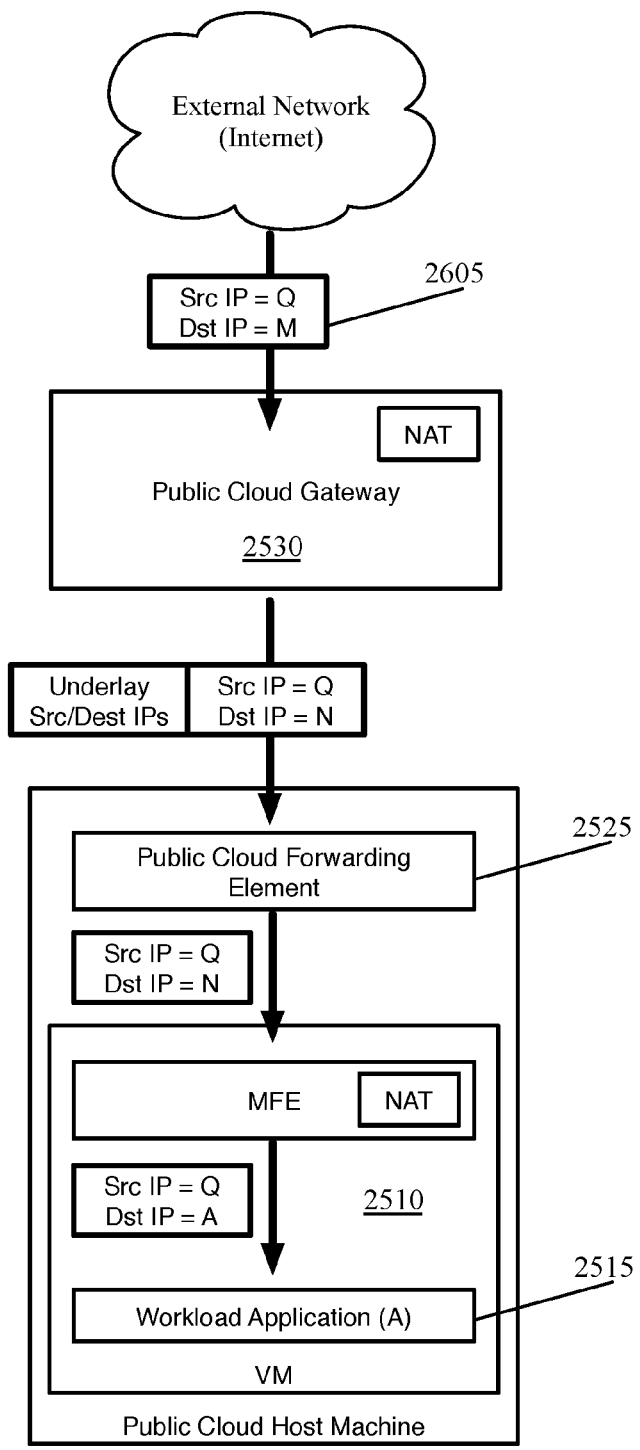

FIGS. 25 and 26 illustrate examples of packet processing through a cloud provider network for northbound and southbound in the distributed NAT setup. Specifically, FIG. 25 illustrates an example of packet processing for a northbound packet sent from a workload application to a destination outside the logical network (e.g., an Internet client, a destination on a completely separate logical network, etc.). FIG. 25 includes only a single host machine 2505 that hosts a VM operating in a VPC. A workload VM 2510 operates on the host machine 2505, with a workload application 2515 (having an internal IP address A) and a MFE 2520 executing in the workload VM. As in the previous examples, the host machine 2505 also includes a public cloud forwarding element 2525, which may be a software virtual switch to which the network control system does not have access. In addition, the figure shows a public cloud gateway 2530 that may operate as a separate physical appliance, VM, etc. to handle non-VPN traffic between VPCs located in the public datacenter and machines outside the datacenter.

As shown, the workload application 2515 sends a packet 2535 to the MFE 2520 on its VM 2505. This packet has a source IP address A (the internal IP address of the workload application, associated with a logical switch port) and a destination IP address Q of a remote external destination. The MFE 2520 performs logical switch and router processing, and maps this destination address to an uplink logical router port. In this case, the MFE is configured to perform NAT for packets sent to this logical port, and thus translates the source IP address from A to N according to its NAT configuration. As mentioned, the IP address N may be the same as the VTEP address used for tunneling within the VPC, or it may be a different IP address also assigned by the cloud provider.

The MFE 2520 then sends this translated packet 2540 out to the public cloud forwarding element 2525 without encapsulation. This packet is encapsulated by the forwarding element 2525 and sent on the underlay (public cloud) network directly to the public cloud gateway 2530, thereby skipping the VPC gateway that is required for north-south traffic in the centralized NAT case. The public cloud gateway 2530 has its own NAT table, and after removing the underlay encapsulation translates the source IP address from N to M, a public IP address registered to the tenant.

FIG. 26 illustrates the processing for a southbound packet sent to the workload application 2515 from an external source with IP address Q via the public cloud gateway 2530. In this figure, the public cloud gateway 2530 receives a packet 2605 having a source IP address Q and a destination IP address M, which (as indicated above) is a public IP address associated with the workload VM 2510. This packet follows the opposite path of the packet described in FIG. 25. The public cloud gateway 2530 performs NAT to translate the destination IP address to the private IP address N, and forwards the packet (on the provider underlay network) to the VM 2510. After the public cloud forwarding element 2525 removes the underlay encapsulation, the MFE 2520 identifies that the packet is a southbound, non-encapsulated packet, and performs logical router and logical switch processing on the packet. As part of the logical router processing, the MFE 2520 translates the destination IP address from N to A, the IP address of the workload application 2515. The MFE 2520 then delivers this packet to the workload application 2515.

Figure 27:
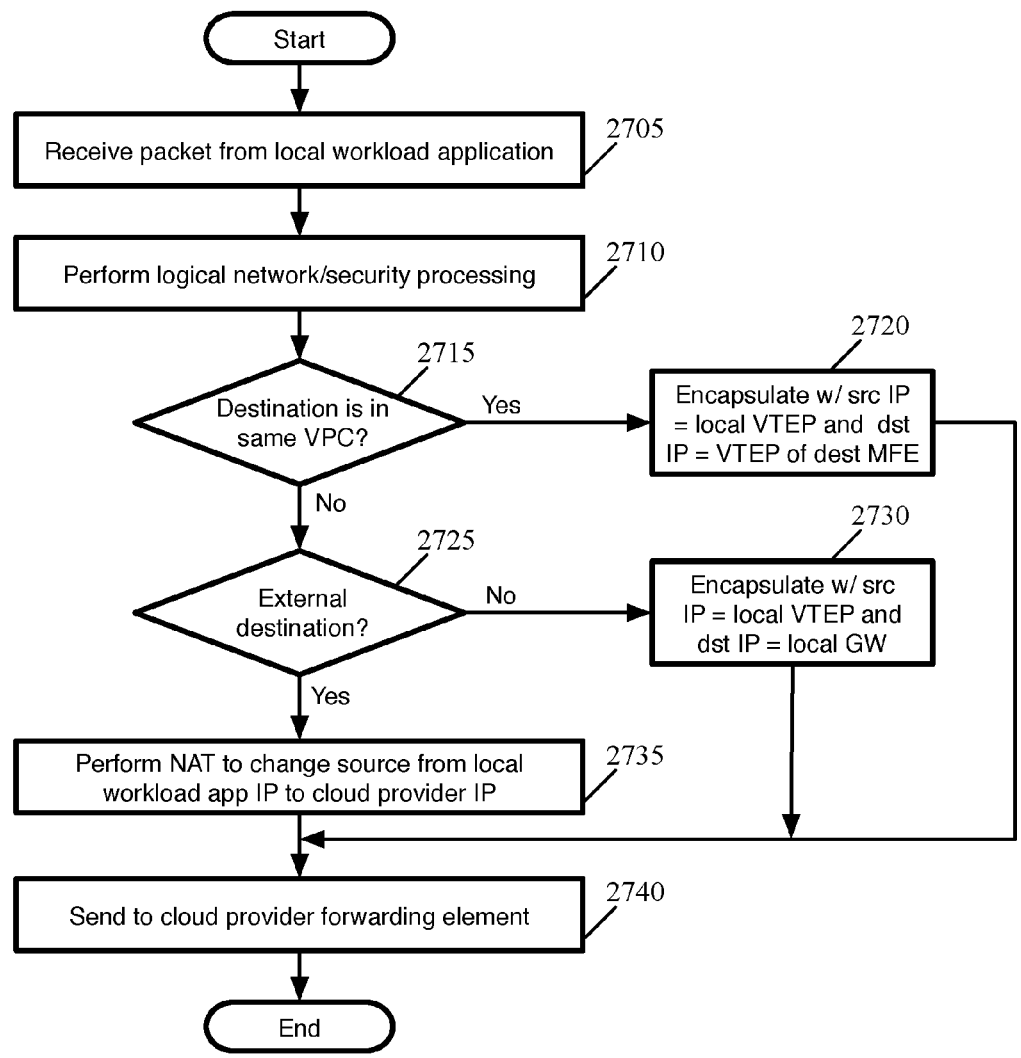
FIG. 27 conceptually illustrates a process performed by a MFE on a workload VM to process an outgoing packet, when the MFE operates in overlay mode and is configured to perform distributed NAT.

FIG. 27 conceptually illustrates a process 2700 performed by a MFE on a workload VM to process an outgoing packet, when the MFE operates in overlay mode and is configured to perform distributed NAT. An example of such a MFE is the MFE 2400 shown in FIG. 24. It should be understood that the process 2400 is a conceptual process, and the MFE (especially a flow-based MFE) may not make determinations as shown in the figure. Instead, such a MFE would process the packet through its flow tables and perform operations according to the matched flow entries. That is, the result of the processing would dictate an action or set of actions to take, rather than the MFE evaluating a yes/no decision as to whether to take a particular action. However, the process 2700 is representative of the different operations that the MFE performs given different types of packets.

As shown, the process 2700 begins by receiving (at 2705) a packet from a local workload application. As the MFE is operating in overlay mode, this packet will have the internal IP address as its source address (assuming the MFE has not been compromised). The process then performs (at 2710) logical network and security processing according to its configuration (i.e., the configuration rules pushed down by its local control agent). This may include logical switch and/or logical router processing, distributed firewall processing, etc.

The process 2700 determines (at 2715) whether the destination for the packet is in the same VPC as the VM on which the MFE operates. When this is the case, the process encapsulates (at 2720) the packet, with the source IP address for the encapsulation being the local VTEP IP address and the destination IP address being the VTEP of the destination MFE within the VPC. An example of this processing is illustrated in FIG. 18, described above.

If the destination is not in the same VPC, the process 2700 determines (at 2725) whether the destination is an external destination (i.e., whether the packet is a northbound packet). If this is not the case, then the packet is addressed to a logical port located in a different VPC or datacenter, and the process encapsulates (at 2730) the packet, with the source IP address for the encapsulation being the local VTEP IP address and the destination IP address being the VTEP of the gateway within the VPC. An example of such processing is illustrated in FIG. 19, also described above. In either of these situations, the MFE identifies a logical switch port within the logical network (though not necessarily on the same logical switch as the local workload application) as the destination for the packet, and thus tunnels the packet to either another local VM or the gateway (in the latter case, so that the gateway can send the packet towards its eventual destination).

However, if the destination is an external destination (e.g., if the destination IP address maps to an uplink logical router port), the process performs (at 2735) NAT to change the source IP address from the internal workload application IP address to an IP address assigned by the cloud provider. This IP address may be the same as the local VTEP IP address, but in this case the address is used as the source IP address for the inner packet (without any encapsulation), rather than as the source IP address in a GENEVE, STT, etc. tunnel header. An example of this processing is shown in FIG. 25. Lastly, the process sends (at 2740) the packet to the cloud provider forwarding element on its host machine, to be sent on the cloud provider's network.

Using distributed NAT, as shown here, enables seamless integration with external cloud provider services, such as storage services, in some embodiments. These external resources can easily determine from which DCN on a VPC they are being accessed, and thus use identity-based policies to control access to these resources. In the centralized NAT case, all such resources would be accessed via the gateway, using IP addresses that do not correspond to the interfaces of the workload DCNs. In addition, the use of distributed NAT allows for easy integration with load balancing services offered by a number of cloud providers.

Figure 28:
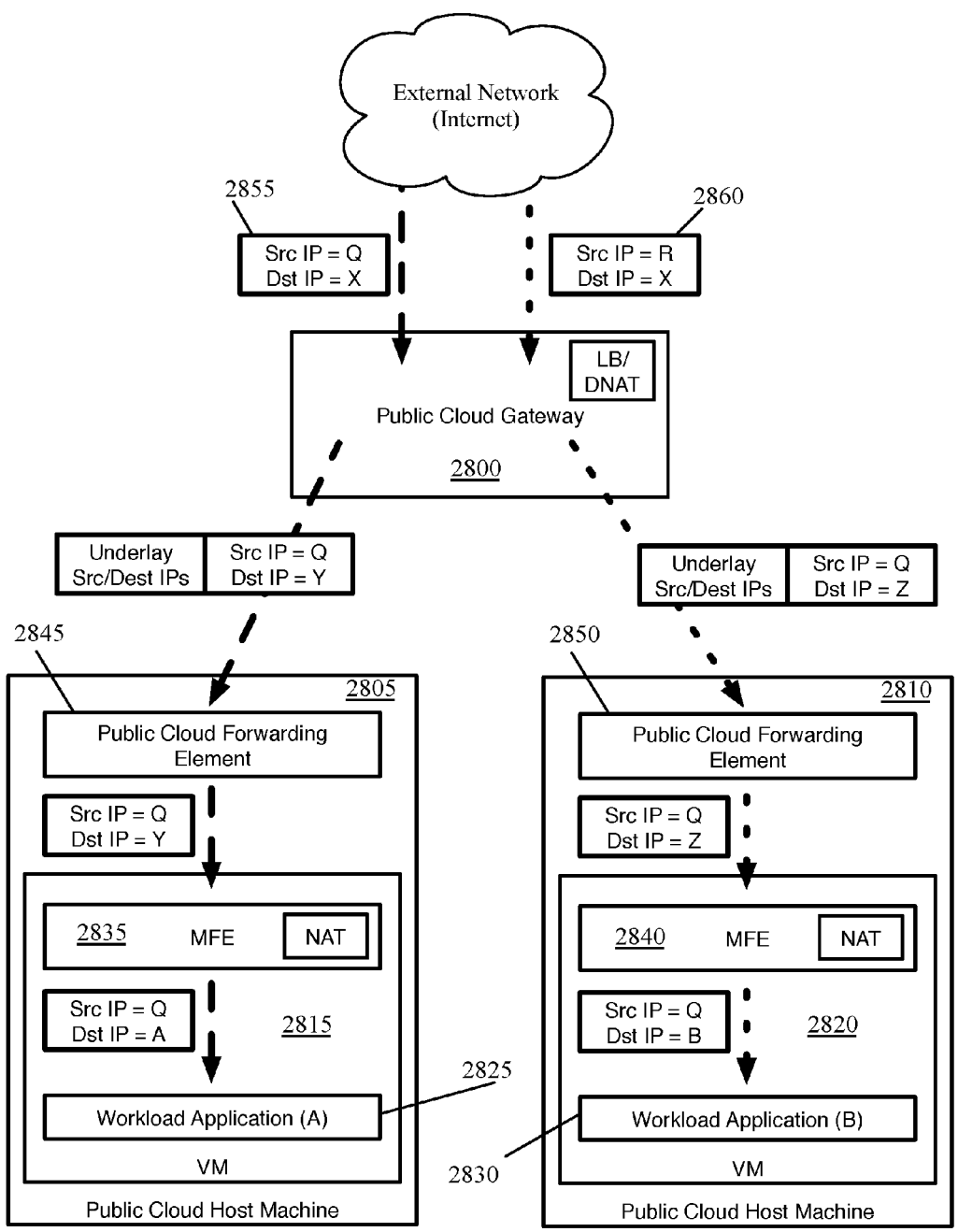
FIG. 28 illustrates the use of load balancing in a public cloud gateway along with distributed NAT by MFEs operating in workload VMs.

FIG. 28 illustrates the use of load balancing in a public cloud gateway 2800 along with distributed NAT by MFEs operating in workload VMs. This figure illustrates two public cloud host machines 2805 and 2810 operating VMs within a VPC. Specifically, a first VM 2815 operates on the first host machine 2805 and a second VM 2820 operates on the second host machine 2810. The first VM 2815 executes a workload application 2825 with an internal IP address A, while the second VM 2820 executes a workload application 2830 with an internal IP address B. In this example, the two workload applications are instances of the same externally-accessible application (e.g., multiple web server instances). In addition, MFEs 2835 and 2840 respectively execute on the two VMs 2815 and 2820, and the host machines 2805 and 2810 respectively include public cloud forwarding elements 2845 and 2850.

The public cloud gateway 2800 (or a separate load balancing appliance provided by the public cloud to attract southbound traffic for the VPC) receives two packets 2855 and 2860. Both of these packets have a destination IP address X (the public IP address associated with the workload applications 2825 and 2830), but are from different sources Q and R. Thus, upon receipt by the public cloud gateway 2800, this gateway performs a load balancing and destination network address translation operation to balance the traffic among these two workloads (and possibly among additional instances on additional VMs).

Based on various factors (a hash of the IP addresses and/or other headers, monitoring of the current traffic load on the different workloads, etc.), the public cloud gateway 2800 selects the destination IP address Y for the first packet 2855, and the destination IP address Z for the second packet 2860. These two IPs correspond to cloud provider assigned VM interfaces of the VMs 2815 and 2820 respectively, and thus the gateway tunnels the packets to the two host machines 2805 and 2810. Assuming these were the first packets in a connection, the gateway also stores the connection and NAT mapping so that any ongoing traffic for the connection will be sent to the same workload application (if they were not the first packets, the gateway would process the packets according to previously-stored state in some embodiments).

When the MFEs 2835 and 2840 receive the packets, they recognize the traffic as unencapsulated southbound traffic, and therefore perform their own NAT on the packets. These NAT operations translate the destination IP address Y to A for the first packet at the first MFE 2835 and translate the destination IP address Z to B for the second packet at the second MFE 2840.

This use of load balancing also enables auto-scaling of new workload VMs, if supported by the cloud provider. With auto-scaling, if the workloads are too heavily taxed, the cloud provider automatically creates a new instance running the same application, and the provider's load balancer begins taking the new instance into account in its load balancing decisions.

VII. Distributed Network Encryption

Some embodiments enable the use of distributed network encryption (DNE), managed by the network control system, within the public datacenter. In some embodiments, DNE is only available between DCNs operating within the same VPC or within peered VPCs, while in other embodiments DNE is available between any two DCNs attached to logical ports of the logical network (including between a workload DCN and a gateway).

Distributed network encryption, in some embodiments, allows the network control system administrator to set encryption and/or integrity rules for packets. These rules define (i) to which packets the rule will be applied and (ii) the encryption and/or integrity requirements for those packets. Some embodiments define the packets to which a rule applies in term of the source and destination of the packet. These source and destination endpoints may be defined based on IP addresses or address ranges, MAC addresses, logical switch ports, virtual interfaces, L4 port numbers and ranges, etc., including combinations thereof.

Each rule, in addition, specifies whether packets meeting the source and destination characteristics require encryption (possibly along with authentication), only authentication, or plaintext (which may be used as a setting in order to allow broadcast packets). Encryption requires the use of a key to encrypt a portion or all of a packet (e.g., the entire inner packet, only the L4 and up headers, the entire inner and out packet for a tunneled packet, etc.), while authentication does not encrypt the packet but uses the key to generate authentication data that the destination can use to verify that the packet was not tampered with during transmission (e.g. a hash of the packet or a portion thereof).

Figure 29:
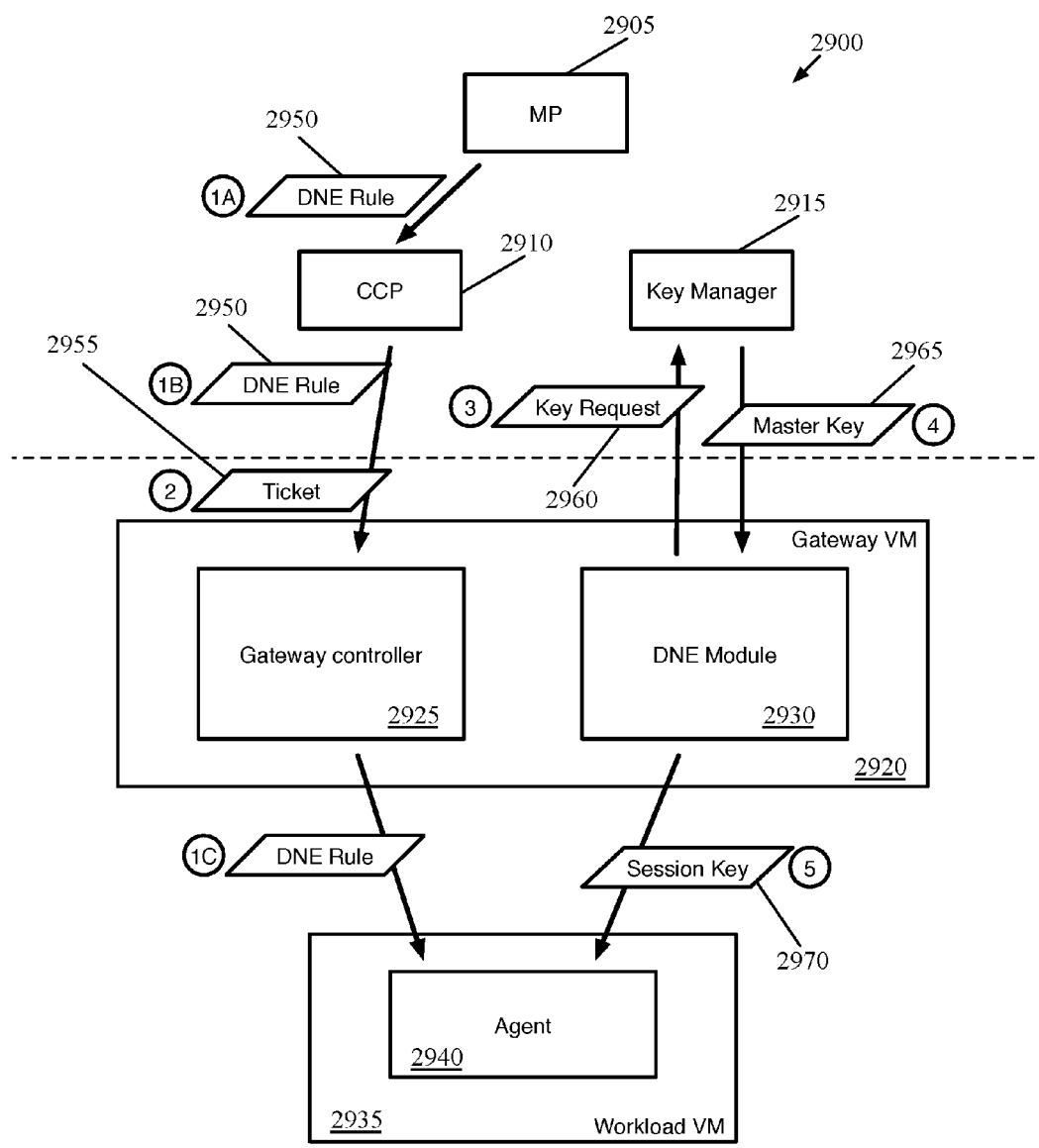
FIG. 29 conceptually illustrates a DNE rule and key distribution system of some embodiments, as well as the flow of data to implement a DNE rule on a MFE in the public datacenter.

To have the MFEs in a network implement the DNE rules, the network control system needs to distribute the keys to the MFEs in a secure manner. Some embodiments use a DNE module in the gateway VMs in order to communicate with the DNE aspects of the network control system and distribute keys to the MFEs operating in the workload VMs in its VPC. FIG. 29 conceptually illustrates such a DNE rule and key distribution system 2900 of some embodiments, as well as the flow of data to implement a DNE rule on a MFE in the public datacenter.

The DNE rule/key distribution system 2900 includes management plane 2905, central control plane 2910, and key manager 2915 within the private datacenter. These components could also be located in a separate VPC (or the same VPC) of a public datacenter, but in general network administrators will want to keep these components on their own private datacenter, as the key manager 2915 securely stores the master keys for use in the DNE system. While a brief description of the operations of these components is given here, the ticket and key distribution processes are described in greater detail in U.S. Provisional Patent Application 62/380,338, which is incorporated by reference above.

The management plane 2905 and central control plane 2910 have been described above, in relation to their operations in distributing network forwarding and security rules. As with forwarding configuration, when the management plane 2905 receives a DNE rule (e.g., from a cloud management platform configured with the management plane APIs), it formats this rule and passes the rule to the central control plane 2910. The central control plane 2910 performs a span computation for the rule in order to identify the local controllers, including any gateway controllers in public datacenter VPC, that require the rule.

The key manager 2915 of some embodiments is a secure storage that stores encryption keys for use by the MFEs managed by the network control system 2900. In some embodiments, the key manager 2915 is a hardware appliance, a VM operating in a secure manner in the private datacenter, etc. In some embodiments, the key manager specifies constructs and mechanisms to define groups of keys for manageability, and provides various security controls (e.g., access control and authentication) to access keys. In some embodiments, the authentication mechanisms include public key infrastructure (PKI) certificates, user credentials, and/or shared secrets. The key manager of some embodiments also enforces attestation of the requester to address the malicious requester threats.

The key manager 2915 registers with the management plane 2905, and obtains certificates for the management plane 2905, central control plane 2910 (i.e., one or more controllers in the central control plane cluster), and local controllers (including any gateway controllers). By having the key manager 2915 obtain these certificates upon registration, the network control system 2900 avoids duplicative communication at the time a local controller requires a key for a specific DNE rule (i.e., communication to verify that the local controller requesting a key is a valid controller).

In some embodiments, the key manager 2915 generates keys based on key requests, in addition to storing keys that have been generated based on such requests. The stored keys may be used if subsequent requests for the same key are required (e.g., if a VM that requires a key is powered off and back on, or otherwise restarts). Some embodiments store the keys in the key manager 2915 encrypted with a key encryption key, which is secured in a password protected read-only file and loaded in to the memory of key manager 2915 during an initial stage with input from a human administrator.

Within the public datacenter VPC, the system 2900 includes a gateway VM 2920 with a gateway controller 2925 and a DNE module 2930, as well as a workload VM 2935. The gateway VM 2920 and its gateway controller 2925 are described in detail above, and it should be understood that the gateway VM 2920 may also execute various other features, such as the gateway datapath, public cloud manager, etc. that are described above in Section II.

The DNE module 2930 is responsible for handling any keys needed by any of the MFEs within the VPC of the gateway VM 2920. The DNE module 2930 interacts with the key manager 2915 in order to manage encryption keys for the MFEs in its VPC. When the central control plane 2910 receives rules specifying encryption and/or authentication requirements for packets sent to or from any of the workloads operating in the VPC, the central controller distributes these rules to the gateway controller 2935). The encryption rules of some embodiments include a ticket used by a controller to acquire a key from the key manager 2915. The DNE module 2930, or the gateway controller 2925, uses this ticket to request a key from the key manager 2915, which provides a master key for the encryption rule. The DNE module 2930 receives the master key and uses this key to generate a session key for the rule. The session key, in some embodiments, is generated as a function of the master key and one or more additional parameters specific to the two endpoints that will be performing encryption. The DNE module 2930 (e.g., via the gateway controller 2925) distributes the generated session keys to the appropriate endpoints.

The workload VM 2935 is one of several workload VMs operating in the same VPC of the public datacenter. The VM includes a local control agent 2940, as well as the MFE that actually implements DNE rules, a workload application, etc. (which are not shown).

Having described the components of the system 2900, the example data flow shown in FIG. 29 will now be described. As shown by the encircled 1A, the management plane 2905 passes a DNE rule 2950 to the central control plane 2915. This DNE rule 2950 would have been received as input (e.g., from a network administrator, possibly via a cloud management interface) through APIs of the management plane. The DNE rule 2950, as described above, specifies to which packets the rule applies and (ii) the encryption and/or integrity requirements for those packets. In some embodiments, the rule might also include policies such as the type of encryption to use, how often to rotate (i.e., modify in a specific manner) the key in use, whether to revoke the key after a specific amount of time, etc.

The central control plane 2910 receives this rule 2950 and determines its span. If the rule has specific source and destination endpoints, then the span might be only the two first-hop MFEs for those endpoints. On the other hand, a rule might specify for all traffic to or from a specific logical port to be encrypted, in which case the first-hop MFEs for all endpoints that might be communicating with the specific logical port will need to receive the rule. In this example, at least the application operating on the VM 2935 is an endpoint for the rule, and thus the central control plane determines that the span for the rule includes the gateway controller 2925. As shown by the encircled 1B, the central control plane 2910 distributes this DNE rule 2950 to the gateway controller 2925. The gateway controller 2925 determines the span of the rule within its VPC, identifies the MFE on the workload VM 2935 as one MFE that requires the rule (for intra-VPC encryption, at least one additional endpoint will need the rule, and for encryption outside the VPC, the datapath on the gateway VM will need the rule), and distributes the rule 2950 to the local control agent 2940 on the VM 2935, as shown by the encircled 1C.

In addition to the rule itself, in some embodiments the CCP distributes a ticket 2955 to the gateway controller 2925, as shown by the encircled 2. In some embodiments, an encryption key ticket is generated for the gateway controller based on a key identifier and a security parameter index (SPI). The security parameter index, in some embodiments, identifies the security properties of a connection (e.g., between two endpoints) for which DNE will be used, such as the key length, encryption algorithm, etc. This ticket 2955 acts as a security token for retrieving a key from the key manager 2915. In some embodiments, the ticket includes a key identifier, a local controller identifier, an expiration time, and a signature.

Upon receiving the ticket 2955, the gateway controller passes the ticket (not shown) to the DNE module 2930, which sends a key request 2960 to the key manager 2915, as shown by the encircled 3. In some embodiments, the gateway controller 2925 actually sends the key request to the key manager itself. The request includes the ticket or information from the ticket certifying that the gateway controller is authorized to receive the key by the central control plane. The key manager 2915 verifies this request, and sends a master key 2965 to the gateway VM 2920, as shown by the encircled 4. In this figure, the DNE module 2930 receives this master key 2965. In some embodiments, the master key 2965 is sent to the gateway controller 2925, which passes the key to the DNE module 2930.

The DNE module 2930 uses the master key to generate a session key for the MFE at the VM 2935 (and at any other VMs that will use the key). In some embodiments, the session key is a function of the master key, SPIs relating to the two endpoints of the connection and/or VTEP IP addresses of the two endpoints, and a random number. In some embodiments, if the rule specifies multiple connections (e.g., from source A to either destination B or destination C), then the DNE module 2930 generates different session keys for each connection between two endpoints. That is, in the above example, two session keys are generated, one for the connection between A and B and one for the connection between A and C. Some embodiments use symmetric key encryption, in which case the same session key is distributed to each endpoint of a connection. As shown by the encircled 5, the DNE module 2930 (either directly or through the gateway controller) distributes a session key 2970 to the local control agent 2940.

In some embodiments, the encryption on the agent is not performed by the MFE itself (i.e., by the integration bridge or PIF bridge). Instead, a DNE module operating on the workload VM integrates with the network stack (i.e., the network stack between the integration bridge and PIF bridge, for the IP address of the VM interface). The IPsec functionality of the network stack uses the appropriate session key to encrypt and/or generate integrity information for outgoing packets and decrypt and/or authenticate incoming packets. The flow entries in the MFE indicate whether or not encryption/decryption and/or authentication need to be performed for a given packet.

Figure 30:
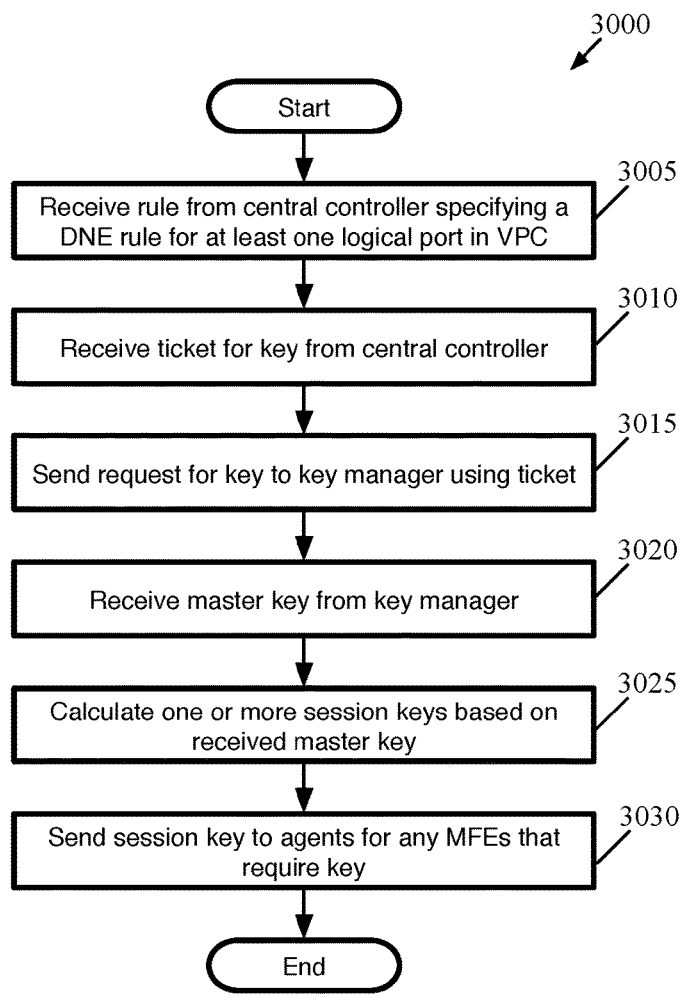
FIG. 30 conceptually illustrates a process of some embodiments for managing DNE keys in the gateway of a public datacenter VPC.

FIG. 30 conceptually illustrates a process 3000 of some embodiments for managing DNE keys in the gateway of a public datacenter VPC. The process 3000 is performed, in some embodiments, by a gateway VM in the VPC (e.g., by the gateway controller and/or DNE module of the gateway VM. In some embodiments, the gateway VM performs this process or a similar process for each DNE rule it receives.

As shown, the process 3000 begins by receiving (at 3005) a rule from a central controller specifying a DNE rule for at least one logical port in the VPC. As described above, the central controller views the gateway controller as the local controller for all of the workloads operating in its VPC. The DNE rule might pertain to a connection between two endpoints in the VPC, multiple connections between multiple endpoints in the VPC, a connection between an endpoint in the VPC and a logical network endpoint located elsewhere, a connection between the gateway datapath and another endpoint in the VPC, or combinations thereof. The DNE rule of some embodiments requires encryption and/or authentication of packets between the endpoints of the specified connection as well.

In addition, the process 3000 receives (at 3010) from the central controller a ticket for a key to use in the encryption and/or authentication process. This ticket, in some embodiments, is generated by the central controller based on a key identifier and/or SPI. The ticket acts as a security token for retrieving a key from the key manager of the network encryption system. In some embodiments, the ticket includes a key identifier, a local controller identifier, an expiration time, and a signature.

Next, the process sends (at 3015) a request for the key to the key manager, using the ticket. Some embodiments send the ticket itself, while other embodiments send data derived from the ticket. The key manager uses the ticket or other information in the request to identify the required key and verify that the gateway controller is authorized to receive the key.

Assuming the key manager verifies the request, the process receives (at 3020) a master key from the key manager. The master key is generated by the key manager at the time of the request. The process then calculates (at 3025) one or more session keys based on the received master key. If the rule specifies multiple possible connections governed by a rule, some embodiments generate different session keys from the master key for each such connection. Some embodiments calculate the session key as a function of the master key, features about the two endpoints of the specific connection (e.g., VTEP labels, VTEP IP addresses, SPIs pertaining to the endpoints, etc.), and/or a randomly generated number.

The process then sends (at 3030) the session key(s) to the local control agents for any MFEs that require the key(s) (i.e., the agents for the MFEs at either end of each connection). This may include also sending the keys to the gateway datapath if necessary. In addition, in some embodiments, the DNE module on the gateway securely stores the keys so that they can be re-distributed if a workload VM or its agent is restarted and the agent requires the previously-distributed information.

VIII. Threat Detection

Especially with DCN workloads operating in the public cloud, and with the MFEs operating on those DCNs, security can be a concern. If a hacker gained root access to a DCN, he or she might be able to bypass the enforcement of network security policies (and thereby send traffic in contradiction to those policies) because the security policies are enforced by the MFE operating in the DCN itself, rather than in the virtualization software of the machine on which the DCN operates.

A hacker (or other rogue user) on a compromised DCN might bypass network security policies in one of several different ways. For instance, the user could (i) remove (e.g., uninstall) the local control agent, (ii) disconnect the network interface from the MFE and run the network stack directly on the interface, so as to bypass the security policy enforcement, or (iii) modify the configuration so that the local control agent is not the controller of the MFE (e.g., of the integration bridge that enforces security policies), thereby directly configuring the MFE (e.g., installing new flow entries).

However, gateway controller of some embodiments enables the network control system to handle these situations by identifying the compromised DCN, and ensuring that the public cloud forwarding element to which the DCN connects (e.g., a virtual switch in the host machine) will prevent the compromised DCN from sending data traffic. The local control agent on the compromised DCN can detect the second and third situations listed above, and notify the gateway controller. If the agent is removed, the gateway controller will notice the non-existence of its connectivity to this controller.

FIGS. 31 and 32 illustrate examples of a gateway controller 3130 identifying compromised VMs in its public datacenter VPC, so that the compromised VM can be quarantined. Specifically, FIG. 31 illustrates the case in which an agent is uninstalled, over two stages 3105-3110. As shown in the first stage, a gateway VM 3100 includes the gateway controller 3130 (in addition to its other components), and a VM 3135 in the VPC executes an agent 3140 (in addition to a workload application and the MFE controlled by the agent). In the first stage 3105, a connection exists between the gateway controller 3130 and the agent 3140.

However, at this first stage 3105, the VM is compromised and the user logged into the VM deletes (e.g., uninstalls) the agent 3140, so that the MFE on the VM cannot receive security policies. As shown at the second stage 3110, this removes the connection between the agent and the gateway controller 3130, so that the gateway controller detects that the agent is no longer operating. It should be noted that this could occur if the agent restarted or otherwise went down without the VM being compromised, but that some embodiments quarantine the VM anyway in these cases until the agent is back up.

While this example shows the agent being completely uninstalled, a similar loss of connection would occur if the hacker simply modified the configuration of the agent to receive its configuration rules from a different controller (i.e., one controller by the hacker). Because the agent would no longer be configured to receive configuration from the gateway controller, the agent would break communication with the gateway controller, appearing to the gateway controller as though the agent had been removed.

FIG. 32 illustrates the case in which an attacker creates a new interface on a compromised VM 3200, over two stages 3205-3210. The VM 3200 has an agent 3225 executing on it, and operates in the same VPC as the gateway VM 3100. In the first stage 3205, a new interface has been created on the VM 3200, and this interface is being used to send non-secure data. The interface is not connected to the MFE, and therefore applications on the VM are able to send packet directly through a network stack to the interface without any sort of security processing.

However, in the second stage 3210, the agent detects the presence of the new interface and reports this interface to the gateway controller 3130. In some embodiments, the new interface will automatically be populated in a database (e.g., an OVSDB database) managed by the agent, and thus the agent detects this change. Because the interface is not connected to the MFE, the agent reports this interface to the gateway controller as an untrusted interface. Similarly, the agent would notify the gateway controller if the existing interface was changed so that it received packets directly from the workload application without the intermediary processing of the MFE.

IX. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 33:
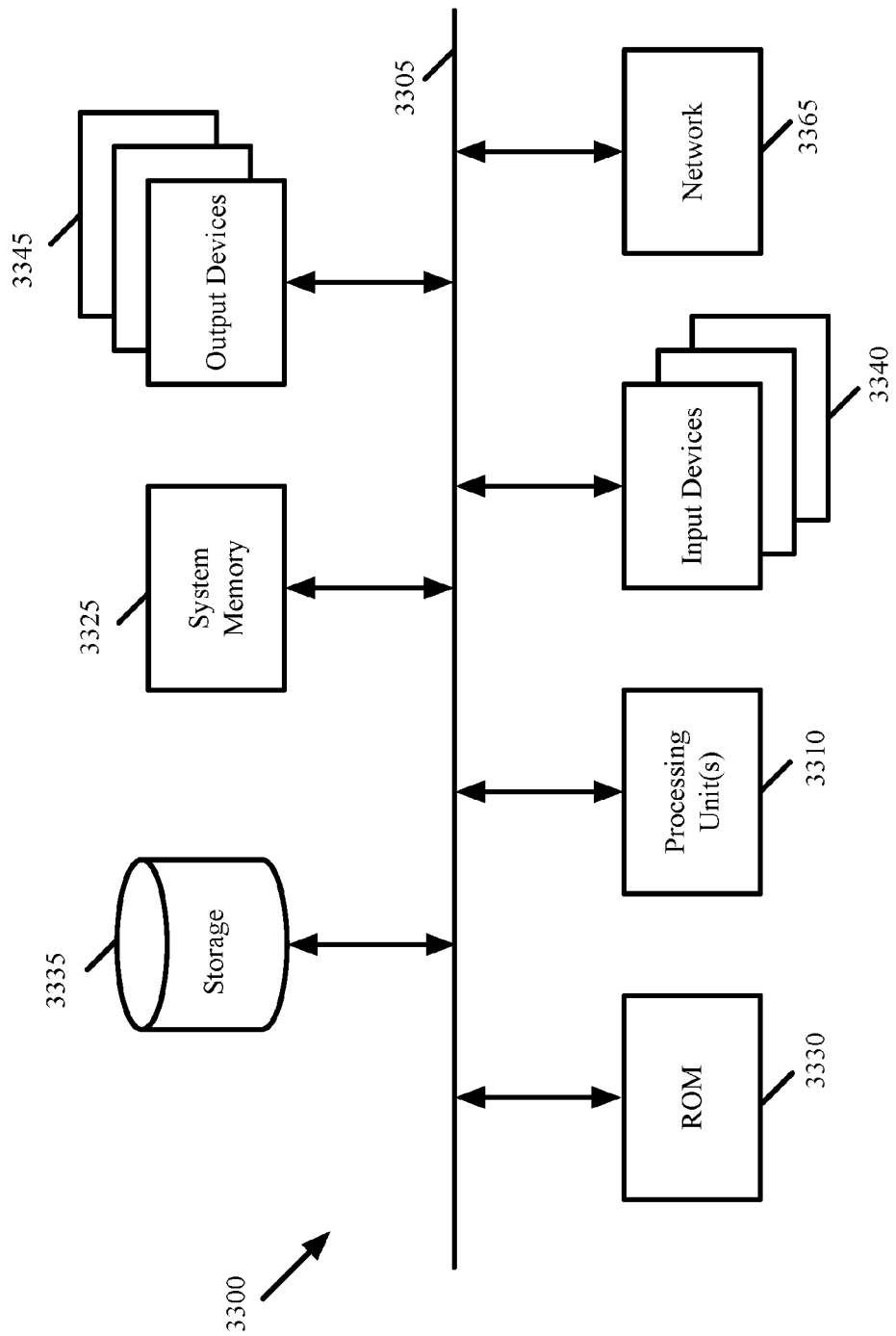
FIG. 33 conceptually illustrates an electronic system with which some embodiments of the invention are implemented.

FIG. 33 conceptually illustrates an electronic system 3300 with which some embodiments of the invention are implemented. The electronic system 3300 can be used to execute any of the control, virtualization, or operating system applications described above. The electronic system 3300 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 3300 includes a bus 3305, processing unit(s) 3310, a system memory 3325, a read-only memory 3330, a permanent storage device 3335, input devices 3340, and output devices 3345.

The bus 3305 collectively represents all system, peripheral, and chipset buses that communicatively connect the numerous internal devices of the electronic system 3300. For instance, the bus 3305 communicatively connects the processing unit(s) 3310 with the read-only memory 3330, the system memory 3325, and the permanent storage device 3335.

From these various memory units, the processing unit(s) 3310 retrieve instructions to execute and data to process in order to execute the processes of the invention. The processing unit(s) may be a single processor or a multi-core processor in different embodiments.

The read-only-memory (ROM) 3330 stores static data and instructions that are needed by the processing unit(s) 3310 and other modules of the electronic system. The permanent storage device 3335, on the other hand, is a read-and-write memory device. This device is a non-volatile memory unit that stores instructions and data even when the electronic system 3300 is off. Some embodiments of the invention use a mass-storage device (such as a magnetic or optical disk and its corresponding disk drive) as the permanent storage device 3335.

Other embodiments use a removable storage device (such as a floppy disk, flash drive, etc.) as the permanent storage device. Like the permanent storage device 3335, the system memory 3325 is a read-and-write memory device. However, unlike storage device 3335, the system memory is a volatile read-and-write memory, such a random access memory. The system memory stores some of the instructions and data that the processor needs at runtime. In some embodiments, the invention's processes are stored in the system memory 3325, the permanent storage device 3335, and/or the read-only memory 3330. From these various memory units, the processing unit(s) 3310 retrieve instructions to execute and data to process in order to execute the processes of some embodiments.

The bus 3305 also connects to the input and output devices 3340 and 3345. The input devices enable the user to communicate information and select commands to the electronic system. The input devices 3340 include alphanumeric keyboards and pointing devices (also called "cursor control devices"). The output devices 3345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 33, bus 3305 also couples electronic system 3300 to a network 3365 through a network adapter (not shown). In this manner, the computer can be a part of a network of computers (such as a local area network ("LAN"), a wide area network ("WAN"), or an Intranet, or a network of networks, such as the Internet. Any or all components of electronic system 3300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system isolates the containers for different tenants and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESX hypervisor of VMware Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 3, 4, 8-10, 27, and 30) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a network controller that manages a logical network implemented in a datacenter comprising forwarding elements to which the network controller does not have access, a method comprising:
    identifying a virtual machine, that operates on a host machine in the datacenter, to attach to the logical network, the virtual machine having a network interface with a network address provided by a management system of the datacenter, wherein a workload application executes in a first namespace of the virtual machine; and
    distributing configuration data for configuring a managed forwarding element executing in a second namespace of the virtual machine (i) to receive data packets sent from the workload application via an interface pairing between the first and second namespaces and (ii) to perform network security and forwarding processing on the data packets, wherein the data packets sent by the workload application have the provided network address as a source address when received by the managed forwarding element and are encapsulated by the managed forwarding element using the same provided network address as a source address for the encapsulation when sent from the virtual machine.

2. The method of claim 1, wherein the network address is mapped to a logical port of a logical switch to which the virtual machine is attached, wherein the logical switch is one of a plurality of logical forwarding elements of the logical network.

3. The method of claim 1, wherein the managed forwarding element comprises a first bridge that connects to an internal interface of the second namespace and a second bridge that connects to the network interface of the virtual machine.

4. The method of claim 3, wherein the internal interface of the second namespace is part of a veth pair with an interface of the first namespace, wherein the workload application connects to the interface of the first namespace via a first network stack associated with the network address provided by the management system of the datacenter, wherein the first bridge connects to the second bridge via a second network stack associated with the network address provided by the management system of the datacenter.

5. The method of claim 3, wherein the first bridge is configured to perform network security processing and logical forwarding on data packets sent to and from the workload application, wherein the network security processing comprises application of distributed firewall rules, wherein the logical forwarding comprises applying forwarding rules for at least one logical switch to identify a logical egress port for each data packet.

6. The method of claim 3, wherein the first bridge is configured to receive a data packet from the workload application via the interface pairing, identify a logical egress port for the data packet, encapsulate the data packet using the network address as the source network address for an encapsulation header, and send the encapsulated data packet to a virtual tunnel endpoint (VTEP) of the second bridge,
    wherein the data packet is sent to the interface pairing via a first network stack in the first namespace, the first network stack associated with the network address, wherein the data packet is sent to the VTEP of the second bridge via a second network stack associated with the network address.

7. The method of claim 3, wherein the first bridge is configured to receive a data packet from the workload application via the interface pairing, identify a logical egress port for the data packet, encapsulate the data packet, and send the encapsulated data packet to a virtual tunnel endpoint (VTEP) of the second bridge, wherein the second bridge is configured to send incoming packets encapsulated with the network address as a destination address to an overlay port of the first bridge via the VTEP.

8. The method of claim 1, wherein the virtual machine further executes a local control agent for directly configuring the managed forwarding element according to the distributed configuration data.

9. The method of claim 1, wherein the workload application is a first workload application and the virtual machine is a first virtual machine, wherein data packets sent by the workload application to a second workload application executing on a second virtual machine in the datacenter are encapsulated and transmitted out of the virtual machine network interface to a forwarding element controlled by the datacenter management system, wherein the forwarding element controlled by the datacenter management system encapsulates the outgoing data packets a second time using a third network address associated with a physical network interface of a host machine on which the virtual machine operates.

10. The method of claim 1, wherein the network controller is a first network controller and the virtual machine is a first virtual machine, wherein identifying the first virtual machine comprises receiving an attachment request from a second network controller operating on a second virtual machine in the datacenter, wherein the attachment request is forwarded by the second network controller after receiving an attachment request from the first virtual machine.

11. A non-transitory machine readable medium storing a program which when executed by at least one processing unit implements a network controller that manages a logical network implemented in a datacenter comprising forwarding elements to which the network controller does not have access, the program comprising sets of instructions for:

identifying a virtual machine, that operates on a host machine in the datacenter, to attach to the logical network, the virtual machine having a network interface with a network address provided by a management system of the datacenter, wherein a workload application executes in a first namespace of the virtual machine; and distributing configuration data for configuring a managed forwarding element executing in a second namespace of the virtual machine (i) to receive data packets sent from the workload application via an interface pairing between the first and second namespaces and (ii) to perform network security and forwarding processing on the data packets, wherein the data packets sent by the workload application have the provided network address as a source address when received by the managed forwarding element and are encapsulated by the managed forwarding element using the same provided network address as a source address for the encapsulation when sent from the virtual machine.

12. The non-transitory machine readable medium of claim 11, wherein the managed forwarding element comprises a first bridge that connects to an internal interface of the second namespace and a second bridge that connects to the network interface of the virtual machine.

13. The non-transitory machine readable medium of claim 12, wherein the internal interface of the second namespace is part of a veth pair with an interface of the first namespace, wherein the workload application connects to the interface of the first namespace via a first network stack associated with the network address provided by the management system of the datacenter, wherein the first bridge connects to the second bridge via a second network stack associated with the network address provided by the management system of the datacenter.

14. The non-transitory machine readable medium of claim 12, wherein the first bridge is configured to perform network security processing and logical forwarding on data packets sent to and from the workload application, wherein the network security processing comprises application of distributed firewall rules and the logical forwarding comprises applying forwarding rules for at least one logical switch to identify a logical egress port for each data packet.

15. The non-transitory machine readable medium of claim 12, wherein the first bridge is configured to receive a data packet from the workload application via the interface pairing, identify a logical egress port for the data packet, encapsulate the data packet and send the encapsulated data packet to a virtual tunnel endpoint (VTEP) of the second bridge.

16. The non-transitory machine readable medium of claim 15, wherein the data packet is sent to the interface pairing via a first network stack in the first namespace, the first network stack associated with the network address, wherein the data packet is sent to the VTEP of the second bridge via a second network stack associated with the network address, wherein the network address is used as the source network address for an encapsulation header applied by the first bridge.

17. The non-transitory machine readable medium of claim 15, wherein the second bridge is configured to send incoming packets encapsulated with the network address as a destination address to an overlay port of the first bridge via the VTEP, wherein the first bridge is configured to decapsulate the incoming packets received via the overlay port.

18. The non-transitory machine readable medium of claim 11, wherein the workload application is a first workload application and the virtual machine is a first virtual machine, wherein data packets sent by the workload application to a second workload application executing on a second virtual machine in the datacenter are encapsulated and transmitted out of the virtual machine network interface to a forwarding element controlled by the datacenter management system, wherein the forwarding element controlled by the datacenter management system encapsulates the outgoing data packets a second time using a third network address associated with a physical network interface of a host machine on which the virtual machine operates.

19. The non-transitory machine readable medium of claim 11, wherein the network controller is a first network controller and the virtual machine is a first virtual machine, wherein the set of instructions for identifying the first virtual machine comprises a set of instructions for receiving an attachment request from a second network controller operating on a second virtual machine in the datacenter, wherein the attachment request is forwarded by the second network controller after receiving an attachment request from the first virtual machine.

20. The non-transitory machine readable medium of claim 19, wherein the set of instructions for distributing the configuration data comprises a set of instructions for distributing the configuration data to the second network controller, wherein the second network controller distributes the configuration data to the second virtual machine.

* * * * *